(12) United States Patent
Zhang et al.

(10) Patent No.: US 11,856,211 B2
(45) Date of Patent: Dec. 26, 2023

(54) USAGE FOR HISTORY-BASED AFFINE PARAMETERS

(71) Applicants: Beijing Bytedance Network Technology Co., Ltd., Beijing (CN); Bytedance Inc., Los Angeles, CA (US)

(72) Inventors: Kai Zhang, San Diego, CA (US); Li Zhang, San Diego, CA (US); Hongbin Liu, Beijing (CN); Jizheng Xu, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/319,961

(22) Filed: May 13, 2021

(65) Prior Publication Data

US 2021/0266584 A1    Aug. 26, 2021

Related U.S. Application Data

(63) Continuation of application No. PCT/CN2019/119280, filed on Nov. 18, 2019.

(30) Foreign Application Priority Data

Nov. 16, 2018   (WO) ................ PCT/CN2018/115935
Jan. 1, 2019    (WO) ................ PCT/CN2019/070003
(Continued)

(51) Int. Cl.
*H04N 19/105* (2014.01)
*H04N 19/423* (2014.01)
(Continued)

(52) U.S. Cl.
CPC ......... *H04N 19/423* (2014.11); *H04N 19/105* (2014.11); *H04N 19/137* (2014.11);
(Continued)

(58) Field of Classification Search
None
See application file for complete search history.

(56) References Cited

U.S. PATENT DOCUMENTS 10,448,010 B2   10/2019   Chen et al.
10,560,712 B2    2/2020   Zou et al.
(Continued)

FOREIGN PATENT DOCUMENTS

CN    104935938 A    9/2015
CN    105163116 A   12/2015
(Continued)

OTHER PUBLICATIONS

Bross et al. "Versatile Video Coding (Draft 2)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K1001, 2018.
(Continued)

*Primary Examiner* — Christopher G Findley
(74) *Attorney, Agent, or Firm* — Perkins Coie LLP

(57) ABSTRACT

Usage for History-based affine parameters is described. In an exemplary aspect, a method for video processing includes deriving, for a conversion between a current block of video and a bitstream representation of the current block, affine related information associated with affine model for the current block based on affine parameters stored in a buffer for storing affine related information of blocks coded prior the current block; and performing the conversion by using the affine related information.

18 Claims, 36 Drawing Sheets

(30) Foreign Application Priority Data

Jan. 10, 2019 (WO) .............. PCT/CN2019/071221
Feb. 2, 2019 (WO) .............. PCT/CN2019/074600
Feb. 22, 2019 (WO) .............. PCT/CN2019/075867

(51) Int. Cl.

| | |
|---|---|
| *H04N 19/159* | (2014.01) |
| *H04N 19/176* | (2014.01) |
| *H04N 19/137* | (2014.01) |
| *H04N 19/30* | (2014.01) |
| *H04N 19/513* | (2014.01) |
| *H04N 19/167* | (2014.01) |
| *H04N 19/196* | (2014.01) |
| *H04N 19/52* | (2014.01) |

(52) U.S. Cl.
CPC ......... *H04N 19/159* (2014.11); *H04N 19/167* (2014.11); *H04N 19/176* (2014.11); *H04N 19/196* (2014.11); *H04N 19/30* (2014.11); *H04N 19/513* (2014.11); *H04N 19/52* (2014.11)

(56) References Cited

U.S. PATENT DOCUMENTS

| | | | |
|---|---|---|---|
| 10,757,417 | B2 | 8/2020 | Zhang et al. |
| 10,778,999 | B2 | 9/2020 | Li et al. |
| 10,841,609 | B1 | 11/2020 | Liu et al. |
| 2014/0269923 | A1 | 9/2014 | Kwon et al. |
| 2017/0078698 | A1 | 3/2017 | Park et al. |
| 2017/0214932 | A1 | 7/2017 | Huang |
| 2017/0332095 | A1 | 11/2017 | Zou et al. |
| 2018/0098063 | A1 | 4/2018 | Chen et al. |
| 2018/0270500 | A1 | 9/2018 | Li et al. |
| 2019/0058896 | A1 | 2/2019 | Huang et al. |
| 2019/0387250 | A1 | 12/2019 | Boyce et al. |
| 2020/0036997 | A1* | 1/2020 | Li .................. H04N 19/436 |
| 2020/0045310 | A1 | 2/2020 | Chen et al. |
| 2020/0145688 | A1 | 5/2020 | Zou et al. |
| 2020/0213594 | A1 | 7/2020 | Liu et al. |
| 2020/0213612 | A1 | 7/2020 | Liu et al. |
| 2020/0382771 | A1 | 12/2020 | Liu et al. |
| 2020/0382795 | A1 | 12/2020 | Zhang et al. |
| 2020/0396453 | A1 | 12/2020 | Zhang et al. |
| 2020/0396465 | A1 | 12/2020 | Zhang et al. |
| 2020/0396468 | A1 | 12/2020 | Zhou |
| 2021/0266577 | A1 | 8/2021 | Zhang et al. |
| 2021/0266591 | A1 | 8/2021 | Zhang et al. |
| 2021/0352315 | A1 | 11/2021 | Zhang et al. |
| 2022/0086474 | A1 | 3/2022 | Zhang et al. |

FOREIGN PATENT DOCUMENTS

| | | |
|---|---|---|
| CN | 106537915 A | 3/2017 |
| CN | 108432250 A | 8/2018 |
| CN | 108600749 A | 9/2018 |
| CN | 108605137 A | 9/2018 |
| CN | 108702509 A | 10/2018 |
| CN | 108781284 A | 11/2018 |
| CN | 109155855 A | 1/2019 |
| TW | 201742465 A | 12/2017 |
| WO | 2017147765 A1 | 9/2017 |
| WO | 2017156705 A1 | 9/2017 |
| WO | 2018126163 A1 | 7/2018 |

OTHER PUBLICATIONS

Chen et al. "Generalized Bi-Prediction for Inter Coding," Joint Video Exploration Team (JVET) of ITU-T SG 16 WP 3 and ISO/IEC JTC 1/SC 29/WG 11, 3rd Meeting, Geneva, CH, May 26-Jun. 1, 2016, document JVET-C0047, 2016.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Chen et al. "CE4: Affine Merge Enhancement (Test 2.10)," Joint Video Experts Team (JVET) of ITU-T SG 16 WP 3 and ISO/IEC JTC 1/SC 29/WG 11, 11th Meeting, Ljubljana, SI, Jul. 10-18, 2018, document JVET-K0186, 2018.

Chen et al. "CE4: Common Base for Affine Merge Mode (Test 4.2.1)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0366, 2018.

Chen et al. "CE4: Affine Merge Enhancement with Simplification (Test 4.2.2)," Joint Video Experts Team (JVET) of ITU-T SG 16 WP 3 and ISO/IEC JTC 1/SC 29/WG 11, 12th Meeting: Macao, CN, Oct. 3-12, 2018, document JVET-L0368, 2018.

Chen et al. "CE4.3.1: Shared Merging Candidate List," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0170, 2019.

Chiang et al. "CE10.1.1: Multi-Hypothesis Prediction for Improving AMVP Mode, Skip or Merge Mode, and Intra Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0100, 2018.

He et al. "CE4-Related: Encoder Speed-Up and Bug Fix for Generalized Bi-Prediction in BMS-2.1," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0296, 2018.

Huang et al. "CE4.1.6: Simplification of Affine AMVP Candidate List Construction," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0271, 2018.

Huang et al. "CE4.2.5: Simplification of Affine Merge List Construction and Move ATMVP to Affine Merge List," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0278, 2018.

"High Efficiency Video Coding" Series H: Audiovisual and Multimedia Systems: Infrastructure of Audiovisual Services—Coding of Moving Video, ITU-T, H.265, 2019.

Jeong et al. "CE4 Ulitmate Motion Vector Expression (Test 4.5.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0054, 2018.

Li et al. "An Efficient Four-Parameter Affine Motion Model for Video Coding," IEEE Transactions on Circuits and Systems for Video Technology, Aug. 31, 2018, 28(8):1934-1948.

Li et al. "CE4-Related: Affine Merge Mode with Prediction Offsets," Joint Video Experts Team (JVET) of ITU-T SG 16 NP 3 and ISO/IEC JTC 1/SC 29/WG 11, 12th Meeting, Macao, CN, Oct. 3-12, 2018, document JVET-L0320, 2018.

Liao et al. "CE10.3.1.b: Triangular Prediction Unit Mode," Joint Video Exploration Team (JVET) of ITU-T SG 16 WP 3 and ISO/IEC JTC 1/SC 29/WG 11, 12th Meeting, Macao, CN, Oct. 3-12, 2018, document JVET-L0124, 2018.

Lin et al. "CE4.2.3: Affine Merge Mode," Joint Video Experts Team (JVET) of ITU-T SG 16 WP 3 and ISO/IEC JTC 1/SC 29/WG 11, 12th Meeting, Macao, CN Oct. 3-12, 2018, document JVET-L0088, 2018.

Su et al. "CE4.4.1: Generalized Bi-Prediction for Intercoding," Joint Video Exploration Team of ISO/IEC JTC 1/SC 29/WG 11 and ITU-T SG 16, Ljubljana, Jul. 10-18, 2018, document No. JVET-K0248, 2018.

Su et al. "CE4-Related: Generalized Bi-Prediction Improvements," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0197, 2018.

Su et al. "CE4-Related: Generalized Bi-Prediction Improvements Combined from JVET-L0197 and JVET-L0296," Joint Video Experts

(56) References Cited

OTHER PUBLICATIONS

Team (JVET) of ITU-T SG 16 WP 3 and ISO/IEC JTC 1/SC 29/WG 11, 12th Meeting, Macao, CN, Oct. 3-12, 2018, document JVET-L0646, 2018.
Yang et al. "CE4-Related: Control Point MV Offset for Affine Merge Mode," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0389, 2018.
Zhang et al. "CE4-Related: History-Based Motion Vector Prediction," Joint Video Experts Team (JVET) of ITU-T SG 16 WP 3 and ISO/IEC JTC 1/SC 29/WG 11, 11th Meeting, Ljubljana, SI Jul. 10-18, 2018, document JVET-K0104, 2018.
Zhang et al. "CE4: History-based Motion Vector Prediction (Test 4.4.7)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0266, 2018.
Zhao et al. "CE2: History Based Affine Motion Candidate," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0305, 2018.
Zhao et al. "CE2: History Based Affine Motion Candidate (Test 2.2.3)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0125, 2019.
Zhang et al. "CE2-Related: History-Based Affine Merge Candidates," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0266, 2019.
JEM-7.0: https://jvet.hhi.fraunhofer.de/svn/svn_HMJEMSoftware/tags/HM-16.6-JEM-7.0.
VTM-2.0.1:https://vcgit.hhi.fraunhofer.de/jvet/VVCSoftware_VTM/tags/VTM-2.0.1.
Https://vcgit.hhi.fraunhofer.de/jvet/VVCSoftware_VTM/tags/VTM-2.1.
International Search Report and Written Opinion from International Patent Application No. PCT/CN2019/119279 dated Feb. 21, 2020 (9 pages).
International Search Report and Written Opinion from International Patent Application No. PCT/CN2019/119280 dated Feb. 7, 2020 (9 pages).
International Search Report and Written Opinion from International Patent Application No. PCT/CN2019/119281 dated Feb. 3, 2020 (10 pages).
International Search Report and Written Opinion from International Patent Application No. PCT/CN2020/074219 dated Apr. 24, 2020 (10 pages).
International Search Report and Written Opinion from International Patent Application No. PCT/CN2020/076419 dated May 21, 2020 (11 pages).
Non-Final Office Action from U.S. Appl. No. 17/380,310 dated Sep. 14, 2023.

* cited by examiner

USAGE FOR HISTORY-BASED AFFINE PARAMETERS

This application is a continuation of International Application No. PCT/CN2019/119280, filed on Nov. 18, 2019, which claims the priority to and benefits of International Patent Application No. PCT/CN2018/115935, filed on Nov. 16, 2018, No. PCT/CN2019/070003, filed on Jan. 1, 2019, No. PCT/CN2019/071221, filed on Jan. 10, 2019, No. PCT/CN2019/074600, filed on Feb. 2, 2019, and No. PCT/CN2019/075867, filed on Feb. 22, 2019. All the aforementioned patent applications are hereby incorporated by reference in their entireties.

TECHNICAL FIELD

This document is related to video and image coding technologies.

BACKGROUND

Digital video accounts for the largest bandwidth use on the internet and other digital communication networks. As the number of connected user devices capable of receiving and displaying video increases, it is expected that the bandwidth demand for digital video usage will continue to grow.

SUMMARY

The disclosed techniques may be used by video or image decoder or encoder embodiments for in which geometry partitions with history based motion vector prediction (HMVP) is used.

In one example aspect, a method of processing video is disclosed. The method includes storing, by a processor, parameters associated with motion vectors for a first video block in memory, the parameters related to one or both of a 4-parameter affine model or a 6-parameter affine model of the motion vectors for the first video block; and performing further processing of the first video block using the parameters.

In another example aspect, a method of processing video includes storing, by a processor, in memory, control point motion vectors (CPMVs) representing coordinates of representative points relative to a top-left sample of the first video block; and performing further processing of the first video block using the CPMVs.

In another example aspect, a method of processing video includes performing a determination, by a processor, of parameters associated with motion vectors for a first video block, the parameters related to one or both of a 4-parameter affine model or a 6-parameter affine model of the motion vectors for the first video block; determining that a buffer for storing the parameters is full; modifying the buffer such that the buffer is not full; storing the parameters in the buffer that is not full; and performing further processing of the first video block using the parameters stored in the buffer.

In another example aspect, a method of processing video includes refreshing, by a processor, a buffer for storing parameters associated with motion vectors for a first video block, the parameters related to one or both of a 4-parameter affine model or a 6-parameter affine model of the motion vectors for the first video block; and performing further processing of the first video block using the parameters stored in the buffer.

In another example aspect, a method of processing video includes identifying, by a processor, parameters associated with motion vectors for a first video block in memory, the parameters related to one or both of a 4-parameter affine model or a 6-parameter affine model of the motion vectors for the first video block; and performing processing of a second video block using the parameters associated with the first video block.

In another example aspect, a method of processing video includes identifying, by a processor, parameters associated with motion vectors for a first video block in memory, the parameters related to one or both of a 4-parameter affine model or a 6-parameter affine model of the motion vectors for the first video block; determining, by the processor, that a second video block uses one of the 4-parameter affine model or the 6-parameter affine model based on the parameters; generating an affine merge candidate list for the second video block based on the 4-parameter affine model or the 6-parameter affine model used by the second video block; and performing further processing of the second video block using the affine merge candidate list.

In another example aspect, a method of processing video includes identifying, by a processor, parameters associated with motion vectors (MVs) for a first video block; deriving, by the processor, an affine model based on the parameters for the first video block, the affine model being one or both of a 4-parameter affine model or a 6-parameter affine model; and performing further processing of the first video block using the affine model.

In another example aspect, a method of processing video includes deriving an affine merge candidate from an affine history based motion vector prediction (HMVP) buffer; and modifying a list that is an affine merge list or a sub-block merge list by inserting the affine merge candidate into the list and by removing an inherited affine merge candidate from the list.

In another example aspect, a method of processing video includes deriving an affine merge advanced motion vector prediction (AMVP) candidate from an affine history based motion vector prediction (HMVP) buffer; and modifying an affine AMVP list by inserting the affine AMVP candidate into the list and by removing an inherited affine AMVP candidate from the list.

In one example aspect, a method of processing video includes deriving, for a conversion between a current block of video and a bitstream representation of the current block, affine related information associated with an affine model to be used by the current block based on affine related information associated with an affine model used by a first block stored in a buffer, wherein the first block is affine coded prior to the current block; and performing the conversion by using the derived affine related information.

In another example aspect, a method of processing video includes calculating a first set of affine parameters associated with the affine model for a first block which is affine-coded based on motion vectors (MV) associated with the affine model for the first block, a width of the first block and a height of the first block, and clipping the calculated first set of affine parameters.

In another example aspect, a method of processing video includes deriving, for a conversion between a current block of video and a bitstream representation of the current block, a virtual affine model for the current block from multiple affine models stored in a buffer for storing affine models; and performing the conversion by using the virtual affine model.

In another example aspect, a method of processing video includes deriving, for a conversion between a current block of video and a bitstream representation of the current block, a first set of affine parameters associated with affine model for the current block; comparing the first set of affine parameters to one or more of sets of affine parameters stored in a buffer for storing affine parameters so as to determine whether the first set of affine parameters is same or similar to at least one set of affine parameters; and deciding whether or how to update the buffer for storing affine parameters based on the determination.

In another example aspect, a method of processing video includes deriving, for a conversion between a current block of video and a bitstream representation of the current block, affine related information associated with affine model for the current block based on affine parameters stored in a buffer for storing affine related information of blocks coded prior the current block; and performing the conversion by using the derived affine related information.

In another example aspect, a method of processing video includes deriving, for a conversion between a current block of video and a bitstream representation of the current block, affine model for the current block based on a set of affine parameters stored in a buffer for storing affine related information of blocks coded prior the current block; generating an affine merge candidate list, wherein the affine merge candidate list comprises an affine merge candidate for the current block based on the derived affine model for the current block; and performing the conversion based on the affine merge candidate list.

In another example aspect, a method of processing video includes generating, for a conversion between a current block of video and a bitstream representation of the current block, an affine advanced motion vector prediction (AMVP) candidate list for the current block which is affine AMVP coded block, wherein the candidate list includes at least one AMVP candidate based on affine parameters stored in a buffer for storing affine related information of blocks coded prior the current block; and performing the conversion based on the affine AMVP candidate list.

In another example aspect, a method of processing video includes deriving, for a conversion between a current block of video and a bitstream representation of the current block, affine candidates for the current block based on affine parameters stored in a buffer for storing affine related information of blocks coded prior the current block and one or multiple unit blocks; inserting the derived affine candidates into affine candidates list; and performing the conversion by using the affine candidates list.

In another example aspect, a method of processing video includes deriving, for a conversion between a current block of video and a bitstream representation of the current block, affine candidates for the current block based on affine parameters stored in an affine history-based motion vector prediction (HMVP) buffer; inserting the derived affine candidates into affine candidates list; and performing the conversion by using the affine candidates list.

In another example aspect, the above-described method may be implemented by a video encoder apparatus that comprises a processor.

In yet another example aspect, these methods may be embodied in the form of processor-executable instructions and stored on a computer-readable program medium.

These, and other, aspects are further described in the present document.

BRIEF DESCRIPTION OF THE DRAWINGS

FIG. 9 shows an example of motion vector storage.
FIG. 25 shows examples of possible positions of a collocated unit block.

DETAILED DESCRIPTION

The present document provides various techniques that can be used by a decoder of image or video bitstreams to improve the quality of decompressed or decoded digital video or images. For brevity, the term "video" is used herein to include both a sequence of pictures (traditionally called video) and individual images. Furthermore, a video encoder may also implement these techniques during the process of encoding in order to reconstruct decoded frames used for further encoding.

Section headings are used in the present document for ease of understanding and do not limit the embodiments and techniques to the corresponding sections. As such, embodiments from one section can be combined with embodiments from other sections.

1. Summary

This patent document is related to video/image coding technologies. Specifically, it is related to affine prediction in video/image coding. It may be applied to the existing video coding standards like HEVC, or the standard (Versatile Video Coding) to be finalized. It may be also applicable to future video/image coding standards or video/image codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Figure 1:
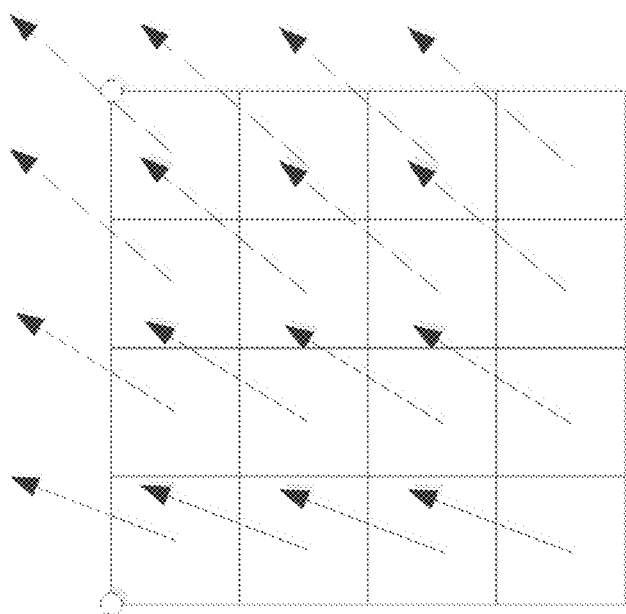
FIG. 1 shows an example of sub-block based prediction.

Sub-block based prediction is first introduced into the video coding standard by HEVC Annex I (3D-HEVC). With sub-block based prediction, a block, such as a Coding Unit (CU) or a Prediction Unit (PU), is divided into several non-overlapped sub-blocks. Different sub-block may be assigned different motion information, such as reference index or Motion Vector (MV), and Motion Compensation (MC) is performed individually for each sub-block. FIG. 1 demonstrates the concept of sub-block based prediction.

To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM).

In JEM, sub-block based prediction is adopted in several coding tools, such as affine prediction, Alternative temporal motion vector prediction (ATMVP), spatial-temporal motion vector prediction (STMVP), Bi-directional Optical flow (BIO) and Frame-Rate Up Conversion (FRUC). Affine prediction has also been adopted into VVC.

Figure 17:
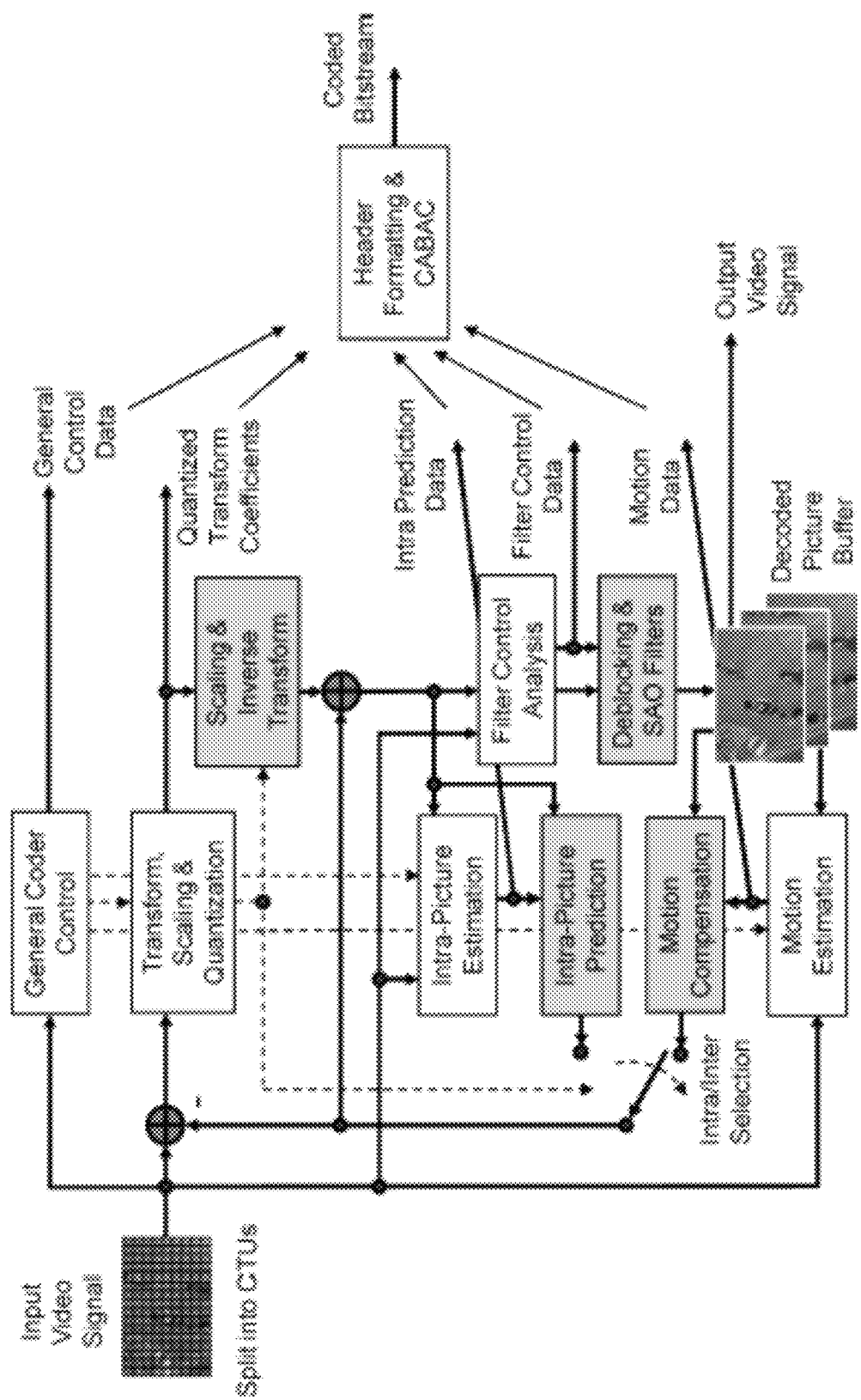
FIG. 17 shows a block diagram of an example implementation of a video encoder.

FIG. 17 is a block diagram of an example implementation of a video encoder. FIG. 17 shows that the encoder implementation has a feedback path built in in which the video encoder also performs video decoding functionality (reconstructing compressed representation of video data for use in encoding of next video data).

2.1 Affine Prediction

Figure 2:
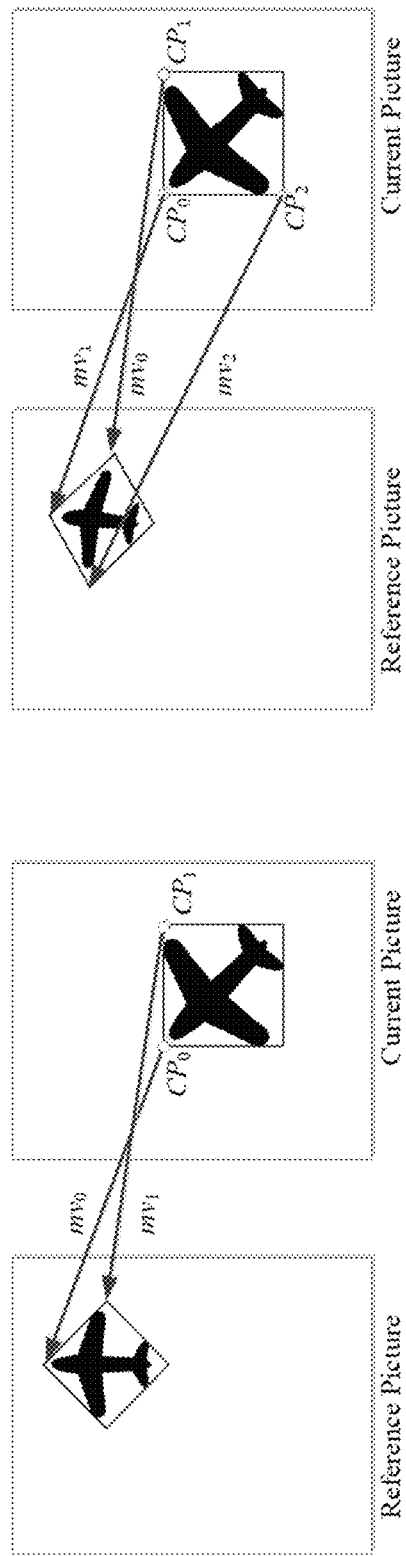
FIG. 2 shows an example of a 4-parameter affine model and a 6-parameter affine model.

In HEVC, only translation motion model is applied for motion compensation prediction (MCP). While in the real world, there are many kinds of motion, e.g. zoom in/out, rotation, perspective motions and the other irregular motions. In the VVC, a simplified affine transform motion compensation prediction is applied. As shown FIG. 2, the affine motion field of the block is described by two (in the 4-parameter affine model on the left side of FIG. 2) or three (in the 6-parameter affine model on the right side of FIG. 2) control point motion vectors.

Figure 3:
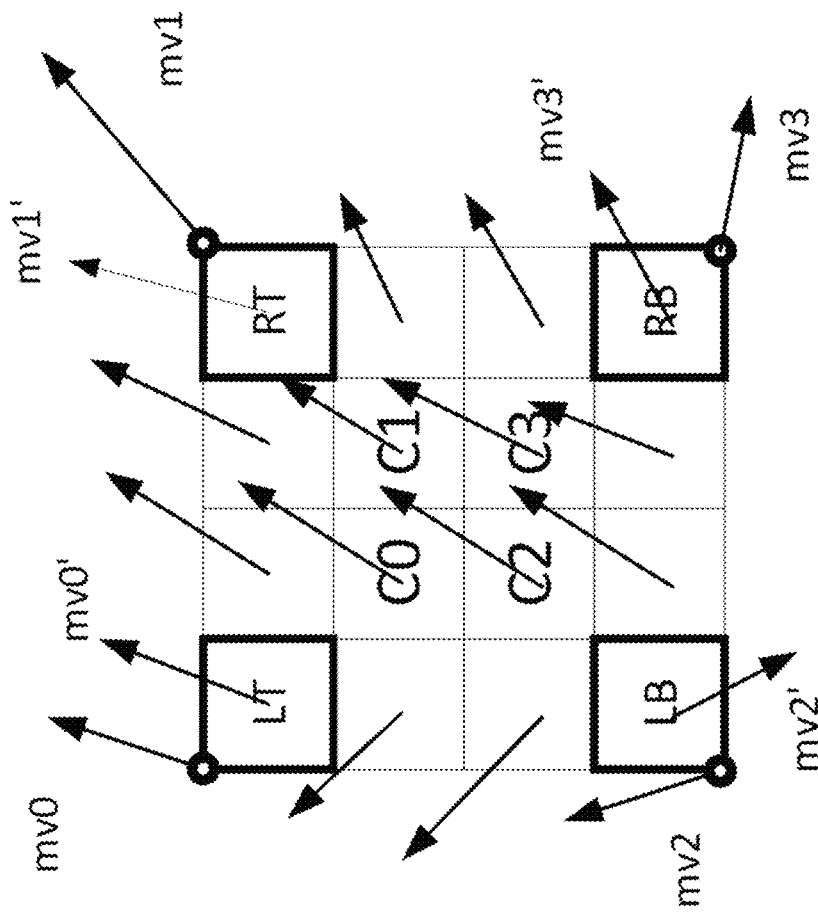
FIG. 3 shows an example of affine motion vector field (MVF) per sub-block.

FIG. 3 shows an example of MVs in sub-blocks of an affine-coded block.

The motion vector field (MVF) of a block is described by the following equations with the 4-parameter affine model (wherein the 4-parameter are defined as the variables a, b, e and f) in equation (1) and 6-parameter affine model (wherein the 4-parameter are defined as the variables a, b, c, d, e and f) in equation (2) respectively:

$$\begin{cases} mv^h(x,y) = ax - by + e = \frac{(mv_1^h - mv_0^h)}{w}x - \frac{(mv_1^v - mv_0^v)}{w}y + mv_0^h \\ mv^v(x,y) = bx + ay + f = \frac{(mv_1^v - mv_0^v)}{w}x + \frac{(mv_1^h - mv_0^h)}{w}y + mv_0^v \end{cases} \quad (1)$$

$$\begin{cases} mv^h(x,y) = ax + cy + e = \frac{(mv_1^h - mv_0^h)}{w}x + \frac{(mv_2^h - mv_0^h)}{h}y + mv_0^h \\ mv^v(x,y) = bx + dy + f = \frac{(mv_1^v - mv_0^v)}{w}x + \frac{(mv_2^v - mv_0^v)}{h}y + mv_0^v \end{cases} \quad (2)$$

where (mvh0, mvh0) is motion vector of the top-left corner control point, and (mvh1, mvh1) is motion vector of the top-right corner control point and (mvh2, mvh2) is motion vector of the bottom-left corner control point, all of the three motion vectors are called control point motion vectors (CPMV), (x, y) represents the coordinate of a representative point relative to the top-left sample within current block. The CP motion vectors may be signaled (like in the affine AMVP mode) or derived on-the-fly (like in the affine merge mode). w and h are the width and height of the current block. In practice, the division is implemented by right-shift with a rounding operation. In VTM, the representative point is defined to be the center position of a sub-block, e.g., when the coordinate of the left-top corner of a sub-block relative to the top-left sample within current block is (xs, ys), the coordinate of the representative point is defined to be (xs+2, ys+2).

In a division-free design, (1) and (2) are implemented as $$\begin{cases} iDMvHorX = (mv_1^h - mv_0^h) \ll (S - \log2(w)) \\ iDMvHorY = (mv_1^v - mv_0^v) \ll (S - \log2(w)) \end{cases} \quad (3)$$

For the 4-parameter affine model shown in (1):

$$\begin{cases} iDMvVerX = -iDMvHorY \\ iDMvVerY = iDMvHorX \end{cases} \quad (4)$$

For the 6-parameter affine model shown in (2):

$$\begin{cases} iDMvVerX = (mv_2^h - mv_0^h) << (S - \log 2(h)) \\ iDMvVerY = (mv_2^v - mv_0^v) << (S - \log 2(h)) \end{cases} \quad (5)$$

Finally, $$\begin{cases} mv^h(x, y) = \text{Normalize}(iDMvHorX \cdot x + \\ \qquad iDMvVerX \cdot y + (mv_0^h << S), S) \\ mv^v(x, y) = \text{Normalize}(iDMvHorY \cdot x + \\ \qquad iDMvVerY \cdot y + (mv_0^v << S), S) \end{cases} \quad (6)$$

$$\text{Normalize}(Z, S) = \begin{cases} (Z + \text{Off}) >> S & \text{if } Z \geq 0 \\ -((-Z + \text{Off}) >> S) & \text{Otherwise} \end{cases}$$

$$\text{Off} = 1 << (S - 1) \quad (7)$$

where S represents the calculation precision. e.g. in VVC, S=7. In VVC, the MV used in MC for a sub-block with the top-left sample at (xs, ys) is calculated by (6) with x=xs+2 and y=ys+2.

To derive motion vector of each 4×4 sub-block, the motion vector of the center sample of each sub-block, as shown in FIG. 3, is calculated according to Eq. (1) or (2), and rounded to 1/16 fraction accuracy. Then the motion compensation interpolation filters are applied to generate the prediction of each sub-block with derived motion vector.

Figure 4:
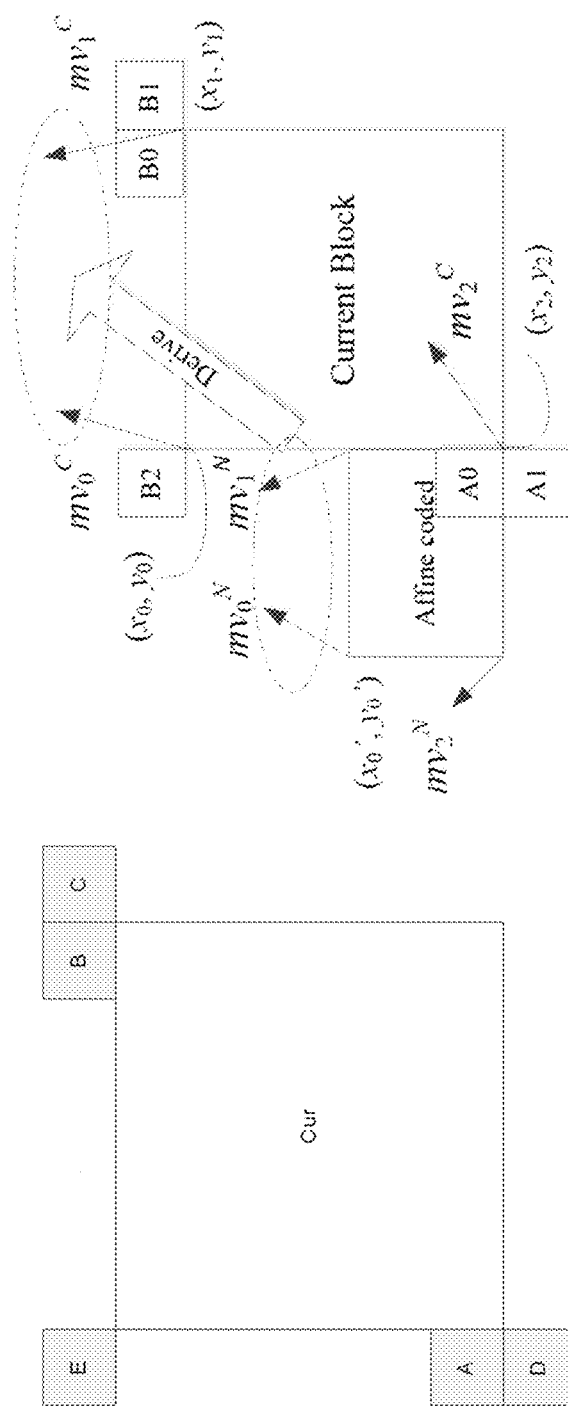
FIG. 4 shows an example of candidates for AF_MERGE.

Affine model can be inherited from spatial neighbouring affine-coded block such as left, above, above right, left bottom and above left neighbouring block as shown in FIG. 4(a). For example, if the neighbour left bottom block A in FIG. 4(a) is coded in affine mode as denoted by A0 in FIG. 4(b), the Control Point (CP) motion vectors mv0N, mv1N and mv2N of the top left corner, above right corner and left bottom corner of the neighbouring CU/PU which contains the block A are fetched. And the motion vector mv0C, mv1C and mv2C (which is only used for the 6-parameter affine model) of the top left corner/top right/bottom left on the current CU/PU is calculated based on mv0N, mv1N and mv2N. It should be noted that in VTM-2.0, sub-block (e.g. 4×4 block in VTM) LT stores mv0, RT stores mv1 if the current block is affine coded. If the current block is coded with the 6-parameter affine model, LB stores mv2; otherwise (with the 4-parameter affine model), LB stores mv2'. Other sub-blocks stores the MVs used for MC.

It should be noted that when a CU is coded with affine merge mode, i.e., in AF_MERGE mode, it gets the first block coded with affine mode from the valid neighbour reconstructed blocks. And the selection order for the candidate block is from left, above, above right, left bottom to above left as shown FIG. 4(a).

The derived CP MVs mv0C, mv1C and mv2C of current block can be used as CP MVs in the affine merge mode. Or they can be used as MVP for affine inter mode in VVC. It should be noted that for the merge mode, if the current block is coded with affine mode, after deriving CP MVs of current block, the current block may be further split into multiple sub-blocks and each block will derive its motion information based on the derived CP MVs of current block.

2.2 Affine Merge Candidate List

Different from VTM wherein only one affine spatial neighboring block may be used to derive affine motion for a block, it proposes to construct a separate list of affine candidates for the AF_MERGE mode.

Insert inherited affine candidates into candidate list

Inherited affine candidate means that the candidate is derived from the valid neighbor reconstructed block coded with affine mode.

Figure 5:
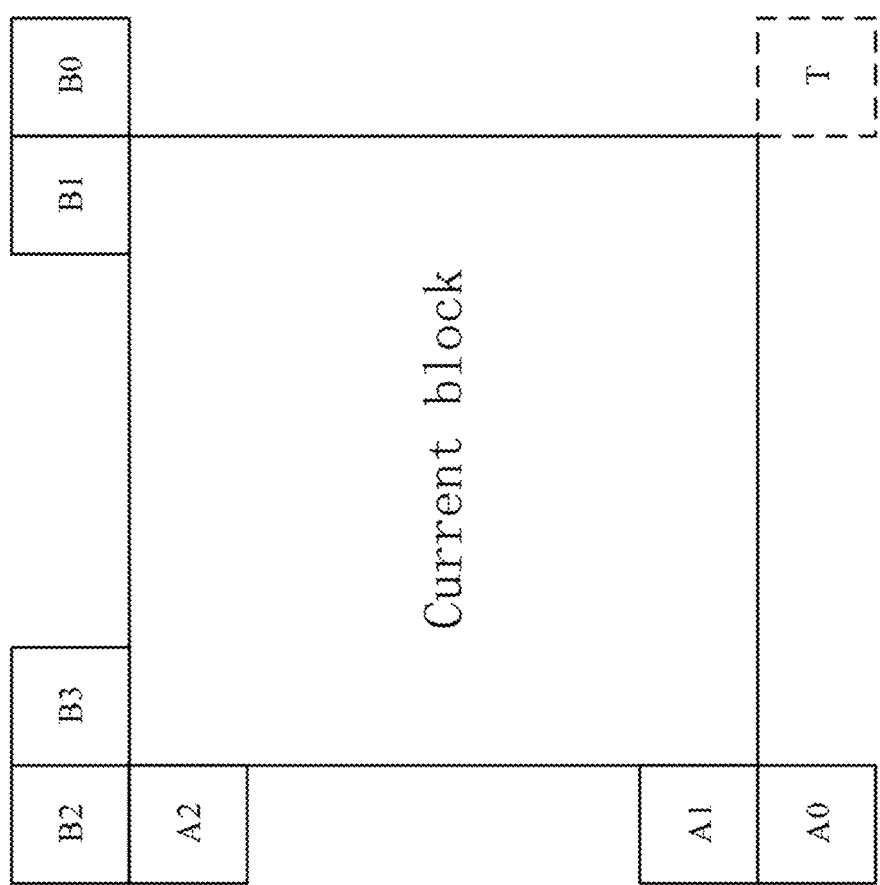
FIG. 5 shows an example of candidate positions for affine merge mode.

As shown in FIG. 5, the scan order for the candidate block is A1, B1, B0, A0 and B2. When a block is selected (e.g., A1), the two-step procedure is applied:

Firstly, use the three corner motion vectors of the CU covering the block to derive two/three control points of current block Based on the control points of current block to derive sub-block motion for each sub-block within current block Insert constructed affine candidates If the number of candidates in affine merge candidate list is less than MaxNumAffineCand, constructed affine candidates are insert into the candidate list.

Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0;

For CP3, the checking priority is A1->A0;

For CP4, T is used.

Secondly, the combinations of controls points are used to construct the motion model.

Motion vectors of three control points are needed to compute the transform parameters in 6-parameter affine model. The three control points can be selected from one of the following four combinations ({CP1, CP2, CP4}, {CP1, CP2, CP3}, {CP2, CP3, CP4}, {CP1, CP3, CP4}). For example, use CP1, CP2 and CP3 control points to construct 6-parameter affine motion model, denoted as Affine (CP1, CP2, CP3).

Motion vectors of two control points are needed to compute the transform parameters in 4-parameter affine model. The two control points can be selected from one of the following six combinations ({CP1, CP4}, {CP2, CP3}, {CP1, CP2}, {CP2, CP4}, {CP1, CP3}, {CP3, CP4}). For example, use the CP1 and CP2 control points to construct 4-parameter affine motion model, denoted as Affine (CP1, CP2).

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

Insert zero motion vectors

If the number of candidates in affine merge candidate list is less than MaxNumAffineCand, zero motion vectors are insert into the candidate list, until the list is full.

2.3 Affine Merge Candidate List 2.5.1 Affine Merge Mode

In the affine merge mode, only the first available affine neighbour can be used to derive motion information of affine merge mode. A candidate list for affine merge mode is constructed by searching valid affine neighbours and combining the neighbor motion information of each control point.

The affine merge candidate list is constructed as following steps:

Insert inherited affine candidates

Inherited affine candidate means that the candidate is derived from the affine motion model of its valid neighbor affine coded block. In the common base, as shown FIG. 5, the scan order for the candidate positions is: A1, B1, B0, A0 and B2.

After a candidate is derived, full pruning process is performed to check whether same candidate has been inserted into the list. If a same candidate exists, the derived candidate is discarded.

Insert constructed affine candidates

If the number of candidates in affine merge candidate list is less than MaxNumAffineCand (set to 5 in this contribution), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.

For CP3, the checking priority is A1->A0.

For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the following six combinations ({CP1, CP4}, {CP2, CP3}, {CP1, CP2}, {CP2, CP4}, {CP1, CP3}, {CP3, CP4}). Combinations {CP1, CP4}, {CP2, CP3}, {CP2, CP4}, {CP1, CP3}, {CP3, CP4} will be converted to a 4-parameter motion model represented by top-left and top-right control points.

The combinations of constructed affine candidates are inserted into to candidate list as following order:

{CP1, CP2, CP3}, {CP1, CP2, CP4}, {CP1, CP3, CP4}, {CP2, CP3, CP4}, {CP1, CP2}, {CP1, CP3}, {CP2, CP3}, {CP1, CP4}, {CP2, CP4}, {CP3, CP4}

For reference list X (X being 0 or 1) of a combination, the reference index with highest usage ratio in the control points is selected as the reference index of list X, and motion vectors point to difference reference picture will be scaled.

After a candidate is derived, full pruning process is performed to check whether same candidate has been inserted into the list. If a same candidate exists, the derived candidate is discarded.

Padding with zero motion vectors

If the number of candidates in affine merge candidate list is less than 5, zero motion vectors with zero reference indices are insert into the candidate list, until the list is full.

2.5.2 Affine Merge Mode

The following simplifications for the affine merge mode are proposed.

The pruning process for inherited affine candidates is simplified by comparing the coding units covering the neighboring positions, instead of comparing the derived affine candidates. Up to 2 inherited affine candidates are inserted into affine merge list. The pruning process for constructed affine candidates is totally removed.

The MV scaling operation in constructed affine candidate is removed. If the reference indices of control points are different, the constructed motion model is discarded.

The number of constructed affine candidates is reduced from 10 to 6.

It is also proposed that other merge candidates with sub-block prediction such as ATMVP is also put into the affine merge candidate list. In that case, the affine merge candidate list may be renamed with some other names such as sub-block merge candidate list.

2.4 Control Point MV Offset for Affine Merge Mode

New Affine merge candidates are generated based on the CPMVs offsets of the first Affine merge candidate. If the first Affine merge candidate enables 4-parameter Affine model, then 2 CPMVs for each new Affine merge candidate are derived by offsetting 2 CPMVs of the first Affine merge candidate; Otherwise (6-parameter Affine model enabled), then 3 CPMVs for each new Affine merge candidate are derived by offsetting 3 CPMVs of the first Affine merge candidate. In Uni-prediction, the CPMV offsets are applied to the CPMVs of the first candidate. In Bi-prediction with List 0 and List 1 on the same direction, the CPMV offsets are applied to the first candidate as follows:

MVnew(L0), i=MVold(L0)+MVoffset(i)

MVnew(L1), i=MVold(L1)+MVoffset(i)

In Bi-prediction with List 0 and List 1 on the opposite direction, the CPMV offsets are applied to the first candidate as follows:

MVnew(L0), i=MVold(L0)+MVoffset(i)

MVnew(L1), i=MVold(L1)−MVoffset(i)

In this contribution, various offset directions with various offset magnitudes are used to generate new Affine merge candidates. Two implementations were tested:

16 new Affine merge candidates with 8 different offset directions with 2 different offset magnitudes are generated as shown in the following offsets set:

Offset set={(4, 0), (0, 4), (−4, 0), (0, −4), (−4, −4), (4, −4), (4, 4), (−4, 4), (8, 0), (0, 8), (−8, 0), (0, −8), (−8, −8), (8, −8), (8, 8), (−8, 8)}.

The Affine merge list is increased to 20 for this design. The number of potential Affine merge candidates is 31 in total.

4 new Affine merge candidates with 4 different offset directions with 1 offset magnitude are generated as shown in the following offsets set:

Offset set={(4, 0), (0, 4), (−4, 0), (0, −4)}.

Figure 6:
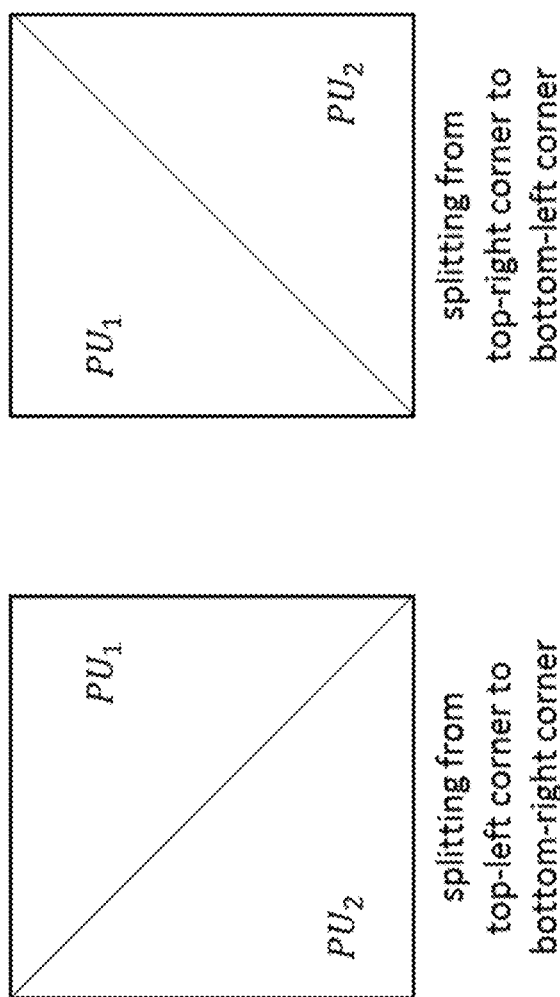
FIG. 6 shows an example of 135 degree partitioning and 45 degree splitting.

The Affine merge list is kept to 5. Four temporal constructed Affine merge candidates are removed to keep the number of potential Affine merge candidates unchanged, i.e., 15 in total. Suppose the coordinates of $CPMV_1$, $CPMV_2$, $CPMV_3$ and $CPMV_4$ are (0, 0), (W, 0), (H, 0) and (W, H). Note that $CPMV_4$ is derived from the temporal MV as shown in FIG. 6. The removed candidates are the following four temporal-related constructed Affine merge candidates: {CP2, CP3, CP4}, {CP1, CP4}, {CP2, CP4}, {CP3, CP4}.

2.5 Generalized Bi-Prediction Improvement

Generalized Bi-prediction improvement (GBi) proposed is adopted.

In an example, GBi is proposed. The gain-complexity trade-off for GBi is improved. GBi applies unequal weights to predictors from L0 and L1 in bi-prediction mode. In inter prediction mode, multiple weight pairs including the equal weight pair (½, ½) are evaluated based on rate-distortion optimization (RDO), and the GBi index of the selected weight pair is signaled to the decoder. In merge mode, the GBi index is inherited from a neighboring CU. In BMS2.1 $GB_1$, the predictor generation in bi-prediction mode is shown in Equation (1).

$$PGBi=(w0*PL0+w1*PL1+\text{RoundingOffset}GBi)\text{>>shiftNum}GB_1,$$

where PGBi is the final predictor of GBi. w0 and w1 are the selected GBi weight pair and applied to the predictors of list 0 (L0) and list 1 (L1), respectively. RoundingOffsetGBi and shiftNumGBi are used to normalize the final predictor in GBi. The supported w1 weight set is {−¼, ⅜, ½, ⅝, ¾}, in which the five weights correspond to one equal weight pair and four unequal weight pairs. The blending gain, i.e., sum of w1 and w0, is fixed to 1.0. Therefore, the corresponding w0 weight set is {5/4, ⅝, ½, ⅜, −¼}. The weight pair selection is at CU-level.

For non-low delay pictures, the weight set size is reduced from five to three, where the w1 weight set is {⅜, ½, ⅝} and the w0 weight set is {⅝, ½, ⅜}. The weight set size reduction for non-low delay pictures is applied to the BMS2.1 GBi and all the GBi tests in this contribution.

In an example, one solution is proposed to further improve the GBi performance. Specifically, the following modifications are applied on top of the existing GBi design.

2.5.1 GBi Encoder Bug Fix

To reduce the GBi encoding time, in current encoder design, the encoder will store uni-prediction motion vectors estimated from GBi weight equal to ⅘, and reuse them for uni-prediction search of other GBi weights. This fast encoding method is applied to both translation motion model and affine motion model. 6-parameter affine model was adopted together with 4-parameter affine model. The BMS2.1 encoder does not differentiate 4-parameter affine model and 6-parameter affine model when it stores the uni-prediction affine MVs when GBi weight is equal to ⅘. Consequently, 4-parameter affine MVs may be overwritten by 6-parameter affine MVs after the encoding with GBi weight ⅘. The stored 6-parameter affine MVs may be used for 4-parameter affine ME for other GBi weights, or the stored 4-parameter affine MVs may be used for 6-parameter affine ME. The proposed GBi encoder bug fix is to separate the 4-parameter and 6-parameter affine MVs storage. The encoder stores those affine MVs based on affine model type when GBi weight is equal to ⅘, and reuse the corresponding affine MVs based on the affine model type for other GBi weights.

2.5.2 CU Size Constraint for GBi

In this method, GBi is disabled for small CUs. In inter prediction mode, if bi-prediction is used and the CU area is smaller than 128 luma samples, GBi is disabled without any signaling.

2.5.3 Merge Mode with GBi

With Merge mode, GBi index is not signaled. Instead it is inherited from the neighbouring block it is merged to. When TMVP candidate is selected, GBi is turned off in this block.

2.5.4 Affine Prediction with GBi

When the current block is coded with affine prediction, GBi can be used. For affine inter mode, GBi index is signaled. For Affine merge mode, GBi index is inherited from the neighbouring block it is merged to. If a constructed affine model is selected, GBi is turned off in this block.

2.6 Triangular Prediction Mode

The concept of the triangular prediction mode (TPM) is to introduce a new triangular partition for motion compensated prediction. As shown in FIG. 6, it splits a CU into two triangular prediction units, in either diagonal or inverse diagonal direction. Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes.

2.6.1 Uni-Prediction Candidate List for TPM

Figure 7:
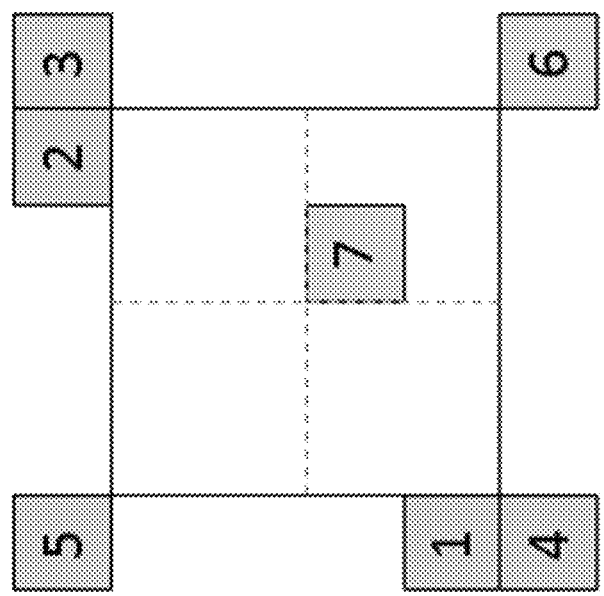
FIG. 7 shows a position of neighboring blocks.

The uni-prediction candidate list consists of five uni-prediction motion vector candidates. It is derived from seven neighboring blocks including five spatial neighboring blocks (1 to 5) and two temporal co-located blocks (6 to 7), as shown in FIG. 7. The motion vectors of the seven neighboring blocks are collected and put into the uni-prediction candidate list according in the order of uni-prediction motion vectors, L0 motion vector of bi-prediction motion vectors, L1 motion vector of bi-prediction motion vectors, and averaged motion vector of the L0 and L1 motion vectors of bi-prediction motion vectors. If the number of candidates is less than five, zero motion vector is added to the list. Motion candidates added in this list are called TPM motion candidates.

More specifically, the following steps are involved:

Obtain motion candidates from $A_1$, $B_1$, $B_0$, $A_0$, $B_2$, Col and Col2 (corresponding to block 1-7 in FIG. 8) without any pruning operations.

Set variable numCurrMergeCand=0

For each motion candidates derived from $A_1$, $B_1$, $B_0$, $A_0$, $B_2$, Col and Col2 and numCurrMergeCand is less than 5, if the motion candidate is uni-prediction (either from List 0 or List 1), it is added to the merge list with numCurrMergeCand increased by 1. Such added motion candidates are named 'originally uni-predicted candidate'.

Full Pruning is Applied.

For each motion candidates derived from $A_1$, $B_1$, $B_0$, $A_0$, $B_2$, Col and Col2 and numCurrMergeCand is less than 5, if the motion candidate is bi-prediction, the motion information from List 0 is added to the merge list (that is, modified to be uni-prediction from List 0) and numCurrMergeCand increased by 1. Such added motion candidates are named 'Truncated List0-predicted candidate'.

Full Pruning is Applied.

For each motion candidates derived from $A_1$, $B_1$, $B_0$, $A_0$, $B_2$, Col and Col2 and numCurrMergeCand is less than 5, if the motion candidate is bi-prediction, the motion information from List 1 is added to the merge list (that is, modified to be uni-prediction from List 1) and numCurrMergeCand increased by 1. Such added motion candidates are named 'Truncated List1-predicted candidate'.

Full Pruning is Applied.

For each motion candidates derived from $A_1$, $B_1$, $B_0$, $A_0$, $B_2$, Col and Col2 and numCurrMergeCand is less than 5, if the motion candidate is bi-prediction, If List 0 reference picture's slice QP is smaller than List 1 reference picture's slice QP, the motion information of List 1 is firstly scaled to List 0 reference picture, and the average of the two MVs (one is from original List 0, and the other is the scaled MV from List 1) is added to the merge list, that is averaged uni-prediction from List 0 motion candidate and numCurrMergeCand increased by 1.

Otherwise, the motion information of List 0 is firstly scaled to List 1 reference picture, and the average of the two MVs (one is from original List 1, and the other is the scaled MV from List 0) is added to the merge list, that is averaged uni-prediction from List 1 motion candidate and numCurrMergeCand increased by 1.

Full Pruning is Applied.

If numCurrMergeCand is less than 5, zero motion vector candidates are added.

2.6.1.1 Adaptive Weighting Process

After predicting each triangular prediction unit, an adaptive weighting process is applied to the diagonal edge between the two triangular prediction units to derive the final prediction for the whole CU. Two weighting factor groups are defined as follows:

1st weighting factor group: {7/8, 6/8, 4/8, 2/8, 1/8} and {7/8, 4/8, 1/8} are used for the luminance and the chrominance samples, respectively.

2nd weighting factor group: {7/8, 6/8, 5/8, 4/8, 3/8, 2/8, 1/8} and {6/8, 4/8, 2/8} are used for the luminance and the chrominance samples, respectively.

Figure 8:
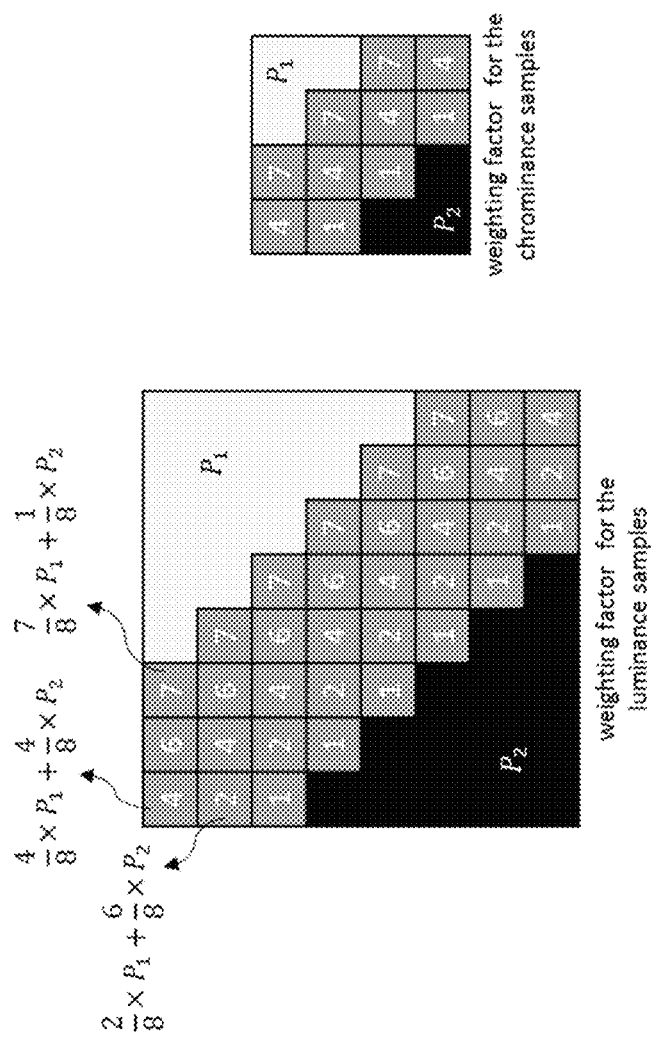
FIG. 8 shows an example of a coding unit (CU) applying a 1st weighting factor group.

Weighting factor group is selected based on the comparison of the motion vectors of two triangular prediction units. The 2nd weighting factor group is used when the reference pictures of the two triangular prediction units are different from each other or their motion vector difference is larger than 16 pixels. Otherwise, the 1st weighting factor group is used. An example is shown in FIG. 8.

2.6.1.2 Motion Vector Storage

Figure 9:
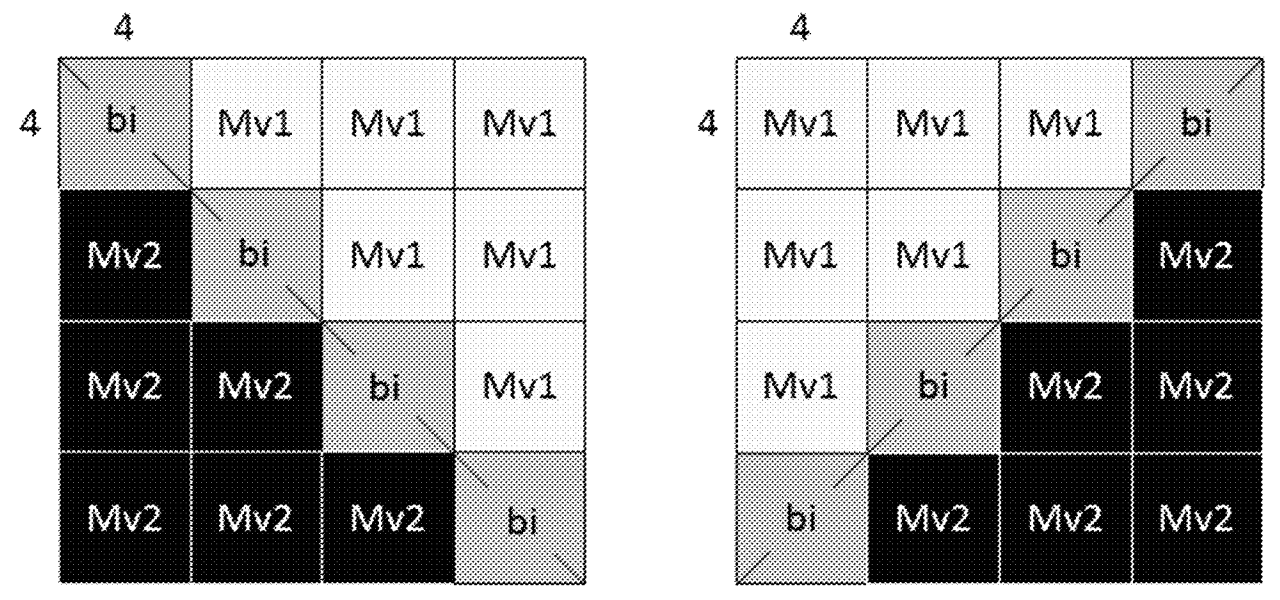

The motion vectors (Mv1 and Mv2 in FIG. 9) of the triangular prediction units are stored in 4×4 grids. For each 4×4 grid, either uni-prediction or bi-prediction motion vector is stored depending on the position of the 4×4 grid in the CU. As shown in FIG. 9, uni-prediction motion vector, either Mv1 or Mv2, is stored for the 4×4 grid located in the non-weighted area (that is, not located at the diagonal edge). On the other hand, a bi-prediction motion vector is stored for the 4×4 grid located in the weighted area. The bi-prediction motion vector is derived from Mv1 and Mv2 according to the following rules:

In the case that Mv1 and Mv2 have motion vector from different directions (L0 or L1), Mv1 and Mv2 are simply combined to form the bi-prediction motion vector.

In the case that both Mv1 and Mv2 are from the same L0 (or L1) direction,

If the reference picture of Mv2 is the same as a picture in the L1 (or L0) reference picture list, Mv2 is scaled to the picture. Mv1 and the scaled Mv2 are combined to form the bi-prediction motion vector.

If the reference picture of Mv1 is the same as a picture in the L1 (or L0) reference picture list, Mv1 is scaled to the picture. The scaled Mv1 and Mv2 are combined to form the bi-prediction motion vector.

Otherwise, only Mv1 is stored for the weighted area.

2.7 History-Based Motion Vector Prediction

Figure 10:
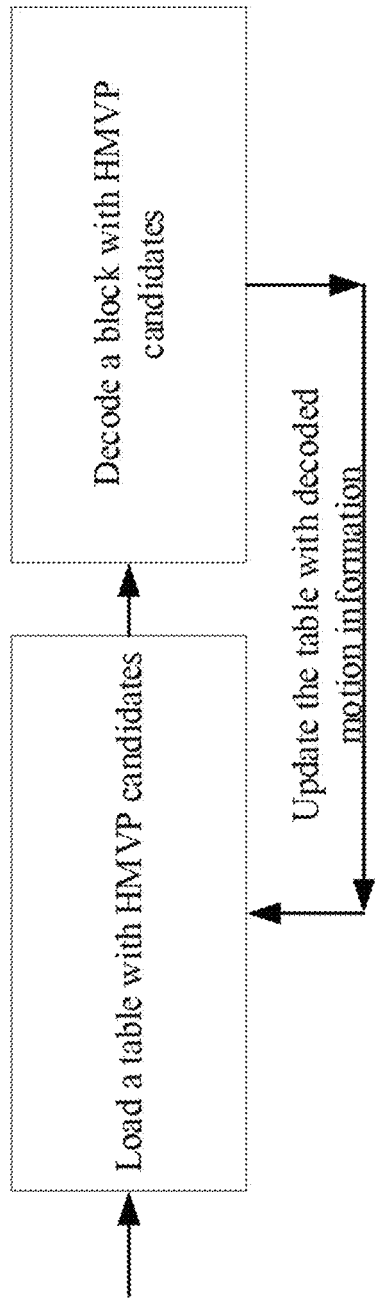
FIG. 10 shows an example of a decoding flow chart with a proposed history-based motion vector prediction (HMVP) method.
Figure 11:
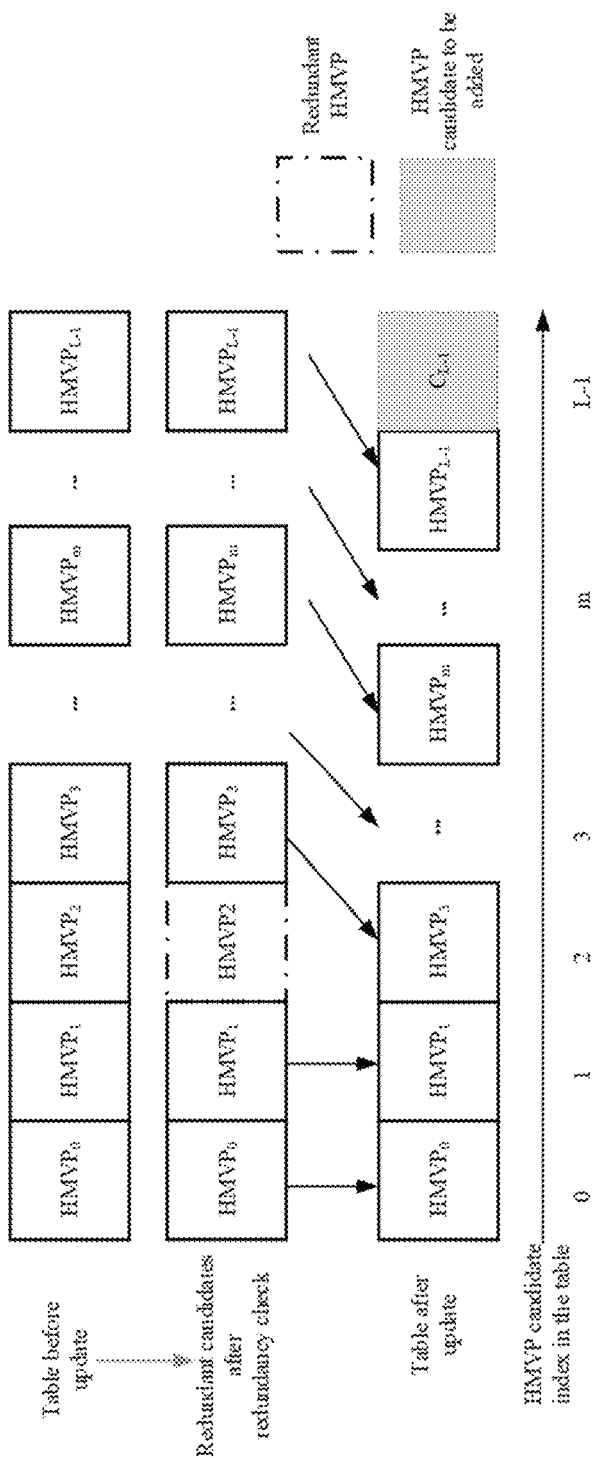
FIG. 11 shows an example of updating a table in a HMVP method.

A history-based MVP (HMVP) method is proposed wherein a HMVP candidate is defined as the motion information of a previously coded block. A table with multiple HMVP candidates is maintained during the encoding/decoding process. The table is emptied when a new slice is encountered. Whenever there is an inter-coded non-affine block, the associated motion information is added to the last entry of the table as a new HMVP candidate. The overall coding flow is depicted in FIG. 10 and FIG. 11.

In this contribution, the table size S is set to be 6, which indicates up to 6 HMVP candidates may be added to the table. When inserting a new motion candidate to the table, a constrained FIFO rule is utilized wherein redundancy check is firstly applied to find whether there is an identical HMVP in the table. If found, the identical HMVP is removed from the table and all the HMVP candidates afterwards are moved forward, i.e., with indices reduced by 1.

HMVP candidates could be used in the merge candidate list construction process. The latest several HMVP candidates in the table are checked in order and inserted to the candidate list after the TMVP candidate. Pruning is applied on the HMVP candidates to the spatial or temporal merge candidate excluding sub-block motion candidate (i.e., ATMVP).

To reduce the number of pruning operations, three simplifications are introduced:

Number of HMPV candidates to be check denoted by L is set as follows:

$$L=(N<=4)?M:(8-N) \qquad (1)$$

wherein N indicates number of available non-sub block merge candidate and M indicates number of available HMVP candidates in the table.

In addition, once the total number of available merge candidates reaches the signaled maximally allowed merge candidates minus 1, the merge candidate list construction process from HMVP list is terminated.

Moreover, the number of pairs for combined bi-predictive merge candidate derivation is reduced from 12 to 6.

Similarly, HMVP candidates could also be used in the AMVP candidate list construction process. The motion vectors of the last K HMVP candidates in the table are inserted after the TMVP candidate. Only HMVP candidates with the same reference picture as the AMVP target reference picture are used to construct the AMVP candidate list. Pruning is applied on the HMVP candidates. In this contribution, K is set to 4 while the AMVP list size is kept unchanged, i.e., equal to 2.

2.8 Ultimate Motion Vector Expression (UMVE)

In this contribution, ultimate motion vector expression (UMVE) is presented. UMVE is also known as Merge with MVD (MMVD) in VVC. UMVE is used for either skip or merge modes with a proposed motion vector expression method.

UMVE re-uses merge candidate as same as using in VVC. Among the merge candidates, a candidate can be selected, and is further expanded by the proposed motion vector expression method.

UMVE provides a new motion vector expression with simplified signaling. The expression method includes starting point, motion magnitude, and motion direction.

Figure 12:
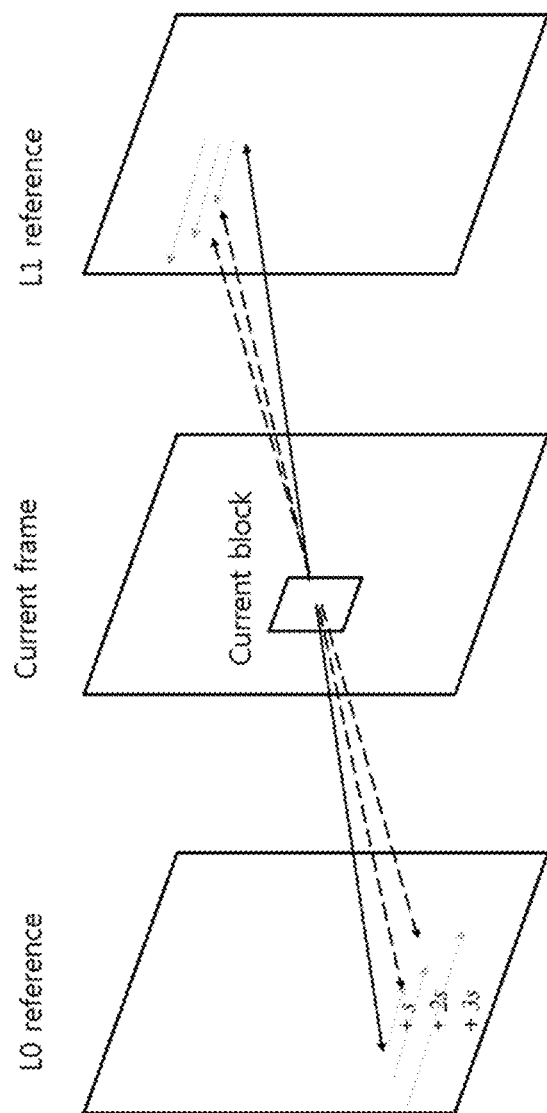
FIG. 12 shows an example of an ultimate motion vector expression (UMVE) search process.
Figure 13:
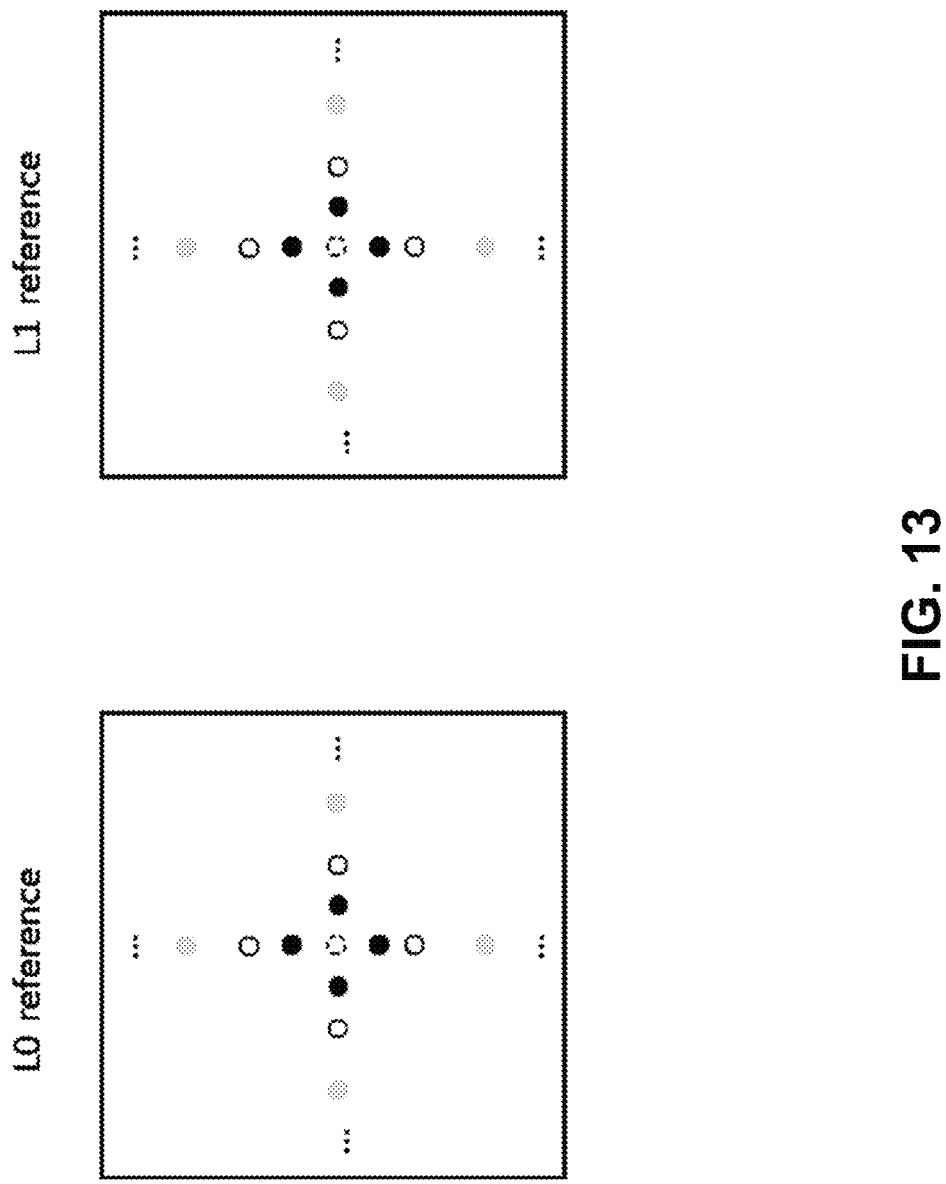
FIG. 13 shows an example of a UMVE search point.

FIG. 12 shows an example of a UMVE search process. FIG. 13 shows an example of a UMVE search point.

This proposed technique uses a merge candidate list as it is. But only candidates which are default merge type (MRG_TYPE_DEFAULT_N) are considered for UMVE's expansion.

Base candidate index defines the starting point. Base candidate index indicates the best candidate among candidates in the list as follows.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, Base candidate IDX is not signaled.

Distance index is motion magnitude information. Distance index indicates the pre-defined distance from the starting point information. Pre-defined distance is as follows:

TABLE 2

| Distance IDX | | | | | | | | |
|---|---|---|---|---|---|---|---|---|
| Distance IDX | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

Direction index represents the direction of the MVD relative to the starting point. The direction index can represent of the four directions as shown below.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

UMVE flag is signalled right after sending a skip flag and merge flag. If skip and merge flag is true, UMVE flag is parsed. If UMVE flag is equal to 1, UMVE syntaxes are parsed. But, if not 1, AFFINE flag is parsed. If AFFINE flag is equal to 1, that is AFFINE mode, But, if not 1, skip/merge index is parsed for VTM's skip/merge mode.

Additional line buffer due to UMVE candidates is not needed. Because a skip/merge candidate of software is directly used as a base candidate. Using input UMVE index, the supplement of MV is decided right before motion compensation. There is no need to hold long line buffer for this.

2.9 Inter-Intra Mode

With inter-intra mode, multi-hypothesis prediction combines one intra prediction and one merge indexed prediction. In a merge CU, one flag is signaled for merge mode to select an intra mode from an intra candidate list when the flag is true. For luma component, the intra candidate list is derived from 4 intra prediction modes including DC, planar, horizontal, and vertical modes, and the size of the intra candidate list can be 3 or 4 depending on the block shape. When the CU width is larger than the double of CU height, horizontal mode is exclusive of the intra mode list and when the CU height is larger than the double of CU width, vertical mode is removed from the intra mode list. One intra prediction mode selected by the intra mode index and one merge indexed prediction selected by the merge index are combined using weighted average. For chroma component, DM is always applied without extra signaling. The weights for combining predictions are described as follow. When DC or planar mode is selected or the CB width or height is smaller than 4, equal weights are applied. For those CBs with CB width and height larger than or equal to 4, when horizontal/vertical mode is selected, one CB is first vertically/horizontally split into four equal-area regions. Each weight set, denoted as (w_intrai, w_interi), where i is from 1 to 4 and (w_intra1, w_inter1)=(6, 2), (w_intra2, w_inter2)=(5, 3), (w_intra3, w_inter3)=(3, 5), and (w_intra4, w_inter4)=(2, 6), will be applied to a corresponding region. (w_intra1, w_inter1) is for the region closest to the reference samples and (w_intra4, w_inter4) is for the region farthest away from the reference samples. Then, the combined prediction can be calculated by summing up the two weighted predictions and right-shifting 3 bits. Moreover, the intra prediction mode for the intra hypothesis of predictors can be saved for reference of the following neighboring CUs.

2.10 Affine Merge Mode with Prediction Offsets

The proposed method selects the first available affine merge candidate as a base predictor. Then it applies a motion vector offset to each control point's motion vector value from the base predictor. If there's no affine merge candidate available, this proposed method will not be used.

The selected base predictor's inter prediction direction, and the reference index of each direction is used without change.

In the current implementation, the current block's affine model is assumed to be a 4-parameter model, only 2 control points need to be derived. Thus, only the first 2 control points of the base predictor will be used as control point predictors.

For each control point, a zero_MVD flag is used to indicate whether the control point of current block has the same MV value as the corresponding control point predictor. If zero_MVD flag is true, there's no other signaling needed for the control point. Otherwise, a distance index and an offset direction index is signaled for the control point.

Figure 14:
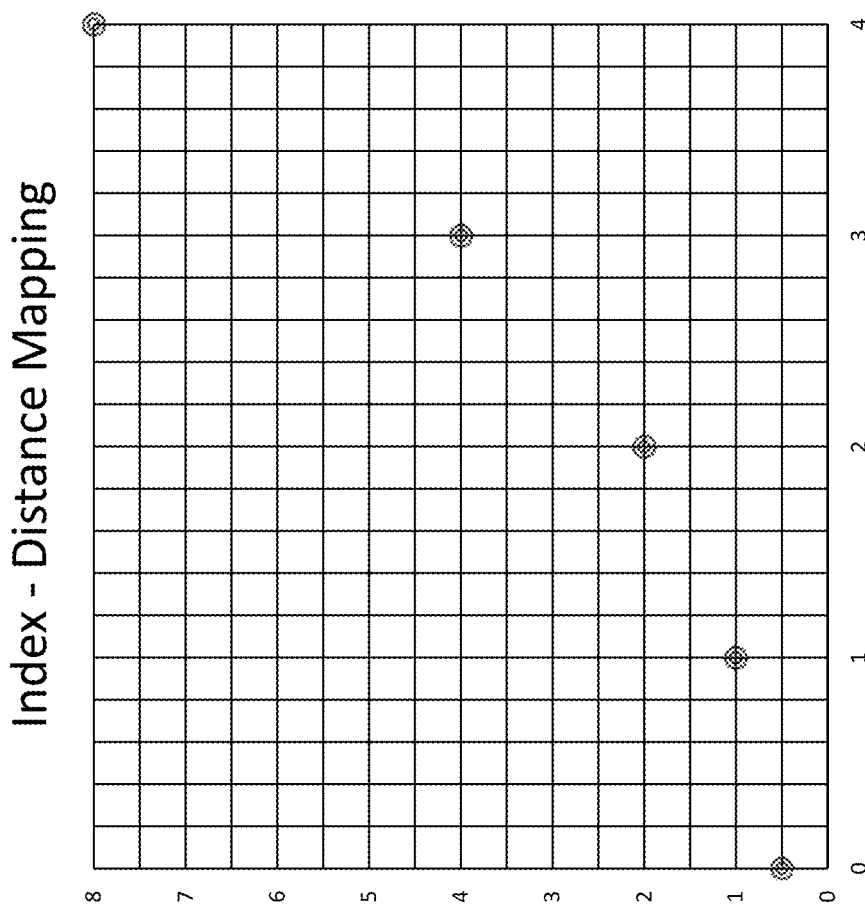
FIG. 14 shows an example of a distance index and distance offset mapping.

A distance offset table with size of 5 is used as shown in the table below. Distance index is signaled to indicate which distance offset to use. The mapping of distance index and distance offset values is shown in FIG. 14.

TABLE 1

| Distance offset table | | | | | |
|---|---|---|---|---|---|
| Distance IDX | 0 | 1 | 2 | 3 | 4 |
| Distance-offset | 1/2-pel | 1-pel | 2-pel | 4-pel | 8-pel |

The direction index can represent four directions as shown below, where only x or y direction may have an MV difference, but not in both directions.

| Offset Direction IDX | 00 | 01 | 10 | 11 |
|---|---|---|---|---|
| x-dir-factor | +1 | −1 | 0 | 0 |
| y-dir-factor | 0 | 0 | +1 | −1 |

If the inter prediction is uni-prediction, the signaled distance offset is applied on the offset direction for each control point predictor. Results will be the MV value of each control point.

For example, when base predictor is uni-prediction, and the motion vector values of a control point is MVP (vpx, vpy). When distance offset and direction index are signaled, the motion vectors of current block's corresponding control points will be calculated as below.

$$MV(vx,vy)=MVP(vpx,vpy)+MV(x\text{-dir-factor}*\text{distance-offset},y\text{-dir-factor}*\text{distance-offset});$$

If the inter prediction is bi-prediction, the signaled distance offset is applied on the signaled offset direction for control point predictor's L0 motion vector; and the same distance offset with opposite direction is applied for control point predictor's L1 motion vector. Results will be the MV values of each control point, on each inter prediction direction.

For example, when base predictor is bi-prediction, and the motion vector values of a control point on L0 is MVPL0 (v0px, v0py), and the motion vector of that control point on L1 is MVPL1 (v1px, v1py). When distance offset and direction index are signaled, the motion vectors of current block's corresponding control points will be calculated as below.

$$MVL0(v0x,v0y)=MVPL0(v0px,v0py)+MV(x\text{-dir-factor}*\text{distance-offset},y\text{-dir-factor}*\text{distance-offset});$$

$$MVL1(v0x,v0y)=MVPL1(v0px,v0py)+MV(-x\text{-dir-factor}*\text{distance-offset},-y\text{-dir-factor}*\text{distance-offset});$$

A simplified method is proposed to reduce the signaling overhead by signaling the distance offset index and the offset direction index per block. The same offset will be applied to all available control points in the same way. In this method, the number of control points is determined by the base predictor's affine type, 3 control points for 6-parameter type, and 2 control points for 4-parameter type. The distance offset table and the offset direction tables are the same as in 2.1.

Since the signaling is done for all the control points of the block at once, the zero_MVD flag is not used in this method.

2.11 Representation of Affine Motion Data in P1809115501

In P1809115501, it is proposed that the affine parameters instead of CPMVs are stored to predict the affine model of following coded blocks.

2.12 Merge List Design

There are three different merge list construction processes supported in VVC:

Sub-block merge candidate list: it includes ATMVP and affine merge candidates. One merge list construction process is shared for both affine modes and ATMVP mode. Here, the ATMVP and affine merge candidates may be added in order. Sub-block merge list size is signaled in slice header, and maximum value is 5.

Uni-Prediction TPM merge list: For triangular prediction mode, one merge list construction process for the two partitions is shared even two partitions could select their own merge candidate index. When constructing this merge list, the spatial neighbouring blocks and two temporal blocks of the block are checked. The motion information derived from spatial neighbours and temporal blocks are called regular motion candidates in our IDF. These regular motion candidates are further utilized to derive multiple TPM candidates. Please note the transform is performed in the whole block level, even two partitions may use different motion vectors for generating their own prediction blocks.

Uni-Prediction TPM merge list size is fixed to be 5.

Regular merge list: For remaining coding blocks, one merge list construction process is shared. Here, the spatial/temporal/HMVP, pairwise combined bi-prediction merge candidates and zero motion candidates may be inserted in order. Regular merge list size is signaled in slice header, and maximum value is 6.

2.12.1 Sub-Block Merge Candidate List

It is suggested that all the sub-block related motion candidates are put in a separate merge list in addition to the regular merge list for non-sub block merge candidates.

The sub-block related motion candidates are put in a separate merge list is named as 'sub-block merge candidate list'.

In one example, the sub-block merge candidate list includes affine merge candidates, and ATMVP candidate, and/or sub-block based STMVP candidate.

2.12.2 Affine Merge Candidate List

In this contribution, the ATMVP merge candidate in the normal merge list is moved to the first position of the affine merge list. Such that all the merge candidates in the new list (i.e., sub-block based merge candidate list) are based on sub-block coding tools.

An affine merge candidate list is constructed with following steps:

Insert inherited affine candidates

Inherited affine candidate means that the candidate is derived from the affine motion model of its valid neighbor affine coded block. The maximum two inherited affine candidates are derived from affine motion model of the neighboring blocks and inserted into the candidate list. For the left predictor, the scan order is {A0, A1}; for the above predictor, the scan order is {B0, B1, B2}.

Insert constructed affine candidates

If the number of candidates in affine merge candidate list is less than MaxNumAffineCand (set to 5), constructed affine candidates are inserted into the candidate list. Constructed affine candidate means the candidate is constructed by combining the neighbor motion information of each control point.

The motion information for the control points is derived firstly from the specified spatial neighbors and temporal neighbor shown in FIG. 5. CPk (k=1, 2, 3, 4) represents the k-th control point. A0, A1, A2, B0, B1, B2 and B3 are spatial positions for predicting CPk (k=1, 2, 3); T is temporal position for predicting CP4.

The coordinates of CP1, CP2, CP3 and CP4 is (0, 0), (W, 0), (H, 0) and (W, H), respectively, where W and H are the width and height of current block.

The motion information of each control point is obtained according to the following priority order:

For CP1, the checking priority is B2->B3->A2. B2 is used if it is available. Otherwise, if B2 is available, B3 is used. If both B2 and B3 are unavailable, A2 is used. If all the three candidates are unavailable, the motion information of CP1 cannot be obtained.

For CP2, the checking priority is B1->B0.
For CP3, the checking priority is A1->A0.
For CP4, T is used.

Secondly, the combinations of controls points are used to construct an affine merge candidate.

Motion information of three control points are needed to construct a 6-parameter affine candidate. The three control points can be selected from one of the following four combinations ({CP1, CP2, CP4}, {CP1, CP2, CP3}, {CP2, CP3, CP4}, {CP1, CP3, CP4}). Combinations {CP1, CP2, CP3}, {CP2, CP3, CP4}, {CP1, CP3, CP4} will be converted to a 6-parameter motion model represented by top-left, top-right and bottom-left control points.

Motion information of two control points are needed to construct a 4-parameter affine candidate. The two control points can be selected from one of the two combinations ({CP1, CP2}, {CP1, CP3}). The two combinations will be converted to a 4-parameter motion model represented by top-left and top-right control points.

The combinations of constructed affine candidates are inserted into to candidate list as following order:
{CP1, CP2, CP3}, {CP1, CP2, CP4}, {CP1, CP3, CP4}, {CP2, CP3, CP4}, {CP1, CP2}, {CP1, CP3}

The available combination of motion information of CPs is only added to the affine merge list when the CPs have the same reference index.

Padding with zero motion vectors

If the number of candidates in affine merge candidate list is less than 5, zero motion vectors with zero reference indices are insert into the candidate list, until the list is full.

Shared Merge List

It is proposed that it is proposed to share the same merging candidate list for all leaf CUs of one ancestor node in the CU split tree for enabling parallel processing of small skip/merge-coded CUs. The ancestor node is named merge sharing node. The shared merging candidate list is generated at the merge sharing node pretending the merge sharing node is a leaf CU.

3. Examples of Problems Solved by Embodiments

How to harmonize the affine prediction with other new coding tools such as HMVP is still unclear.

4. Examples of Embodiments

In this document, we propose to methods to control the bandwidth required by affine prediction in a more flexible way. We also propose to harmonize affine prediction with other coding tools.

The detailed techniques below should be considered as examples to explain general concepts. These techniques should not be interpreted in a narrow way. Furthermore, these techniques can be combined in any manner. Combination between these techniques and other techniques is also applicable.

In the discussions below, suppose the coordinate of the top-left corner/top-right corner/bottom-left corner/bottom-right corner of a neighboring block (e.g., above or left neighbouring CU) of current block are (LTNx, LTNy)/(RTNx, RTNy)/(LBNx, LBNy)/(RBNx, RBNy), respectively; the coordinate of the top-left corner/top-right corner/ bottom-left corner/bottom-right corner of the current CU are (LTCx, LTCy)/(RTCx, RTCy)/(LBCx, LBCy)/(RBCx, RBCy), respectively; the width and height of the affine coded above or left neighbouring CU are w' and h', respectively; the width and height of the affine coded current CU are w and h, respectively.

The CPMVs of the top-left corner, the top-right corner and the bottom-left corner are denoted as $MV0=(MV_0x, MV_0y)$, $MV_1=(MV_1x, MV_1y)$ and $MV_2=(MV_2x, MV_2y)$, respectively.

In the following discussion, SignShift(x,n) is defined as $$SignShift(x, n) = \begin{cases} (x + \text{offset0}) >> n & \text{if } x \geq 0 \\ -((-x + \text{offset1}) >> n) & \text{if } x < 0 \end{cases}$$

In one example, offset0 and offset1 are set to be (1<<(n−1)). In another example, they are set to be 0.

Shift is defined as

Shift(x,n)=(x+offset)>>n,

In one example, offset is set to be (1<<(n−1)). In another example, it is set to be 0.

Clip3(min, max, x) is defined as $$Clip3(Min, Max, x) = \begin{cases} Min & \text{if } x < Min \\ Max & \text{if } x > Max \\ x & \text{Otherwise} \end{cases}$$

It also should be noted that, the term "affine merge candidate list" may be renamed (e.g. "sub-block merge candidate list") when other kinds of sub-block merge candidate such as ATMVP candidate is also put into the list or other kinds of merge list which may include at least one affine merge candidate.

The proposed techniques may be also applicable to other kinds of motion candidate list, such as affine AMVP candidate list.

History-Based Affine Parameters Inheritance

1. The parameters a, b, c, d, e and f defined in Eq(2) for an affine-coded block may be stored in a buffer (the buffer may be a table, or lookup table, or a First-In-First-Out (FIFO) table, or a stack, or a queue, or a list, or a link, or an array, or any other storage with any data structure) or constrained FIFO table wherein each affine model is unique. In the following discussion, one entry in the buffer is denoted as H[i], where i is the index referring to the entry.
   a. Alternatively, a, b, c and d defined in Eq(2) may be stored in the buffer; In this case, e and f are not stored any more.
   b. Alternatively, a and b defined in Eq(1) may be stored in the buffer if it is coded with the 4-parameter affine mode;
   c. Alternatively, a, b, e and f defined in Eq(1) may be stored in the buffer if it is coded with the 4-parameter affine mode;
   d. The parameters a, b, c, d, e and f defined in Eq(2) are always stored in the buffer, but it is restricted that c=−b, d=a, if it is coded with 4-parameter affine mode.
   e. The parameters a, b, c and d defined in Eq(2) are always stored in the buffer, but it is restricted that c=−b, d=a, if it is coded with 4-parameter affine mode.
   f. Same number of parameters may be stored for 4-parameter and 6-parameter affine models, for example, a, b, c, d, e and f are stored. In another example, a, b, c and d are stored.

g. Alternatively, different number of parameters may be store for 4-parameter and 6-parameter affine models, and affine model type (i.e., 4-parameter or 6-parameter) may be store as well.
h. Which parameters to be stored in the buffer may depend on the affine modes, inter or merge mode, block size, picture type, etc. al.
i. Side information associated with the affine parameters may also be stored in the buffer together with the affine parameters, such as inter prediction direction (list 0 or list 1, or Bi), and reference index for list 0 and/or list 1. In this disclosure, the associated side information may also be included when we talk about a set of affine parameters stored in the buffer.
  i. If the affined-coded block is bi-predicted, then the set of affine parameters to be stored include the parameters used for list 0 as well as the parameters used for list 1.
    (a) The parameters for the two reference lists (List0 and List1) are both stored.
    (b) In one example, the parameters for the two reference lists are stored independently (in two different buffers);
    (c) Alternatively, the parameters for the two reference lists can be stored with prediction from one to the other.
j. As an alternative storing method, CPMVs $\{MV_0, MV_1\}$ or $\{MV_0, MV_1, MV_2\}$ of an affine-coded block are stored in the buffer instead of the parameters. The parameters for coding a new block can be calculated from $\{MV_0, MV_1\}$ or $\{MV_0, MV_1, MV_2\}$ when needed.
  i. The width of the affine coded block may be stored in the buffer with the CPMVs.
  ii. The height of the affine coded block may be stored in the buffer with the CPMVs.
  iii. The top-left coordinate of the affine coded block may be stored in the buffer with the CPMVs.
k. In one example, the base MV $(mv_0^h, mv_0^v)$ in Eq (1) is stored with parameters a and b.
  i. In one example, the coordinate of the position where the base MV locates at is also stored with the parameters a and b.
l. In one example, the base MV $(mv_0^h, mv_0^v)$ in Eq (2) is stored with parameters a, b, c and d.
  i. In one example, the coordinate of the position where the base MV locates at is also stored with the parameters a, b c and d.
m. In one example, a set of stored parameters and their base MV should refer to the same reference picture if they refer to the same reference picture list.
n. The buffer used to store the coded/decoded affine related information, such as CPMVs, affine parameters, base point position coordinates, block width and height, is also called "affine HMVP buffer" in this document.

2. In one example, the parameters to be stored in the buffer can be calculated as below $$a = \frac{(mv_1^h - mv_0^h)}{w} \quad \text{a.}$$

$$b = \frac{(mv_1^v - mv_0^v)}{w} \quad \text{b.}$$

-continued $$c = \frac{(mv_2^h - mv_0^h)}{h} \quad \text{c.}$$

$$d = \frac{(mv_2^v - mv_0^v)}{h} \quad \text{d.}$$

$$c = -b \text{ for 4-parameter affine prediction} \quad \text{e.}$$

$$d = a \text{ for 4-parameter affine prediction} \quad \text{f.}$$

$$e = mv_0^h. \quad \text{g.}$$

$$f = mv_0^v. \quad \text{h.}$$

i. (e, f)=(mvx, mvy), where (mvx, mvy) can be any MV used for coding one block.
3. It is proposed to calculate affine model parameters without division operations. Suppose the width and height of the current block noted as w and h are equal to $2^{WB}$ and $2^{HB}$. P is an integer number defining the calculation precision, e.g., P is set to 7.

$$a = \text{SignShift}(P \cdot (mv_1^h - mv_0^h), WB) \quad \text{a.}$$

$$b = \text{SignShift}(P \cdot (mv_1^v - mv_0^v), WB) \quad \text{b.}$$

$$c = \text{SignShift}(P \cdot (mv_2^h - mv_0^h), HB) \quad \text{c.}$$

$$d = \text{SignShift}(P \cdot (mv_2^v - mv_0^v), HB) \quad \text{d.}$$

4. The affine model parameters may be further clipped before being stored in the buffer.
  a. In one example, suppose a parameter x (e.g. x=a or b or c or d) is stored with K bits, then x=Clip3($-2^{K-1}$, $2^{K-1}-1$, x).
  b. For example, a=Clip(−128, 127, a), then a is stored as a 8 bit signed integer.
5. The affine model parameters may be clipped before being used for coding/decoding affine-coded blocks (such as, to derive MVs for sub-blocks).
  a. In one example, a=Clip3(Min_a, Max_a, a), b=Clip3(Min_b, Max_b, b), c=Clip3(Min_c, Max_c, c), d=Clip3(Min_d, Max_d, d) wherein Min_a/b/c/d and Max_a/b/c/d are called clipping boundaries.
  b. In one example, the clipping boundaries may depend on the precision (e.g., bit-depth) of affine parameters.
  c. In one example, the clipping boundaries may depend on width and height of the block.
  d. In one example, the clipping boundaries may be signaled such as in VPS/SPS/PPS/picture header/slice header/tile group header.
  e. In one example, the clipping boundaries may depend on the profile or/and level of a standard.
6. The affine model parameters of each affine-coded block may be stored in the buffer after decoding or encoding that block.
  a. Whether to store the affine model parameters of an affine-coded block may depend on the coded affine mode (e.g., affine AMVP, or affine merge), number of affine-coded blocks, positions of the affine-coded block, block dimension etc. al.
  b. In one example, the affine model parameters of the every Kth affine-coded block are stored in the buffer after decoding or encoding every K affine-coded blocks. That is, the affine model parameters of every first, second, . . . . (K−1)th affine-coded blocks are not stored in the buffer.
  i. K is a number such as 2 or 4.
  ii. K may be signaled from the encoder to the decoder in VPS/SPS/PPS/Slice header/tile group head/tile.
7. The buffer for storing the affine parameters may have a maximum capacity.
  a. The buffer may at most store M sets of affine parameters, i.e., for H[i], i>=0 and i<M.
    i. M is an integer such as 8 or 16.
    ii. M may be signaled from the encoder to the decoder in VPS/SPS/PPS/Slice header/tile group head/tile/CTU line/CTU.
    iii. M may be different for different standard profiles/levels/tiers.
8. When the buffer for affine parameter storage is not full, (i.e., the number of stored sets of affine parameters S is smaller than the maximum capacity M), and a new set of affine parameters need to be stored into the buffer, H[S−1] is used to store the new parameters and then S=S+1.
9. When the buffer is full (i.e., the number of stored sets of affine parameters S is equal to the maximum capacity M), and a new set of affine parameters needs to be stored into the buffer, one or some strategies as below can be done:
  a. The new set of affine parameters cannot be stored into the buffer;
  b. One entry already in the buffer is removed and the new set of affine parameters is stored into the buffer.
    i. In one example, the earliest entry stored in the buffer, e.g. H[0] is removed from the buffer.
    ii. In one example, the last entry stored in the buffer, e.g. H[M−1] is removed from the buffer.
    iii. In one example, any entry stored in the buffer, e.g. H[T] is removed from the buffer, T>=0 and T<M.
    iv. If H[T] is removed, the new set of affine parameters is stored as H[T].
    v. If H[T] is removed, all entries after H[T] are moving forward. For example, H[X]=H[X+1] for X from T to M−1 in an ascending order. Then the new set of affine parameters is put to the last entry in the buffer, e.g. H[M−1];
    vi. If H[T] is removed, all entries before H[T] are moving backward. For example, H[X]=H[X−1] for X from T to 1 in a descending order. Then the new set of affine parameters is put to the first entry in the buffer, e.g. H[0];
10. When a new set of affine parameters needs to be stored into the buffer, it may be compared to all or some sets of affine parameters already in the buffer. If it is judged to be same or similar to at least one set of affine parameters already in the buffer, it should not be stored into the buffer. This procedure is known as "pruning".
  a. For one reference picture list (one prediction direction), the affine parameters { a, b, c, d} or {a, b, c, d, e, f} and affine parameters {a', b', c', d'} or {a', b', c', d', e', f'} are considered to be same or similar if
    i. a==a' in one example.
    ii. b==b' in one example.
    iii. c==c' in one example.
    iv. d==d' in one example.
    v. a==a' and b==b' in one example.
    vi. c==c' and d==d' in one example.
    vii. a==a' and b==b' and c==c' in one example.
    viii. a==a' and b==b' and c==c' and d==d' in one example.
    ix. |a-a'|<delta0 in one example.
    x. |b-b'|<delta0 in one example.
    xi. |c-c'|<delta0 in one example.
    xii. |d-d'|<delta0 in one example.
    xiii. |a-a'|<delta0 and |b-b'|<delta1 in one example.
    xiv. |c-c'|<delta0 and |d-d'|<delta1 in one example.
    xv. |a-a'|<delta0 and |b-b'|21 delta1 and |c-c'|<delta2 in one example.
    xvi. |a-a'|<delta0 and |b-b'|<delta1 and |c-c'|<delta2 and |d-d'|<delta3 in one example.
    xvii. Variables (e.g., delta0, delta1, delta2, delta3) may be a predefined number, or it may depend on coding information such as block width/height. It may be different for different standard profiles/levels/tiers. It may be signaled from the encoder to the decoder in VPS/SPS/PPS/Slice header/tile group head/tile/CTU line/CTU.
  b. Two sets of affine parameters are considered not to be the same or similar if
    i. They are associated with different inter prediction direction (list 0 or list 1, or Bi),
    ii. They are associated with different reference indices for list 0 when list 0 is one prediction direction in use.
    iii. They are associated with different reference indices for list 1 when list 1 is one prediction direction in use.
    iv. They have different number of affine parameters or they use different affine models.
  c. If two sets of affine parameters are both associated from bi-prediction, they are judged to be identical (or similar) if parameters for list 0 are judged to be identical (or similar) and parameters for list 1 are also judged to be identical (or similar).
  d. A new set of affine parameters may be compared to each set of affine parameters already in the buffer.
    i. Alternatively, the new set of affine parameters is only compared to some sets of affine parameters already in the buffer. For example, it is compared to the first W entries, e.g. H[0] . . . H[W−1]. In another example, it is compared to the last W entries, e.g. H[M-W], H[M−1]. In another example, it is compared to one entry in each W entries, e.g. H[0], H[W], H[2*W] . . . .
  e. If one entry in the buffer, denoted as H[T] is found identical or similar to the new set of affine parameters needs to be stored into the buffer, then
    i. H[T] is removed, then the new set of affine parameters is stored as H[T].
    ii. H[T] is removed, then all entries after H[T] are moving forward. For example, H[X]=H[X+1] for X from T to M−1 in an ascending order. Then the new set of affine parameters is put to the last entry in the buffer, e.g. H[M−1].
    iii. H[T] is removed then all entries before H[T] are moving backward. For example, H[X]=H[X−1] for X from T to 1 in a descending order. Then the new set of affine parameters is put to the first entry in the buffer, e.g. H[0].
11. The buffer storing the affine parameters may be refreshed.
  a. The buffer is emptied when being refreshed.
  b. The buffer is emptied when being refreshed, then one or more default affine parameters are put into the buffer when being refreshed.

i. The default affine parameters can be different for different sequences;
ii. The default affine parameters can be different for different pictures;
iii. The default affine parameters can be different for different slices;
iv. The default affine parameters can be different for different tiles;
v. The default affine parameters can be different for different CTU (a.k.a LCU) lines;
vi. The default affine parameters can be different for different CTUs;
vii. The default affine parameters can be signaled from the encoder to the decoder in VPS/SPS/PPS/Slice header/tile group head/tile/CTU line/CTU.
c. The buffer is refreshed when
i. starting coding/decoding the first block of a picture;
ii. starting coding/decoding the first block of a slice;
iii. starting coding/decoding the first block of a tile;
iv. starting coding/decoding the first block of a CTU (a.k.a LCU) line;
v. starting coding/decoding the first block of a CTU;

12. The affine model parameters stored in the buffer may be used to derive the affine prediction of a current block.
a. In one example, the parameters stored in the buffer may be utilized for motion vector prediction or motion vector coding of current block.
b. In one example, the parameters stored in the buffer may be used to derive the control point MVs (CPMVs) of the current affine-coded block.
c. In one example, the parameters stored in the buffer may be used to derive the MVs used in motion compensation for sub-blocks of the current affine-coded block.
d. In one example, the parameters stored in the buffer may be used to derive the prediction for CPMVs of the current affine-coded block. This prediction for CPMVs can be used to predict the CPMVs of the current block when CPMVs need to be coded.
i. In one example, if current block is coded with 4-parameter affine model, then, higher priority is assigned to 4-parameter affine model and lower priority is assigned to 6-parameter affine model.
ii. In one example, if current block is coded with 6-parameter affine model, then, higher priority is assigned to 6-parameter affine model and lower priority is assigned to 4-parameter affine model.

Figure 15:
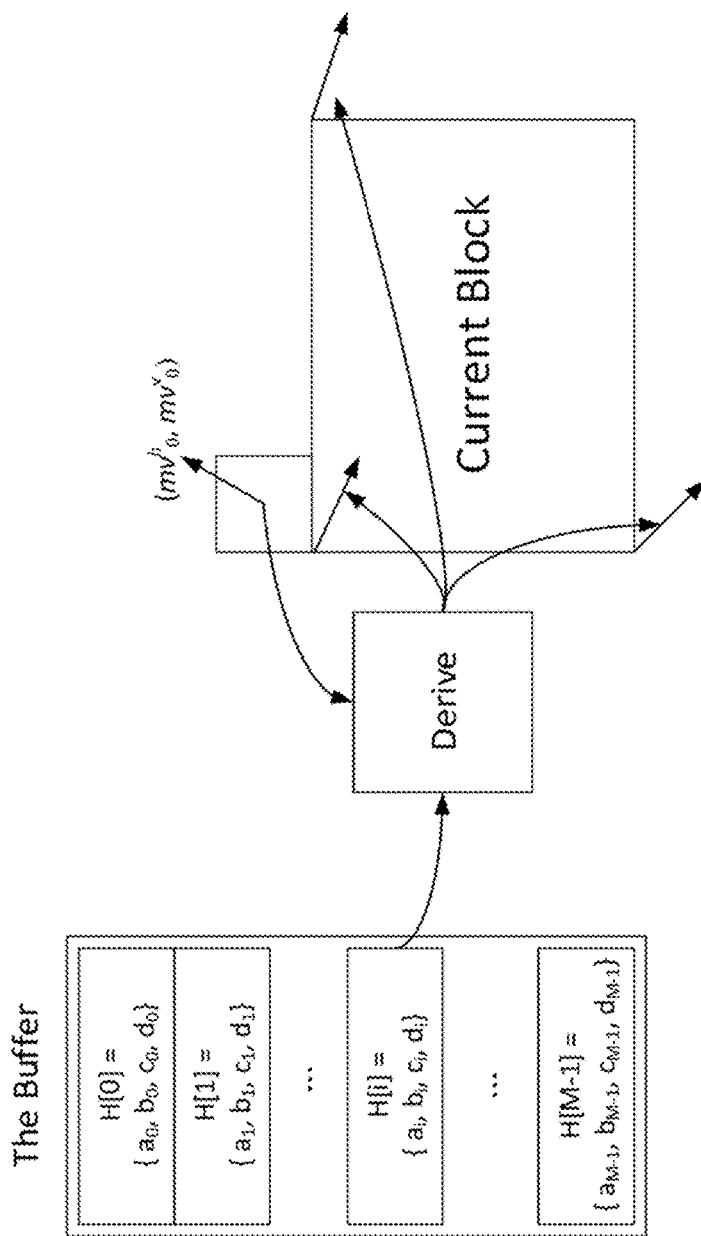
FIG. 15 shows an example of deriving CPMVs from a motion vector (MV) of a neighboring block and a set of parameters stored in a buffer.

13. The motion information of a neighbouring M×N unit block (e.g. 4×4 block in VTM) and a set of affine parameters stored in the buffer may be used together to derive the affine model of the current block. For example, they can be used to derive the CPMVs or the MVs of sub-blocks used in motion compensation as shown in FIG. 15
a. Suppose the MV stored in the unit block is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is w and h, then
i. To derive a CPMV, $(x, y)$ can be $(x0', y0')$, or $(x0'+w, y0')$, or $(x0', y0'+h)$, or $(x0'+w, y0'+h)$.
ii. To derive a MV for a sub-block of the current block, $(x, y)$ can be the center of the sub-block. Suppose $(x00, y00)$ is the top-left position of a sub-block, the sub-block size is M×N, then
(a) xm=x00+M/2, ym=y00+N/2;
(b) xm=x00+M/2−1, ym=y00+N/2−1;
(c) xm=x00+M/2−1, ym=y00+N/2;
(d) xm=x00+M/2, ym=y00+N/2−1;
iii. In one example, $$\begin{cases} mv^h(x, y) = a(x-xm) - b(y-ym) + mv^h_0 \\ mv^v(x, y) = b(x-xm) + a(y-ym) + mv^v_0 \end{cases}$$

if the parameters in the buffer come from a block coded with the 4-parameter affine mode.
iv. In one example, $$\begin{cases} mv^h(x, y) = ax + cy + mv^h_0 \\ mv^v(x, y) = bx + dy + mv^v_0 \end{cases}$$

if the parameters in the buffer come from a block coded with the 6-parameter affine mode.
v. In one example, $$\begin{cases} mv^h(x, y) = ax + cy + mv^h_0 \\ mv^v(x, y) = bx + dy + mv^v_0 \end{cases}$$

no matter the parameters in the buffer come from a block coded with the 4-parameter affine mode or the 6-parameter affine mode.
b. In one example, CPMVs of the current block are derived from the motion vector and parameters stored in the buffer, and these CPMVs serves as MVPs for the signaled CPMVs of the current block.
c. In one example, CPMVs of the current block are derived from the motion vector and parameters stored in the buffer, and these CPMVs are used to derive the MVs of each sub-block used for motion compensation.
d. In one example, the MVs of each sub-block used for motion compensation are derived from the motion vector and parameters stored in a neighbouring block, if the current block is affine merge coded.
e. In one example, the motion vector of a neighbouring unit block and the set of parameters used to derive the CPMVs or the MVs of sub-blocks used in motion compensation for the current block should follow some or all constrains as below:
i. They are associated with the same inter prediction direction (list 0 or list 1, or Bi),
ii. They are associated with the same reference indices for list 0 when list 0 is one prediction direction in use.
iii. They are associated with the same reference indices for list 1 when list 1 is one prediction direction in use.
FIG. 15 is an example of deriving CPMVs from the MV of a neighboring block and a set of parameters stored in the buffer.

14. The affine model of the current block derived from a set of affine parameters stored in the buffer may be used to generate an affine merge candidate.
a. In one example, the side information such as inter-prediction direction and reference indices for list 0/list 1 associated with the stored parameters is inherited by the generated affine merge candidate.
b. The affine merge candidate derived from a set of affine parameters stored in the buffer can be inserted into the affine merge candidate list after the affine merge candidates inherited from neighbouring blocks, before the constructed affine merge candidates;
c. The affine merge candidate derived from a set of affine parameters stored in the buffer can be inserted into the affine merge candidate list after the constructed affine merge candidates, before the padding candidates.
d. The affine merge candidate derived from a set of affine parameters stored in the buffer can be inserted into the affine merge list after the constructed affine merge candidates not using temporal motion prediction (block T in FIG. 5), before the constructed affine merge candidates using temporal motion prediction (block T in FIG. 5);
e. The affine merge candidate derived from a set of affine parameters stored in the buffer can be inserted into the affine merge candidate list, and they can be interleaved with the constructed affine merge candidates, or/and padding candidates.

15. The affine parameters stored in the buffer can be used to generate affine AMVP candidates.
a. In one example, the stored parameters used to generate affine AMVP candidates should refer to the same reference picture as the target reference picture of an affine AMVP coded block.
i. In one example, the reference picture list associated with the stored parameters should be the same as the target reference picture list.
ii. In one example, the reference index associated with the stored parameters should be the same as the target reference index.
b. The affine AMVP candidate derived from a set of affine parameters stored in the buffer can be inserted into the affine AMVP candidate list after the affine AMVP candidates inherited from neighbouring blocks, before the constructed affine AMVP candidates;
c. The affine AMVP candidate derived from a set of affine parameters stored in the buffer can be inserted into the affine AMVP candidate list after the constructed affine AMVP candidates, before the HEVC based affine AMVP candidates.
d. The affine AMVP candidate derived from a set of affine parameters stored in the buffer can be inserted into the affine AMVP candidate list after the HEVC based affine AMVP candidates, before the padding affine AMVP candidates.
e. The affine AMVP candidate derived from a set of affine parameters stored in the buffer can be inserted into the affine AMVP list after the constructed affine AMVP candidates not using temporal motion prediction (block T in FIG. 5), before the constructed affine AMVP candidates using temporal motion prediction (block T in FIG. 5);
f. In one example, if current block is coded with 4-parameter affine model, then, higher priority is assigned to 4-parameter affine model and lower priority is assigned to 6-parameter affine model.
g. In one example, if current block is coded with 6-parameter affine model, then, higher priority is assigned to 6-parameter affine model and lower priority is assigned to 4-parameter affine model.

16. How many sets of affine model parameters in the buffer to be added to the candidate list (denoted by N) may be pre-defined.
a. N may be signaled in from the encoder to the decoder in VPS/SPS/PPS/Slice header/tile group head/tile.
b. N may be dependent on block dimension, coded mode information (e.g. AMVP/Merge), etc. al.
c. N may be dependent on the standard profiles/levels/tiers.
d. N may depend on the available candidates in the list.
i. N may depend on the available candidates of a certain type (e.g., inherited affine motion candidates)

17. How to select partial of all sets of affine model parameters (e.g., N as in bullet 15) in the buffer to be inserted into the candidate list may be pre-defined.
a. In one example, the latest several sets (e.g., the last N entries) in the buffer.
b. It may be dependent on the index of sets of affine model parameters in the buffer.

18. When multiple sets of affine model parameters need to be inserted to the candidate list, they may be added in the ascending order of indices.
a. Alternatively, they may be added in the descending order of indices.
b. Alternatively, the rule to decide the inserting order is depend on the number of available candidates in the candidate list before adding those from the buffer.

19. A set of affine parameters stored in the buffer, and their associated base MVs and the position where the base MV locates at, may be used together to derive the affine model of the current block. For example, they can be used to derive the CPMVs or the MVs of sub-blocks used in motion compensation.
a. Suppose the associated base MV is $(mv^h_0, mv^v_0)$ and the coordinate of the position for which the MV $(mv^h(x,y), mv^v(x,y))$ is derived is denoted as (x, y). Suppose the coordinate of the top-left corner of the current block is (x0', y0'), the width and height of the current block is w and h, then
i. To derive a CPMV, (x, y) can be (x0', y0'), or (x0'+w, y0'), or (x0', y0'+h), or (x0'+w, y0'+h).
ii. To derive a MV for a sub-block of the current block, (x, y) can be the center of the sub-block.
iii. Suppose (xm, ym) is the stored coordinate of the position (base position) where the base MV locates at.
iv. In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the parameters in the buffer come from a block coded with the 4-parameter affine mode.
v. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

if the parameters in the buffer come from a block coded with the 6-parameter affine mode.
vi. In one example, $$\begin{cases} mv^h(x, y) = a(x - xm) + c(y - ym) + mv^h_0 \\ mv^v(x, y) = b(x - xm) + d(y - ym) + mv^v_0 \end{cases}$$

no matter the parameters in the buffer come from a block coded with the 4-parameter affine mode or the 6-parameter affine mode.
  b. In one example, CPMVs of the current block are derived from the motion vector and parameters stored in the buffer, and these CPMVs serves as MVPs for the signaled CPMVs of the current block.
  c. In one example, CPMVs of the current block are derived from the associated base MV and parameters stored in the buffer, and these CPMVs are used to derive the MVs of each sub-block used for motion compensation.
  d. In one example, the MVs of each sub-block used for motion compensation are derived from the associated base MV and parameters stored in a neighbouring block, if the current block is affine merge coded.
20. The motion information of a spatial neighbouring/non-adjacent M×N unit block (e.g. 4×4 block in VTM) and a set of affine parameters stored in the buffer may be used together to derive the affine model of the current block. For example, they can be used to derive the CPMVs or the MVs of sub-blocks used in motion compensation.
  a. Suppose the MV stored in the unit block is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is w and h, then
    i. To derive a CPMV, $(x, y)$ can be $(x0', y0')$, or $(x0'+w, y0')$, or $(x0', y0'+h)$, or $(x0'+w, y0'+h)$.
    ii. To derive a MV for a sub-block of the current block, $(x, y)$ can be the center of the sub-block.
    iii. Suppose $(x00, y00)$ is the top-left position of the spatial neighbouring M×N unit block, then the base position $(xm, ym)$ can be derived as:
      (a) xm=x00+M/2, ym=y00+N/2;
      (b) xm=x00+M/2−1, ym=y00+N/2−1;
      (c) xm=x00+M/2−1, ym=y00+N/2;
      (d) xm=x00+M/2, ym=y00+N/2−1;
    iv. In one example,
$$\begin{cases} mv^h(x, y) = a(x - xm) - b(y - ym) + mv^h_0 \\ mv^v(x, y) = b(x - xm) + a(y - ym) + mv^v_0 \end{cases}$$
    if the parameters in the buffer come from a block coded with the 4-parameter affine mode.
    v. In one example,
$$\begin{cases} mv^h(x, y) = a(x - xm) + c(y - ym) + mv^h_0 \\ mv^v(x, y) = b(x - xm) + d(y - ym) + mv^v_0 \end{cases}$$
    if the parameters in the buffer come from a block coded with the 6-parameter affine mode.
    vi. In one example,
$$\begin{cases} mv^h(x, y) = a(x - xm) + c(y - ym) + mv^h_0 \\ mv^v(x, y) = b(x - xm) + d(y - ym) + mv^v_0 \end{cases}$$
    no matter the parameters in the buffer come from a block coded with the 4-parameter affine mode or the 6-parameter affine mode.
  b. In one example, CPMVs of the current block are derived from the motion vector of a spatial neighbouring unit block and parameters stored in the buffer, and these CPMVs serves as MVPs for the signaled CPMVs of the current block.
  c. In one example, CPMVs of the current block are derived from the motion vector of a spatial neighbouring unit block and parameters stored in the buffer, and these CPMVs are used to derive the MVs of each sub-block used for motion compensation.
  d. In one example, the MVs of each sub-block used for motion compensation are derived from the motion vector of a spatial neighbouring unit block and parameters stored in a neighbouring block, if the current block is affine merge coded.
  e. In one example, the motion vector of a spatial neighbouring unit block and the set of parameters used to derive the CPMVs or the MVs of sub-blocks used in motion compensation for the current block should follow some or all constrains as below:
    i. They are associated with the same inter prediction direction (list 0 or list 1, or Bi),
    ii. They are associated with the same reference indices for list 0 when list 0 is one prediction direction in use.
    iii. They are associated with the same reference indices for list 1 when list 1 is one prediction direction in use.
  f. In one example, if the MV of the spatial neighbouring M×N unit block and the stored affine parameters referring to different reference pictures, the MV of the spatial neighbouring M×N unit block is scaled to refer to the same reference picture as the stored affine parameters to derive the affine model of the current block.
21. It is proposed that temporal motion vector prediction (TMVP) can be used together with the affine parameters stored in the buffer. For example, they can be used to derive the CPMVs or the MVs of sub-blocks used in motion compensation.
  a. The motion information of a collocated M×N unit block (e.g. 4×4 block in VTM) in the collocated picture and a set of affine parameters stored in the buffer may be used together to derive the affine model of the current block. For example, they can be used to derive the CPMVs or the MVs of sub-blocks used in motion compensation.
    i. FIG. 25 shows examples of possible positions of the collocated unit block. (A1~A4, B1~B4, . . . F1~F4, J1~J4, K1~K4, and L1~L4.
  b. Suppose the MV stored in the collocated unit block is $(mv^h_0, mv^v_0)$ and the coordinate of the position for which the MV $(mv^h(x,y), mv^v(x,y))$ is derived is denoted as $(x, y)$. Suppose the coordinate of the top-left corner of the current block is $(x0', y0')$, the width and height of the current block is w and h, then
    i. To derive a CPMV, $(x, y)$ can be $(x0', y0')$, or $(x0'+w, y0')$, or $(x0', y0'+h)$, or $(x0'+w, y0'+h)$.
    ii. To derive a MV for a sub-block of the current block, $(x, y)$ can be the center of the sub-block.
    iii. Suppose $(x00, y00)$ is the top-left position of the collocated M×N unit block, then the base position $(xm, ym)$ can be derived as:
      (a) xm=x00+M/2, ym=y00+N/2;
      (b) xm=x00+M/2−1, ym=y00+N/2−1;
      (c) xm=x00+M/2−1, ym=y00+N/2;
      (d) xm=x00+M/2, ym=y00+N/2−1;

iv. In one example, $$\begin{cases} mv^h(x, y) = a(x - xm) - b(y - ym) + mv^h_0 \\ mv^v(x, y) = b(x - xm) + a(y - ym) + mv^v_0 \end{cases}$$

if the parameters in the buffer come from a block coded with the 4-parameter affine mode.

v. In one example, $$\begin{cases} mv^h(x, y) = ax + cy + mv^h_0 \\ mv^v(x, y) = bx + dy + mv^v_0 \end{cases}$$

if the parameters in the buffer come from a block coded with the 6-parameter affine mode.

vi. In one example, $$\begin{cases} mv^h(x, y) = ax + cy + mv^h_0 \\ mv^v(x, y) = bx + dy + mv^v_0 \end{cases}$$

no matter the parameters in the buffer come from a block coded with the 4-parameter affine mode or the 6-parameter affine mode.

c. In one example, CPMVs of the current block are derived from the motion vector of a temporal neighbouring block and parameters stored in the buffer, and these CPMVs serves as MVPs for the signaled CPMVs of the current block.

d. In one example, CPMVs of the current block are derived from the motion vector of a temporal neighbouring block and parameters stored in the buffer, and these CPMVs are used to derive the MVs of each sub-block used for motion compensation.

e. In one example, the MVs of each sub-block used for motion compensation are derived from the motion vector of a temporal neighbouring block and parameters stored in a neighbouring block, if the current block is affine merge coded.

f. In one example, the motion vector of a temporal neighbouring unit block and the set of parameters used to derive the CPMVs or the MVs of sub-blocks used in motion compensation for the current block should follow some or all constrains as below:
   i. They are associated with the same inter prediction direction (list 0 or list 1, or Bi),
   ii. They are associated with the same reference indices for list 0 when list 0 is one prediction direction in use.
   iii. They are associated with the same reference indices for list 1 when list 1 is one prediction direction in use.

g. In one example, if the MV of the temporal neighbouring M×N unit block and the stored affine parameters referring to different reference pictures, the MV of the spatial temporal M×N unit block is scaled to refer to the same reference picture as the stored affine parameters to derive the affine model of the current block.
   i. For example, if the POC of the collocated picture is POCx; the POC of the reference picture the MV of the temporal neighbouring M×N unit block refers to is POCy; the POC of the current picture is POCz; the POC of the reference picture the stored affine parameters refer to is POCw, then $(mv^h_0, mv^v_0)$ is scaled as $mv^h_0 = mv^h_0 \times (POC_W - POC_Z)/(POC_Y - POC_X)$ and $mv^v_0 = mv^v_0 \times (POC_W - POC_Z)/(POC_Y - POC_X)$.

22. The affine merge candidates derived from parameters stored in the buffer and one or multiple spatial neighbouring/non-adjacent unit blocks can be put into the affine merge candidate list.
   a. In one example, these candidates are put right after the inherited affine merge candidates.
   b. In one example, these candidates are put right after the first constructed affine merge candidate.
   c. In one example, these candidates are put right after the first affine merge candidate constructed from spatial neighbouring blocks.
   d. In one example, these candidates are put right after all the constructed affine merge candidates.
   e. In one example, these candidates are put right before all the zero affine merge candidates.
   f. In one example, a spatial neighbouring unit block is not used to derive an affine merge candidate with the parameters stored in the buffer, if another affine merge candidate is inherited from the spatial neighbouring unit block.
   g. In one example, a spatial neighbouring unit block can be used to derive an affine merge candidate with only one set of the parameters stored in the buffer. In other words, if a spatial neighbouring unit block and set of the parameters stored in the buffer has derive an affine merge candidate, it cannot be used to derive another affine merge candidate with another set of parameters stored in the buffer.
   h. In one example, at most N affine merge candidates derived from parameters stored in the buffer and a spatial neighbouring unit block can be put into the affine merge candidate list. N is an integer such as 3.
   i. In one example, the GBI index of the current block is inherited from the GBI index of the spatial neighbouring block if it chooses the affine merge candidates derived from parameters stored in the buffer and a spatial neighbouring unit block.
   j. In one example, affine merge candidates derived from parameters stored in the buffer and spatial neighbouring blocks are put into the affine merge candidate list in order.
      i. For example, a two-level nested looping method are used to search available affine merge candidates derived from parameters stored in the buffer and spatial neighbouring blocks and put them into the affine merge candidate list.
         (a) In the first level loop, each set of parameters stored in the buffer are visited in order. They can be visited from the beginning of the table to the end, or from the end of the table to the beginning, or in any other predefined or adaptive order.
            a. In an example, some sets of parameters stored in the buffer are skipped in the first loop. For example, the first N or the last N sets in the table are skipped. Alternatively, H[k] s are skipped if k % S==0. Alternatively, H[k]s are skipped if k % S!=0
         (b) For each set of parameters stored in the buffer, a second level loop is applied. In the second level loop, each spatial neighboring block is visited in order. For example, blocks A1, B1, B0, A0, and B2 as shown in FIG. 5 are visited in order. In a pseudo code implementation, the nested loops can be described as:

```
for( int i = 0; i < sizeof(H[i]); i++ )
{
    for( int j = 0; j < Num Neighbours; j++)// N[j] represents a spatial neighbouring block
    {
        //Try to derive an affine merge candidate with H[i] and N[j];
    }
}
``` a. In one example, there may be only one spatial neighbouring block included in the second loop. For example, only A1 is included.
   b. With a set of parameters given in the first level loop and a spatial neighbouring block given in the second level loop, an affine merge candidate generated and put into the affine merge candidate list if all or some of the following conditions are satisfied.
      i. The spatial neighbouring block is available;
      ii. The spatial neighbouring block is inter-coded;
      iii. The spatial neighbouring block is not out of the current CTU-row.
      iv. Inter-prediction (list 0, list1, or bi) of the set of parameters and that of the spatial neighbouring block are the same;
      v. Reference Index for list 0 of the set of parameters and that of the spatial neighbouring block are the same;
      vi. Reference Index for list 1 of the set of parameters and that of the spatial neighbouring block are the same;
      vii. The POC of the reference picture for list 0 of the set of parameters is the same to the POC of one of the reference pictures of the spatial neighbouring block.
      viii. The POC of the reference picture for list 1 of the set of parameters is the same to the POC of one of the reference pictures of the spatial neighbouring block.
   c. In one example, if a neighbouring block has been used to derive an inherited affine merge candidate, then it is skipped in the second loop, not to be used to derive an affine merge candidate with stored affine parameters.
   d. In one example, if a neighbouring block has been used to derive an affine merge candidate with a set of stored affine parameters, then it is skipped in the second loop, not to be used to derive an affine merge candidate with another set of stored affine parameters.
   e. In one example, if a neighbouring block is used to derive an affine merge candidate, then all other neighbouring blocks after that neighbouring block are skipped and the second loop is broken and go back to the first loop. The next set of parameters is visited in the first loop.
23. The affine merge candidates derived from parameters stored in the buffer and one or multiple temporal unit block can be put into the affine merge candidate list.
   a. In one example, these candidates are put right after the inherited affine merge candidates.
   b. In one example, these candidates are put right after the first constructed affine merge candidate.
   c. In one example, these candidates are put right after the first affine merge candidate constructed from spatial neighbouring blocks.
   d. In one example, these candidates are put right after all the constructed affine merge candidates.
   e. In one example, these candidates are put right after all affine merge candidates derived from parameters stored in the buffer and a spatial neighbouring unit block.
   f. In one example, these candidates are put right before all the zero affine merge candidates.
   g. In one example, at most N affine merge candidates derived from parameters stored in the buffer and a temporal neighbouring unit block can be put into the affine merge candidate list. N is an integer such as 3.
   h. In one example, the GBI index of the current block is inherited from the GBI index of the temporal neighbouring block if it chooses the affine merge candidates derived from parameters stored in the buffer and a temporal neighbouring unit block.
   i. In one example, affine merge candidates derived from parameters stored in the buffer and temporal neighbouring blocks are put into the affine merge candidate list in order.
      i. For example, a two-level nested looping method are used to search available affine merge candidates derived from parameters stored in the buffer and temporal neighbouring blocks and put them into the affine merge candidate list.
         (a) In the first level loop, each set of parameters stored in the buffer are visited in order. They can be visited from the beginning of the table to the end, or from the end of the table to the beginning, or in any other predefined or adaptive order.
            a. In an example, some sets of parameters stored in the buffer are skipped in the first loop. For example, the first N or the last N sets in the table are skipped. Alternatively, H[k]s are skipped if k % S==0. Alternatively, H[k]s are skipped if k % S!=0
         (b) For each set of parameters stored in the buffer, a second level loop is applied. In the second level loop, each temporal neighboring block is visited in order. For example, blocks L4 and E4 as shown in FIG. 25 are visited in order. In a pseudo code implementation, the nested loops can be described as:

```
for( int i = 0; i < sizeof(H[i]); i++)
{
    for( int j = 0; j < Num Neighbours; j++)// N[j] represents a temporal neighbouring block
    {
        //Try to derive an affine merge candidate with H[i] and N[j];
    }
}
``` a. In one example, there may be only one temporal neighbouring block included in the second loop. For example, only L4 is included.
         b. With a set of parameters given in the first level loop and a neighbouring block given in the second level loop, an affine merge candidate generated and put into the affine merge candidate list if all or some of the following conditions are satisfied.

i. The neighbouring block is available;
ii. The neighbouring block is inter-coded;
iii. The neighbouring block is not out of the current CTU-row.
iv. Inter-prediction (list 0, list 1, or bi) of the set of parameters and that of the neighbouring block are the same;
v. Reference Index for list 0 of the set of parameters and that of the neighbouring block are the same;
vi. Reference Index for list 1 of the set of parameters and that of the neighbouring block are the same;
vii. The POC of the reference picture for list 0 of the set of parameters is the same to the POC of one of the reference pictures of the neighbouring block.
viii. The POC of the reference picture for list 1 of the set of parameters is the same to the POC of one of the reference pictures of the neighbouring block.
c. In one example, if a neighbouring block has been used to derive an inherited affine merge candidate, then it is skipped in the second loop, not to be used to derive an affine merge candidate with stored affine parameters.
d. In one example, if a neighbouring block has been used to derive an affine merge candidate with a set of stored affine parameters, then it is skipped in the second loop, not to be used to derive an affine merge candidate with another set of stored affine parameters.
e. In one example, if a neighbouring block is used to derive an affine merge candidate, then all other neighbouring blocks after that neighbouring block are skipped and the second loop is broken and go back to the first loop. The next set of parameters is visited in the first loop.

24. The affine AMVP candidates derived from parameters stored in the buffer and one or multiple spatial neighbouring/non-adjacent unit block can be put into the affine AMVP candidate list.
   a. In one example, these candidates are put right after the inherited AMVP candidates.
   b. In one example, these candidates are put right after the first constructed AMVP merge candidate.
   c. In one example, these candidates are put right after the first affine AMVP candidate constructed from spatial neighbouring blocks.
   d. In one example, these candidates are put right after all the constructed affine AMVP candidates.
   e. In one example, these candidates are put right after the first translational affine AMVP candidate.
   f. In one example, these candidates are put right after all translational affine AMVP candidates.
   g. In one example, these candidates are put right before all the zero affine AMVP candidates.
   h. In one example, a spatial neighbouring unit block is not used to derive an affine AMVP candidate with the parameters stored in the buffer, if another affine AMVP candidate is inherited from the spatial neighbouring unit block.
   i. In one example, a spatial neighbouring unit block can be used to derive an affine AMVP candidate with only one set of the parameters stored in the buffer. In other words, if a spatial neighbouring unit block and set of the parameters stored in the buffer has derive an affine AMVP candidate, it cannot be used to derive another affine AMVP candidate with another set of parameters stored in the buffer.
   j. In one example, at most N affine AMVP candidates derived from parameters stored in the buffer and a spatial neighbouring unit block can be put into the affine AMVP candidate list. N is an integer such as 1.
   k. In one example, affine AMVP candidates derived from parameters stored in the buffer and spatial neighbouring blocks are put into the affine AMVP candidate list in order.
      i. For example, a two-level nested looping method are used to search available affine AMVP candidates derived from parameters stored in the buffer and spatial neighbouring blocks and put them into the affine AMVP candidate list.
         (a) In the first level loop, each set of parameters stored in the buffer are visited in order. They can be visited from the beginning of the table to the end, or from the end of the table to the beginning, or in any other predefined or adaptive order.
            a. In an example, some sets of parameters stored in the buffer are skipped in the first loop. For example, the first N or the last N sets in the table are skipped. Alternatively, H[k] s are skipped if k % S==0. Alternatively, H[k]s are skipped if k % S!=0
         (b) For each set of parameters stored in the buffer, a second level loop is applied. In the second level loop, each spatial neighboring block is visited in order. For example, blocks A1, B1, B0, A0, and B2 as shown in FIG. 5 are visited in order. In a pseudo code implementation, the nested loops can be described as:

```
for( int i = 0; i < sizeof(H[i]); i++)
{
    for( int j = 0; j < Num Neighbours; j++)// N[j] represents a spatial neighbouring block
    {
        //Try to derive an affine AMVP candidate with H[i] and N[j];
    }
}
``` a. In one example, there may be only one spatial neighbouring block included in the second loop. For example, only A1 is included.
            b. With a set of parameters given in the first level loop and a spatial neighbouring block given in the second level loop, an affine AMVP candidate generated and put into the affine AMVP candidate list if all or some of the following conditions are satisfied.
               i. The spatial neighbouring block is available;
               ii. The spatial neighbouring block is inter-coded;
               iii. The spatial neighbouring block is not out of the current CTU-row.
               iv. Reference Index for list 0 of the set of parameters and that of the spatial neighbouring block are the same;
               v. Reference Index for list 1 of the set of parameters and that of the spatial neighbouring block are the same;
               vi. Reference Index for list 0 of the set of parameters is equal to the AMVP signaled reference index for list 0.

vii. Reference Index for list 1 of the set of parameters is equal to the AMVP signaled reference index for list 1.

viii. Reference Index for list 0 of the spatial neighbouring block is equal to the AMVP signaled reference index for list 0.

ix. Reference Index for list 1 of the spatial neighbouring block is equal to the AMVP signaled reference index for list 1.

x. The POC of the reference picture for list 0 of the set of parameters is the same to the POC of one of the reference pictures of the spatial neighbouring block.

xi. The POC of the reference picture for list 1 of the set of parameters is the same to the POC of one of the reference pictures of the spatial neighbouring block.

xii. The POC of the AMVP signaled reference picture for list 0 is the same to the POC of one of the reference pictures of the spatial neighbouring block.

xiii. The POC of the AMVP signaled reference picture for list 0 is the same to the POC of one of the reference pictures of the set of parameters.

c. In one example, if a neighbouring block has been used to derive an inherited affine AMVP candidate, then it is skipped in the second loop, not to be used to derive an affine AMVP candidate with stored affine parameters.

d. In one example, if a neighbouring block has been used to derive an affine AMVP candidate with a set of stored affine parameters, then it is skipped in the second loop, not to be used to derive an affine AMVP candidate with another set of stored affine parameters.

e. In one example, if a neighbouring block is used to derive an affine AMVP candidate, then all other neighbouring blocks after that neighbouring block are skipped and the second loop is broken and go back to the first loop. The next set of parameters is visited in the first loop.

25. The affine AMVP candidates derived from parameters stored in the buffer and one or multiple temporal unit block can be put into the affine AMVP candidate list.

a. In one example, these candidates are put right after the inherited affine AMVP candidates.

b. In one example, these candidates are put right after the first constructed AMVP merge candidate.

c. In one example, these candidates are put right after the first affine AMVP candidate constructed from spatial neighbouring blocks.

d. In one example, these candidates are put right after all the constructed affine AMVP candidates.

e. In one example, these candidates are put right after the first translational affine AMVP candidate.

f. In one example, these candidates are put right after all translational affine AMVP candidates.

g. In one example, these candidates are put right before all the zero affine AMVP candidates.

h. In one example, these candidates are put right after all affine AMVP candidates derived from parameters stored in the buffer and a spatial neighbouring unit block.

i. In one example, at most N affine AMVP candidates derived from parameters stored in the buffer and a temporal neighbouring unit block can be put into the affine merge candidate list. N is an integer such as 1.

j. In one example, affine AMVP candidates derived from parameters stored in the buffer and temporal neighbouring blocks are put into the affine AMVP candidate list in order.

i. For example, a two-level nested looping method are used to search available affine AMVP candidates derived from parameters stored in the buffer and temporal neighbouring blocks and put them into the affine AMVP candidate list.

(a) In the first level loop, each set of parameters stored in the buffer are visited in order. They can be visited from the beginning of the table to the end, or from the end of the table to the beginning, or in any other predefined or adaptive order.

a. In an example, some sets of parameters stored in the buffer are skipped in the first loop. For example, the first N or the last N sets in the table are skipped. Alternatively, H[k] s are skipped if k % S==0. Alternatively, H[k]s are skipped if k % S!=0

(b) For each set of parameters stored in the buffer, a second level loop is applied. In the second level loop, each temporal neighboring block is visited in order. For example, blocks A1, B1, B0, A0, and B2 as shown in FIG. 5 are visited in order. In a pseudo code implementation, the nested loops can be described as:

```
for( int i = 0; i < sizeof(H[i]); i++)
{
    for( int j = 0; j < Num Neighbours; j++)// N[j] represents a temporal neighbouring block
    {
        //Try to derive an affine AMVP candidate with H[i] and N[j];
    }
}
``` a. In one example, there may be only one temporal neighbouring block included in the second loop. For example, only A1 is included.

b. With a set of parameters given in the first level loop and a temporal neighbouring block given in the second level loop, an affine AMVP candidate generated and put into the affine AMVP candidate list if all or some of the following conditions are satisfied.

i. The temporal neighbouring block is available;

ii. The temporal neighbouring block is inter-coded;

iii. The temporal neighbouring block is not out of the current CTU-row.

iv. Reference Index for list 0 of the set of parameters and that of the temporal neighbouring block are the same;

v. Reference Index for list 1 of the set of parameters and that of the temporal neighbouring block are the same;

vi. Reference Index for list 0 of the set of parameters is equal to the AMVP signaled reference index for list 0.

vii. Reference Index for list 1 of the set of parameters is equal to the AMVP signaled reference index for list 1.

viii. Reference Index for list 0 of the temporal neighbouring block is equal to the AMVP signaled reference index for list 0.

ix. Reference Index for list 1 of the temporal neighbouring block is equal to the AMVP signaled reference index for list 1.

x. The POC of the reference picture for list 0 of the set of parameters is the same to the POC of one of the reference pictures of the temporal neighbouring block.

xi. The POC of the reference picture for list 1 of the set of parameters is the same to the POC of one of the reference pictures of the temporal neighbouring block.

xii. The POC of the AMVP signaled reference picture for list 0 is the same to the POC of one of the reference pictures of the temporal neighbouring block.

xiii. The POC of the AMVP signaled reference picture for list 0 is the same to the POC of one of the reference pictures of the set of parameters.

c. In one example, if a neighbouring block has been used to derive an inherited affine AMVP candidate, then it is skipped in the second loop, not to be used to derive an affine AMVP candidate with stored affine parameters.

d. In one example, if a neighbouring block has been used to derive an affine AMVP candidate with a set of stored affine parameters, then it is skipped in the second loop, not to be used to derive an affine AMVP candidate with another set of stored affine parameters.

e. In one example, if a neighbouring block is used to derive an affine AMVP candidate, then all other neighbouring blocks after that neighbouring block are skipped and the second loop is broken and go back to the first loop. The next set of parameters is visited in the first loop.

26. It is proposed to use affine merge candidates derived from the affine HMVP buffer are put into the affine merge list/sub-block merge list and inherited affine merge candidates may be removed from the list.

a. In one example, the affine merge candidates derived from the affine HMVP buffer are put into the affine merge list/sub-block merge list and inherited affine merge candidates are excluded from the list.

b. In an alternative example, affine merge candidates derived from the affine HMVP buffer are put into the affine merge list/sub-block merge list and affine merge candidates inherited from a block in the current CTU row are removed from the list.

i. For example, affine merge candidates derived from the affine HMVP buffer are put into the affine merge list/sub-block merge list after affine merge candidates which are inherited from a block in a CTU row different to the current CTU row.

c. Alternatively, whether to add inherited affine merge candidates may depend on the affine HMVP buffer.

i. In one example, affine merge candidates derived from the affine HMVP buffer may be inserted to the candidate list before inherited affine merge candidates.

ii. In one example, when the affine HMVP buffer is empty, inherited affine merge candidates may be added; otherwise (if the affine HMVP buffer is not empty), inherited affine merge candidates may be excluded.

d. Alternatively, whether to apply proposed methods may depend on the block dimensions.

27. It is proposed to use affine AMVP candidates derived from the affine HMVP buffer are put into the affine AMVP list and inherited affine AMVP candidates may be removed from the list.

a. In one example, the affine AMVP candidates derived from the affine HMVP buffer are put into the affine AMVP list and inherited affine AMVP candidates are excluded from the list.

b. In an alternative example, affine AMVP candidates derived from stored in the affine HMVP buffer are put into the affine AMVP list and affine AMVP candidates inherited from a block in the current CTU row are removed from the list.

i. For example, affine AMVP candidates derived from the affine HMVP buffer are put into the affine AMVP list after affine AMVP candidates which are inherited from a block in a CTU row different to the current CTU row.

c. Alternatively, whether to add inherited affine AMVP candidates may depend on the affine HMVP buffer.

d. Alternatively, whether to apply proposed methods may depend on the block dimensions.

28. In one example, the size of affine merge candidate list is increased by N (e.g. N=1) if affine merge candidates derived from parameters stored in the buffer can be put into the list.

29. In one example, the size of affine AMVP candidate list is increased by N (e.g. N=1) if affine AMVP candidates derived from parameters stored in the buffer can be put into the list.

30. Virtual affine models may be derived from multiple existing affine models stored in the buffer. Suppose the buffer has included several affine models, the i-th candidate is denoted by Candi with parameters as (ai, bi, ci, di, ei, fi).

a. In one example, parameters of Candi and Candj may be combined to form a virtual affine model by taking some parameters from Candi and remaining parameters from Candj. One example of the virtual affine model is (ai, bi, cj, dj, ei, fi).

b. In one example, parameters of Candi and Candj may be jointly used to generate a virtual affine model with a function, such as averaging. One example of the virtual affine model is ((ai+aj)/2, (bi+bj)/2, (ci+cj)/2, (di+dj)/2, (ei+ej)/2, (fi+fj)/2).

c. Virtual affine models may be used in a similar way as the stored affine model, such as with bullets mentioned above.

31. It is proposed that the affine merge candidates inherited from spatial neighbouring blocks are not put into the sub-block based merge candidate list and the disclosed history-based affine merge candidates are put into the sub-block based merge candidate list.

a. In one example, the disclosed history-based affine merge candidates are put into the sub-block based merge candidate list just after the ATMVP candidate.

b. In one example, the disclosed history-based affine merge candidates are put into the sub-block based merge candidate list before the constructed affine merge candidates.

c. It is proposed that whether the affine merge candidates inherited from a spatial neighbouring block is put into the sub-block based merge candidate list or not, may depend on the position of the spatial neighbouring block.
  i. In one example, the affine merge candidate inherited from a spatial neighbouring block is put into the sub-block based merge candidate list if the spatial neighbouring block is in the same CTU or CTU row as the current block; Otherwise, it is not put into.
  ii. Alternatively, the affine merge candidate inherited from a spatial neighbouring blocks is put into the sub-block based merge candidate list if the spatial neighbouring block is not in the same CTU or CTU row as the current block; Otherwise, it is not put into.
32. It is proposed that the affine AMVP candidates inherited from spatial neighbouring blocks are not put into the affine MVP candidate list and the disclosed history-based affine MVP candidates are put into affine MVP candidate list.
  a. In one example, the disclosed history-based affine MVP candidates are put first into the affine MVP candidate list.
  b. It is proposed that whether the affine AMVP candidate inherited from a spatial neighbouring block is put into the affine MVP candidate list or not, may depend on the position of the spatial neighbouring block.
    i. In one example, the affine AMVP candidate inherited from a spatial neighbouring block is put into the affine MVP candidate list if the spatial neighbouring block is in the same CTU or CTU row as the current block; Otherwise, it is not put into.
    ii. Alternatively, the affine AMVP candidate inherited from a spatial neighbouring block is put into the affine MVP candidate list if the spatial neighbouring block is not in the same CTU or CTU row as the current block; Otherwise, it is not put into.
33. More than one affine HMVP buffers are used to store affine parameters or CPMVs in different categories.
  a. For example, two buffers are used to store affine parameters in reference list 0 and reference list 1, respectively.
    i. In one example, after decoding an affine coded CU, the CPMVs or parameters for reference list 0 are used to update the HMVP buffer for reference list 0.
    ii. In one example, after decoding an affine coded CU, the CPMVs or parameters for reference list 1 are used to update the HMVP buffer for reference list 1.
    iii. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference list X is combined with the affine parameters stored in the buffer referring to reference list X. X=0 or 1.
    iv. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference list X is combined with the affine parameters stored in the buffer referring to reference list X. X=0 or 1.
  b. For example, N (e.g. N=6) buffers are used to store affine parameters referring to different reference indices in different reference lists. In the following discussion, "reference K" means the reference index of the reference picture is K.
    i. In one example, after decoding an affine coded CU, the CPMVs or parameters referring to reference K in list X are used to update the HMVP buffer for reference K in list X. X=0 or 1. K may be 0, 1, 2, etc.
    ii. In one example, after decoding an affine coded CU, the CPMVs or parameters referring to reference K, where K>=L, in list X are used to update the HMVP buffer for reference L in list X. X=0 or 1. M may be 1, 2, 3, etc.
    iii. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference K in list X is combined with the affine parameters stored in the buffer referring to reference K in list X. X=0 or 1. K may be 0, 1, 2, etc.
    iv. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference K in list X is combined with the affine parameters stored in the buffer referring to reference K in list X. X=0 or 1. K may be 0, 1, 2, etc.
    v. In one example, if the motion information of a spatial neighbouring/non-adjacent M×N unit block (e.g. 4×4 block in VTM) and a set of affine parameters stored in the buffer are used together to derive the affine model of the current block, the MV of the spatial neighbouring/non-adjacent unit block referring to reference K, where K>=L, in list X is combined with the affine parameters stored in the buffer referring to reference L in list X. X=0 or 1. L may be 1, 2, 3, etc.
    vi. In one example, if the motion information of a temporal neighbouring M×N unit block (e.g. 4×4 block in VTM) and a set of affine parameters stored in the buffer are used together to derive the affine model of the current block, the MV of the temporal neighbouring unit block referring to reference K, where K >=L, in list X is combined with the affine parameters stored in the buffer referring to reference L in list X. X=0 or 1. L may be 1, 2, 3 etc.
  c. The size of each affine HMVP buffer for a category may be different.
    i. In one example, the size may depend on the reference picture index.
    ii. For example, the size of the affine HMVP buffer for reference 0 is 3, the size of the affine HMVP buffer for reference 1 is 2, and the size of the affine HMVP buffer for reference 2 is 1.
34. Whether to and/or how to update the affine HMVP buffers may depend on the coding mode and/or other coding information of the current CU.
  a. For example, if a CU is coded with affine merge mode and the merge candidate is derived from the affine HMVP buffer, then the HMVP buffer is not updated after decoding this CU.
    i. Alternatively, the affine HMVP buffer is updated by removing the associated affine parameters to the last entry of the affine HMVP buffer.

b. In one example, whenever one block is coded with affine mode, the affine HMVP buffer may be updated.
c. In one example, when one block is coded with affine merge mode and the block uses the shared merge list, updating of the affine HMVP buffer is skipped.

35. In one example, an affine HMVP buffer may be divided into M (M>1) sub-buffers: $HB^0, HB^1, \ldots HB^{M-1}$.
    a. Alternatively, multiple affine HMVP buffers (i.e., multiple affine HMVP tables) may be allocated, each of them may correspond to one sub-buffer $HB^i$ mentioned above.
    b. In one example, operations on one sub-buffer (e.g., the sub-buffer updating process, usage of the sub-buffer) may not affect the other sub-buffers.
    c. In one example, M is pre-defined, such as 10.
    d. In one example, the first M0 buffers are related to the storage of affine parameters for reference picture list X and the remaining (M-M0) buffers are related to the storage of affine parameters for reference picture list Y wherein Y=1−X and X being 0 or 1.
        i. Alternatively, affine parameters for reference picture list X may be stored in interleaved way with those affine parameters for reference picture list Y.
        ii. In one example, affine parameters for reference picture list X may be stored in $HB^i$ with i being an odd value and affine parameters for reference picture list X may be stored in HIV with j being an even value.
    e. In one example, M may be signaled from the encoder to the decoder, such as at video level (e.g. VPS), sequence level (e.g. SPS), picture level (e.g. PPS or picture header), slice level (e.g. slice header), tile group level (e.g. tile group header).
    f. In one example, M may depend on the number of reference pictures.
        i. For example, M may depend on the number of reference pictures in reference list 0;
        ii. For example, M may depend on the number of reference pictures in reference list 1;
    g. In one example, each sub-buffer may have the same number of maximum allowed number of entries, denoted as N. For example, N=1 or N=2;
    h. In one example, each sub-buffer may have a different number of maximum allowed number of entries. For example, sub-buffer $HB^K$ may have $N^K$ allowed number of entries at most. For different K, $N^K$ may be different.
    i. When a set of affine parameters is used to update the HMVP buffer, one sub-buffer with a sub-buffer index SI may be selected, and then the set of affine parameters may be used to update the corresponding sub-buffer $HB^{SI}$.
        i. In one example, the selection of sub-buffer may be based on the coded information of the block on which the set of affine parameters is applied.
            (a) In one example, the coded information may include the reference list index (or prediction direction) and/or the reference index associated with the set of affine parameters.
            (b) For example, suppose the reference list index and reference index of the set of affine parameters are denoted as X (e.g., X being 0 or 1) and RIDX, then the selected sub-buffer index SI may be calculated as SI=f(X, RIDX), where f is a function.
                a. In one example, SI=X*MaxR0+min(RIDX, MaxRX-1), where MaxR0 and MaxR1 are integers, e.g. MaxR0=MaxR1=5.
                b. Alternatively, SI=2*min(RIDX, MaxRX-1)+X.
                c. In one example, X can only be 0 or 1 and RIDX must be greater than or equal to 0.
                d. In one example, MaxR0 and MaxR1 may be different.
                e. In one example, MaxR0/MaxR1 may depend on the temporal layer index, slice/tile group/picture type, low delay check flag, etc. al.
                f. In one example, MaxR0 may depend on the total number of reference pictures in reference list 0.
                g. In one example, MaxR1 may depend on the total number of reference pictures in reference list 1.
                h. In one example, MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).
        j. When a set of affine parameters is used to update a sub-buffer $HB^{SI}$, it may be regarded as updating a regular affine HMVP buffer, and the methods to update affine HMVP buffers disclosed in this document may be applied to update a sub-buffer.
        k. A spatial or temporal adjacent or non-adjacent neighbouring block (it may also be referred as "a neighbouring block" for simplification) may be used combining with one or multiple sets of affine parameters stored in one or multiple HMVP affine sub-buffers.
36. In one example, the maximum allowed size for an affine HMVP buffer and/or an affine HMVP sub-buffer may be equal to 1.
    a. In one example, there is no need to recorder a counter to record the number of sets of affine parameters stored in the affine HMVP buffer or the affine HMVP sub-buffer.
37. Whether to and/or how to conduct operations on the affine HMVP buffer or the affine HMVP sub-buffer may depend on whether all the affine parameters of a set are zero.
    a. In one example, when the affine HMVP buffer or the affine HMVP sub-buffer is refreshed, all affine parameters stored in the buffer or sub-buffer are set to be zero.
        i. The affine HMVP buffer or the affine HMVP sub-buffer may be refreshed before coding/decoding each picture and/or slice and/or tile group and/or CTU row and/or CTU and/or CU.
    b. In one example, when a set of affine parameters is used to update the affine HMVP buffer or the affine HMVP sub-buffer, the buffer or sub-buffer is not updated if all the affine parameters in the set are equal to zero.
    c. In one example, when parameters of a set of affine parameters stored in the affine HMVP buffer or the affine HMVP sub-buffer are all zero, the set of affine parameters cannot be used to generate an affine merge candidate or affine AMVP candidate.
        i. For example, the set of affine parameters cannot be used to generate an affine merge candidate or affine AMVP candidate, combining with a neighbouring block.
        ii. For example, when parameters of a set of affine parameters stored in an entry of an affine HMVP buffer or an affine HMVP sub-buffer are all zero, the entry is marked as "invalid" or "unavailable".
        iii. For example, when parameters of sets of affine parameters stored in all entries of an affine HMVP buffer or an affine HMVP sub-buffer are all zero, the affine HMVP buffer or the affine HMVP sub-buffer is marked as "invalid" or "unavailable", and/or the counter of the buffer or sub-buffer is set to be zero.
38. When a spatial or temporal adjacent or non-adjacent neighbouring block (it may also be referred as "a neighbouring block" for simplification) is used to generate an affine merge candidate by combining affine parameters stored in the affine HMVP buffer, only affine parameters stored in one or several related sub-buffers may be accessed.
   a. For example, the related sub-buffers can be determined by the coding information of the neighbouring block. For example, the coding information may include the reference lists and/or the reference indices of the neighbouring block.
   b. For example, one or multiple sets of affine parameters stored in the related sub-buffers can be used to generate the affine merge candidate combining with a neighbouring block.
      i. For example, the set of affine parameters stored as the first entry in a related sub-buffer can be used.
      ii. For example, the set of affine parameters stored as the last entry in a related sub-buffer can be used.
   c. For example, one related sub-buffer $HB^{S0}$ is determined for the MV of the neighbouring block referring to reference list 0.
   d. For example, one related sub-buffer $HB^{S1}$ is determined for the MV of the neighbouring block referring to reference list 1.
      i. $HB^{S0}$ and $HB^{S1}$ may be different.
   e. For a MV of the neighbouring block referring to a reference picture with the reference index RIDX in reference list LX, the related sub-buffer index SI is calculated as SI=g(LX, RIDX), where g is a function.
      i. For example, function g is the same as function fin bullet 35.d.
      ii. In one example, SI=LX*MaxR0+min(RIDX, MaxRX-1), where MaxR0 and MaxR1 are integers, e.g. MaxR0=MaxR1=5.
         (a) In one example, LX can only be 0 or 1 and RIDX must be greater than or equal to 0.
         (b) MaxR0 and MaxR1 may be different.
         (c) MaxR0 may depend on the total number of reference pictures in reference list 0.
         (d) MaxR1 may depend on the total number of reference pictures in reference list 1.
         (e) MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).
   f. In one example, when the neighbouring block is inter-coded with uni-prediction referring to a reference picture with the reference index RIDX in reference list LX, then an affine merge candidate can be generated from this neighbouring block combining with a set of affine parameters stored in the related affine HMVP sub-buffer, if there is at least one entry available in the sub-buffer, and/or the counter of the sub-buffer is not equal to 0.
      i. The generated affine merge candidate should also be uni-predicted, referring to a reference picture with the reference index RIDX in reference list LX.
   g. In one example, when the neighbouring block is inter-coded with bi-prediction referring to a reference picture with the reference index RIDX0 in reference list 0 and reference index RIDX1 in reference list 1, then an affine merge candidate can be generated from this neighbouring block combining with one or multiple sets of affine parameters stored in the one or multiple related affine HMVP sub-buffers.
      i. In one example, the generated affine merge candidate should also be bi-predicted, referring to a reference picture with the reference index RID0 in reference list 0 and reference index RID1 in reference list 1.
         (a) The bi-predicted affine merge candidate can only be generated when there is at least one entry available in the sub-buffer related to reference index RID0 in reference list 0 (and/or the counter of the sub-buffer is not equal to 0), and there is at least one entry available in the sub-buffer related to reference index RID1 in reference list 1 (and/or the counter of the sub-buffer is not equal to 0).
         (b) In one example, no affine merge candidate can be generated from neighbouring block combining with affine parameters stored in affine HMVP buffers and/or sub-buffers, if the condition below cannot be satisfied.
            a. There is at least one entry available in the sub-buffer related to reference index RID0 in reference list 0 (and/or the counter of the sub-buffer is not equal to 0), and there is at least one entry available in the sub-buffer related to reference index RID1 in reference list 1 (and/or the counter of the sub-buffer is not equal to 0).
      ii. In an alternative example, the generated affine merge candidate can also be uni-predicted, referring to a reference picture with the reference index RID0 in reference list 0, or reference index RID1 in reference list 1.
         (a) The generated affine merge candidate is uni-predicted referring to a reference picture with the reference index RID0 in reference list 0, if there is at least one entry available in the sub-buffer related to reference index RID0 in reference list 0 (and/or the counter of the sub-buffer is not equal to 0), and there is no entry available in the sub-buffer related to reference index RID1 in reference list 1 (and/or the counter of the sub-buffer is equal to 0).
         (b) The generated affine merge candidate is uni-predicted referring to a reference picture with the reference index RID1 in reference list 1, if there is at least one entry available in the sub-buffer related to reference index RID1 in reference list 1 (and/or the counter of the sub-buffer is not equal to 0), and there is no entry available in the sub-buffer related to reference index RID0 in reference list 0 (and/or the counter of the sub-buffer is equal to 0).
   h. In one example, all methods disclosed in this document can be used to generate an affine merge candidate by combining affine parameters stored in one or several related sub-buffers.
39. When a spatial or temporal adjacent or non-adjacent neighbouring block (it may also be referred as "a neighbouring block" for simplification) is used to generate an affine AMVP candidate by combining affine parameters stored in the affine HMVP buffer, only affine parameters stored in one or several related sub-buffers may be accessed.
   a. For example, the related sub-buffers can be determined by the coding information of the neighbouring block.

For example, the coding information may include the reference lists and/or the reference indices of the neighbouring block.
b. For example, one or multiple sets of affine parameters stored in the related sub-buffers can be used to generate the affine AMVP candidate combining with a neighbouring block.
  i. For example, the set of affine parameters stored as the first entry in a related sub-buffer can be used.
  ii. For example, the set of affine parameters stored as the last entry in a related sub-buffer can be used.
c. For a target reference picture with the target reference index RIDX in target reference list LX, the related sub-buffer index SI is calculated as SI=h(LX, RIDX), where g is a function.
  i. For example, function g is the same as function fin bullet 35.d.
  ii. For example, function g is the same as function g in bullet 38.
  iii. In one example, SI=LX*MaxR0+min(RIDX, MaxRX-1), where MaxR0 and MaxR1 are integers, e.g. MaxR0=MaxR1=5.
    (a) In one example, LX can only be 0 or 1 and RIDX must be greater than or equal to 0.
    (b) MaxR0 and MaxR1 may be different.
    (c) MaxR0 may depend on the total number of reference pictures in reference list 0.
    (d) MaxR1 may depend on the total number of reference pictures in reference list 1.
    (e) MaxR0 and/or MaxR1 may be signaled from the encoder to the decoder, such as at video level (e.g. VPS), sequence level (e.g. SPS), picture level (e.g. PPS or picture header), slice level (e.g. slice header), tile group level (e.g. tile group header).
d. In one example, no affine AMVP candidate can be generated from affine parameters stored in affine HMVP buffer/sub-buffers if there is no entry available in the sub-buffer related to target reference index RIDX in the target reference list LX (and/or the counter of the sub-buffer is equal to 0).
e. In one example, when the neighbouring block is inter-coded and have a MV referring to the target reference index RIDX in target reference list LX, then the MV is used to generate the affine AMVP candidate combining with the affine parameters stored in the related sub-buffer.
f. In one example, when the neighbouring block is inter-coded and does not have a MV referring to the target reference index RIDX in target reference list LX, then no affine AMVP candidate can be generated from the neighbouring block.
  i. Alternatively, when the neighbouring block is inter-coded and does not have a MV referring to the target reference index RIDX in target reference list LX, the neighbouring block will be checked to determine whether it has a second MV referring to a second reference picture in reference list 1-LX, and the second reference has the same POC as the target reference picture.
    (a) If it has a second MV referring to a second reference picture in reference list 1-LX, and the second reference has the same POC as the target reference picture, the second MV is used to generate the affine AMVP candidate combining with the affine parameters stored in the related sub-buffer. Otherwise, no affine AMVP candidate can be generated from the neighbouring block.
g. In one example, all methods disclosed in this document can be applied to generate an affine merge/AMVP candidate by combining affine parameters stored in one or several related sub-buffers.

40. A neighbouring block cannot be used combining with affine parameters stored in affine HMVP buffers or affine HMVP sub-buffers to generate an affine merge/AMVP candidate, if it is coded with the Intra Block Copy (IBC) mode.

41. A spatial neighbouring block cannot be used combining with affine parameters stored in affine HMVP buffer/sub-buffer to generate affine merge/AMVP candidate, if it is used to generate an inheritance merge/AMVP candidate.

Figure 16:
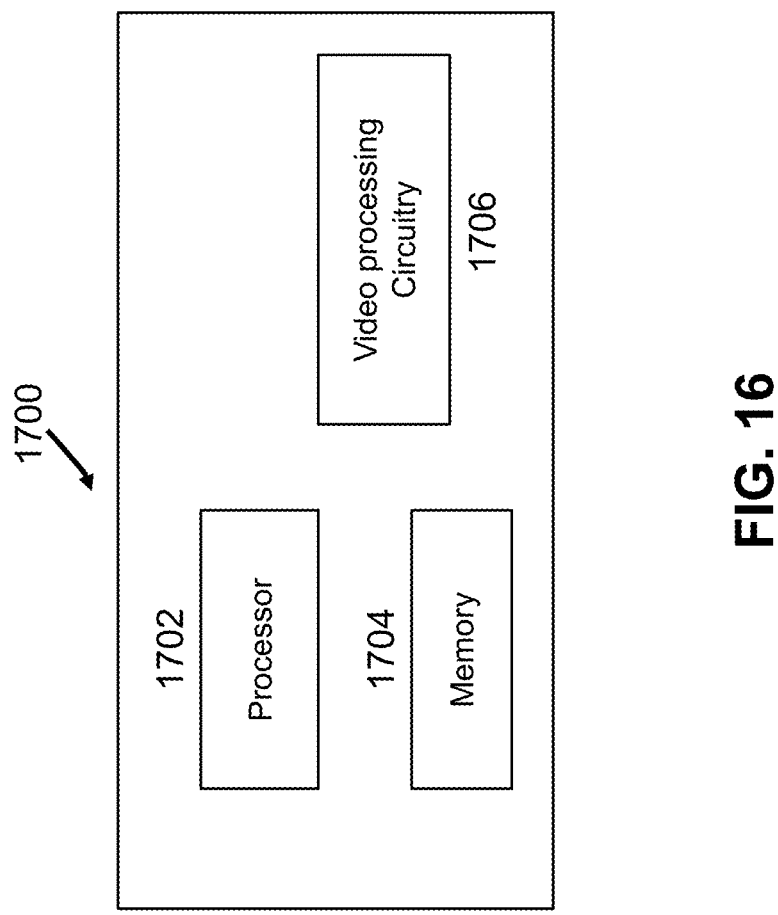
FIG. 16 is a block diagram of an example of a video processing apparatus.
Figure 27:
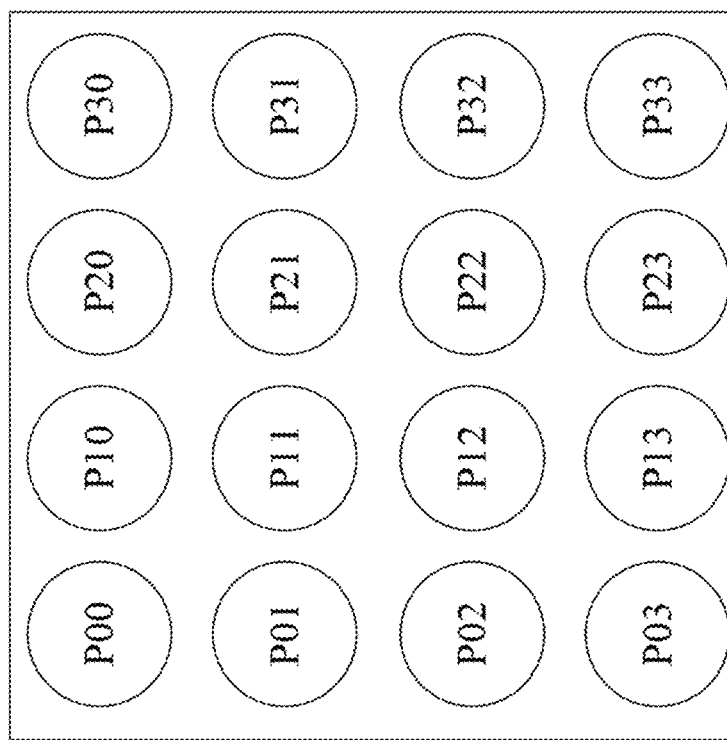
FIG. 27 shows example positions in a 4×4 basic block.

42. The spatial and/or temporal neighbouring/non-adjacent blocks may be divided into K groups (e.g., K=2) and how to combine parameters in affine HMVP buffer/sub-buffer with the motion information of spatial and/or temporal neighbouring/non-adjacent blocks for coding the current block may be based on the group.
  a. The affine merge candidates generated from affine parameters stored in the affine HMVP buffer/sub-buffer combining with spatial neighbouring blocks in different groups may be put at different positions into the affine merge candidate list;
  b. The affine AMVP candidates generated from affine parameters stored in the affine HMVP buffer/sub-buffer combining with spatial neighbouring blocks in different groups may be put at different positions into the affine AMVP candidate list;
  c. In one example, spatial neighbouring blocks may be divided into groups based on their coded information.
    i. For example, a neighbouring block may be put into a certain group based on whether it is affine-coded.
    ii. For example, a neighbouring block may be put into a certain group based on whether it is affine-coded and with AMVP mode.
    iii. For example, a neighbouring block may be put into a certain group based on whether it is affine-coded and with merge mode.
  d. In one example, spatial neighbouring blocks may be divided into groups based on their positions.
  e. In one example, not all the neighbouring blocks are put into the K groups.
  f. In one example, the spatial neighbouring blocks are divided into two groups as below:
    i. The first encountered affine-coded left neighbouring block may be put into group X.
      (a) Left neighbouring blocks are checked in order, e.g. block A0, block A1 as shown in FIG. 5.
      (b) In one example, the first encountered affine-coded left neighbouring block is not put into group X if it is used to generate an inheritance merge/AMVP candidate.
    ii. The first encountered affine-coded above neighbouring block is put into group X.
      (a) Above neighbouring blocks are checked in order. E.g. block B0, block B1, and block B2 as shown in FIG. 5.
      (b) In one example, the first encountered inter-coded and affine-coded above neighbouring block is not put into group X if it is used to generate an inheritance merge/AMVP candidate.
    iii. Other inter-coded neighbouring blocks may be put into group Y wherein Y is unequal to X.
  g. In one example, the affine merge candidates generated from affine parameters stored in the affine HMVP buffer/sub-buffer combining with spatial neighbouring blocks in group X may be put into the affine merge candidate list before the K-th constructed affine merge candidate. E.g. K may be 1 or 2.
  h. In one example, the affine merge candidates generated from affine parameters stored in the affine HMVP buffer/sub-buffer combining with spatial neighbouring blocks in group Y may be put into the affine merge candidate list after the K-th constructed affine merge candidate. E.g. K may be 1 or 2.
  i. In one example, the affine AMVP candidates generated from affine parameters stored in the affine HMVP buffer/sub-buffer combining with spatial neighbouring blocks in group X may be put into the affine AMVP candidate list before the K-th constructed affine merge candidate. E.g. K may be 1 or 2.
  j. In one example, the affine AMVP candidates generated from affine parameters stored in the affine HMVP buffer/sub-buffer combining with spatial neighbouring blocks in group Y may be put into the affine AMVP candidate list after the K-th constructed affine merge candidate. E.g. K may be 1 or 2.
  k. In one example, the affine AMVP candidates generated from affine parameters stored in the affine HMVP buffer/sub-buffer combining with spatial neighbouring blocks in group X may be put into the affine AMVP candidate list before the zero candidates.
43. The base position (xm, ym) in bullet 20 may be any position inside the basic neighbouring block (e.g. 4×4 basic block) as shown in FIG. 27.
  a. For example, (xm, ym) may be P22 in FIG. 27.
  b. Suppose the coordinate of top-left sample of the current block is (xPos00, yPos00), the coordinate of top-right sample of the current block is (xPos10, yPos00), the coordinate of top-right sample of the current block is (xPos00, yPos01), then in FIG. 5:
    i. (xm, ym) for adjacent neighbouring basic block A1 is (xPos00−2, yPos01−1);
    ii. (xm, ym) for adjacent neighbouring basic block A0 is (xPos00−2, yPos01+3);
    iii. (xm, ym) for adjacent neighbouring basic block B1 is (xPos10−1, yPos00−2);
    iv. (xm, ym) for adjacent neighbouring basic block B0 is (xPos10+3, yPos00−2);
    v. (xm, ym) for adjacent neighbouring basic block B2 is (xPos00−2, yPos00−2);

FIG. 16 is a block diagram of a video processing apparatus 1700. The apparatus 1700 may be used to implement one or more of the methods described herein. The apparatus 1700 may be embodied in a smartphone, tablet, computer, Internet of Things (IoT) receiver, and so on. The apparatus 1700 may include one or more processors 1702, one or more memories 1704 and video processing hardware 1706. The processor(s) 1702 may be configured to implement one or more methods described in the present document. The memory (memories) 1704 may be used for storing data and code used for implementing the methods and techniques described herein. The video processing hardware 1706 may be used to implement, in hardware circuitry, some techniques described in the present document.

Figure 18:
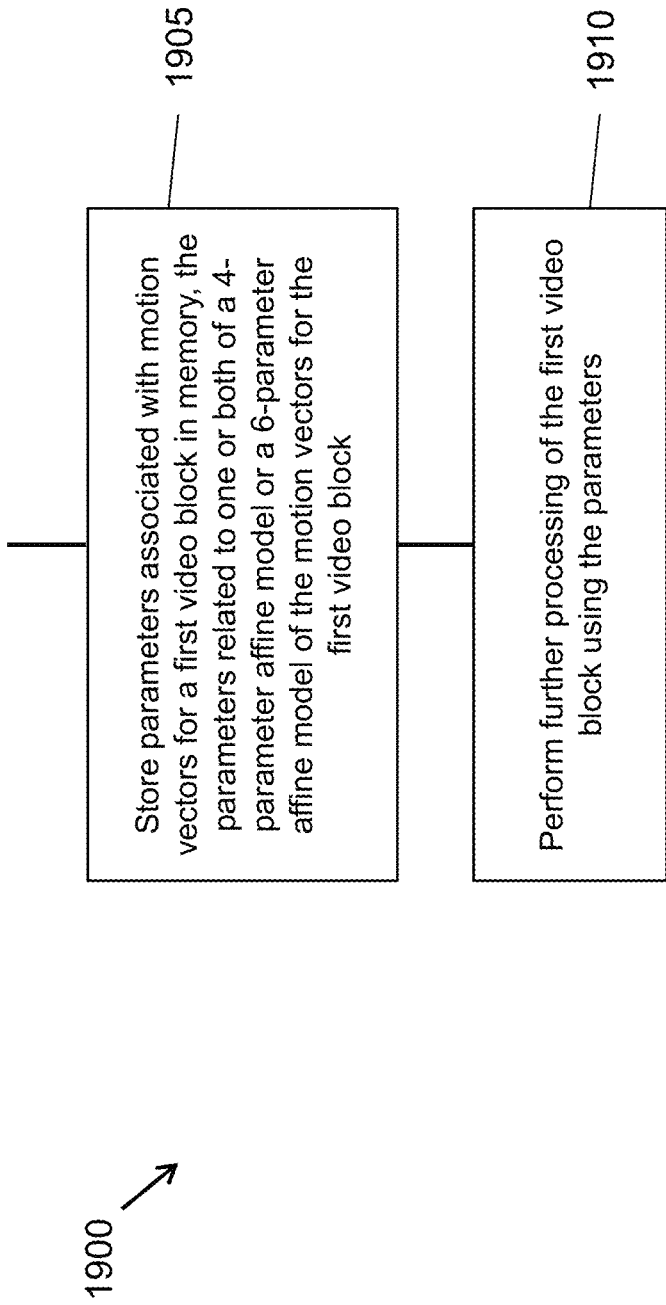
FIG. 18 is a flowchart for an example of a video processing method.

FIG. 18 is a flowchart for a method 1900 of processing a video. The method 1900 includes storing (1905) parameters associated with motion vectors for a first video block in memory, the parameters related to one or both of a 4-parameter affine model or a 6-parameter affine model of the motion vectors for the first video block, and performing (1910) further processing of the first video block using the parameters.

Figure 19:
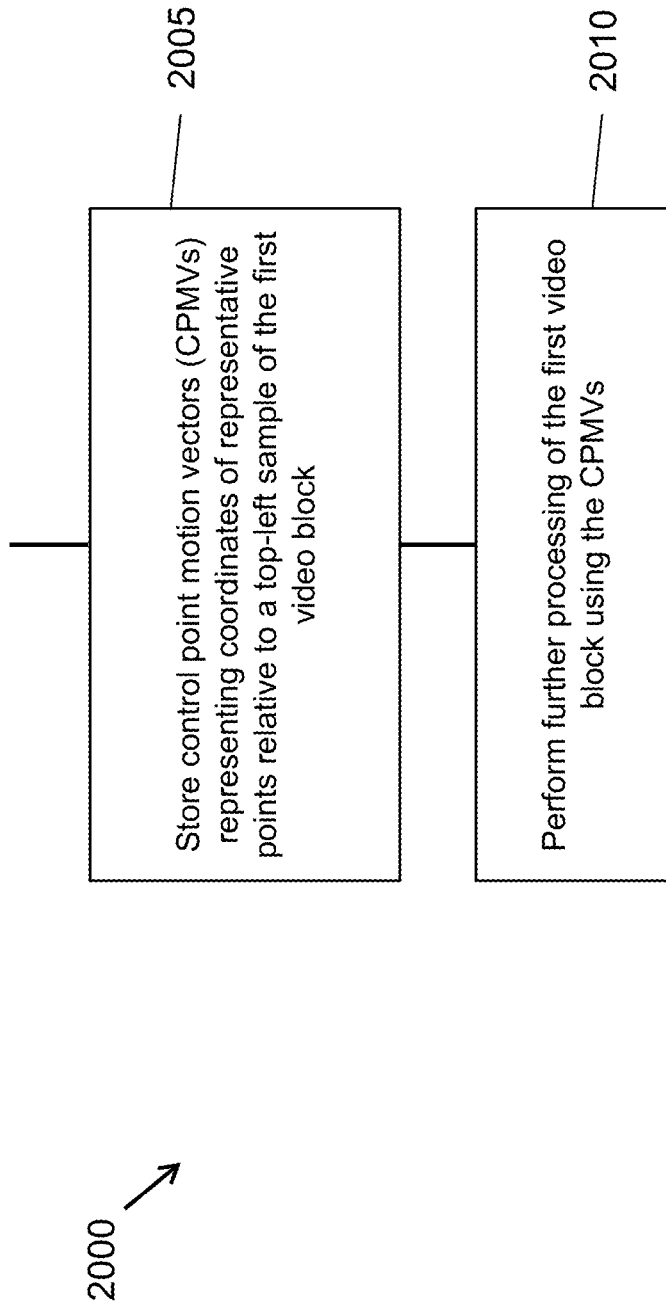
FIG. 19 is a flowchart for an example of a video processing method.

FIG. 19 is a flowchart for a method 2000 of processing a video. The method 2000 includes storing (2005) control point motion vectors (CPMVs) representing coordinates of representative points relative to a top-left sample of the first video block, and performing (2010) further processing of the first video block using the CPMVs.

Figure 20:
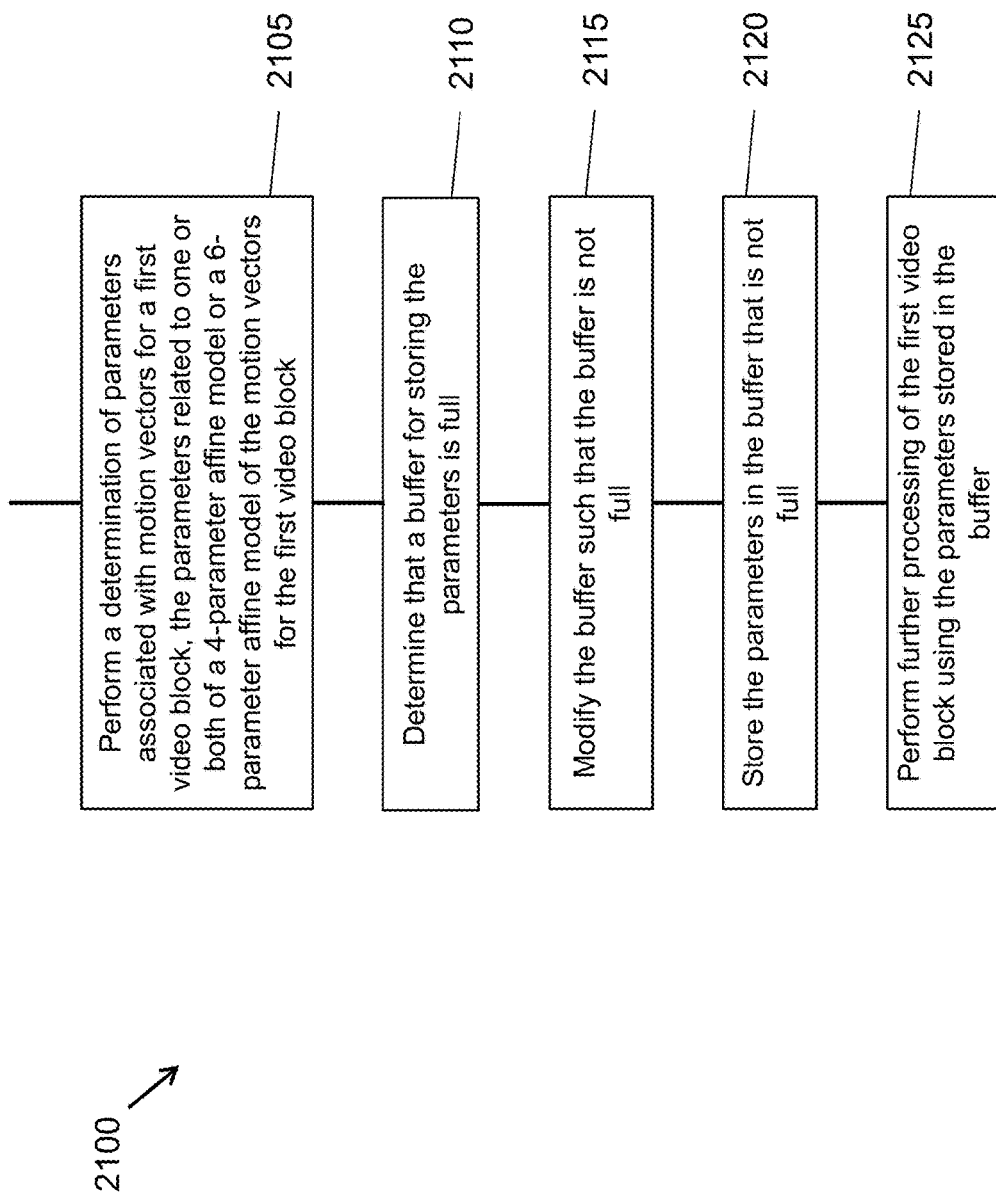
FIG. 20 is a flowchart for an example of a video processing method.

FIG. 20 is a flowchart for a method 2100 of processing a video. The method 2100 includes performing a determination (2105) of parameters associated with motion vectors for a first video block, the parameters related to one or both of a 4-parameter affine model or a 6-parameter affine model of the motion vectors for the first video block, determining (2110) that a buffer for storing the parameters is full, modifying (2115) the buffer such that the buffer is not full, storing (2120) the parameters in the buffer that is not full, and performing (2125) further processing of the first video block using the parameters stored in the buffer.

Figure 21:
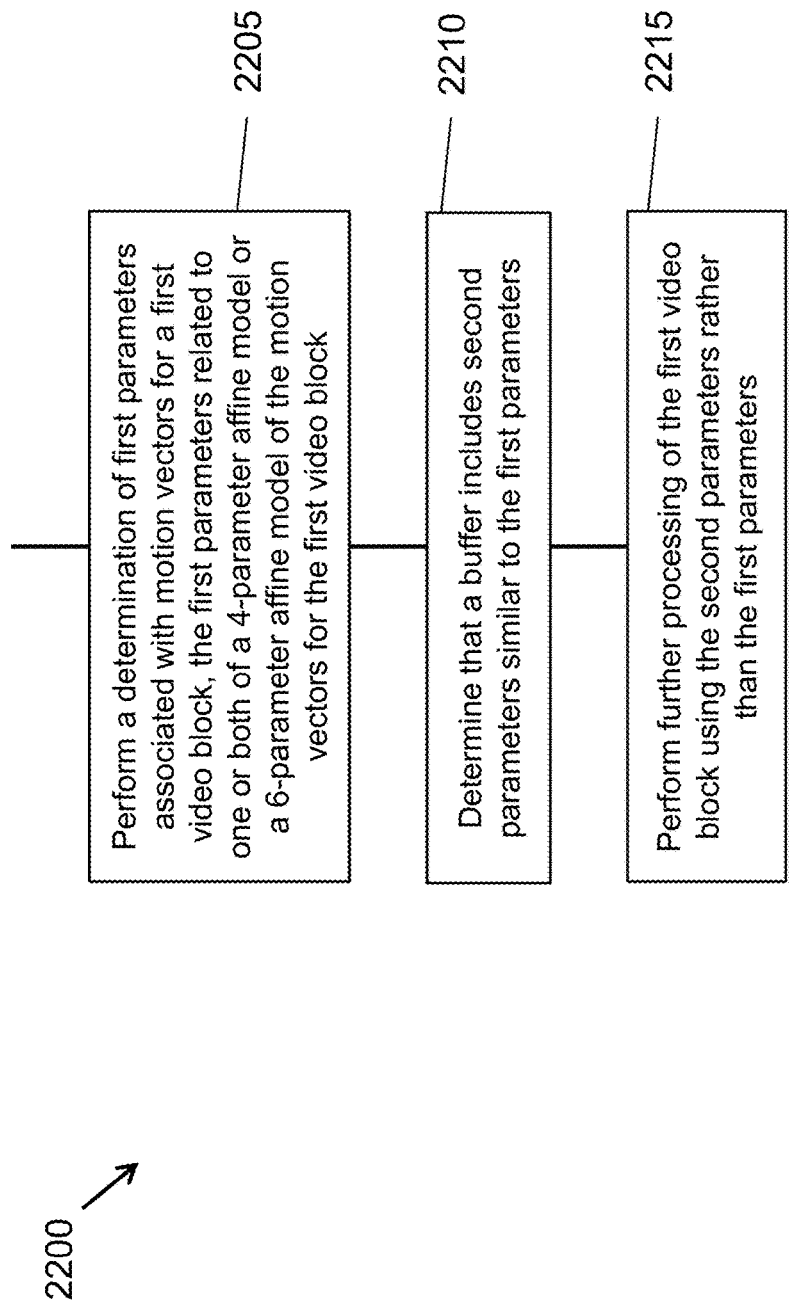
FIG. 21 is a flowchart for an example of a video processing method.

FIG. 21 is a flowchart for a method 2200 of processing video. The method 2200 includes performing a determination (2205) of first parameters associated with motion vectors for a first video block, the first parameters related to one or both of a 4-parameter affine model or a 6-parameter affine model of the motion vectors for the first video block, determining (2210) that a buffer includes second parameters similar to the first parameters, and performing (2215) further processing of the first video block using the second parameters rather than the first parameters.

Figure 22:
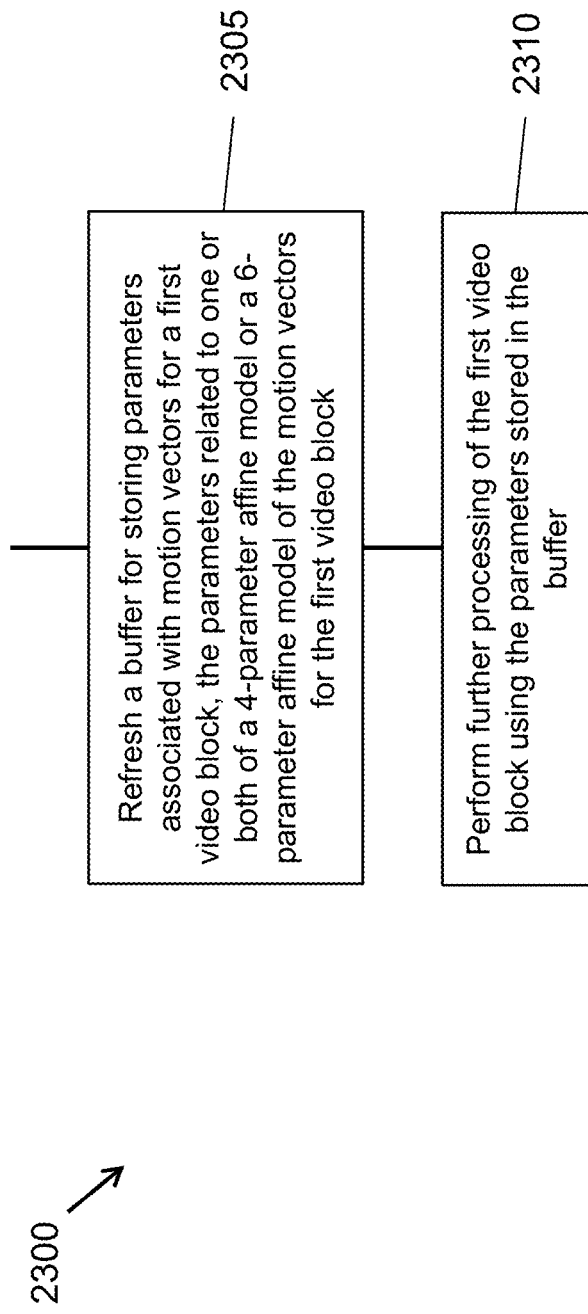
FIG. 22 is a flowchart for an example of a video processing method.

FIG. 22 is a flowchart for a method 2300 of processing video. The method 2300 includes refreshing (2305) a buffer for storing parameters associated with motion vectors for a first video block, the parameters related to one or both of a 4-parameter affine model or a 6-parameter affine model of the motion vectors for the first video block, performing (2310) further processing of the first video block using the parameters stored in the buffer.

Figure 23:
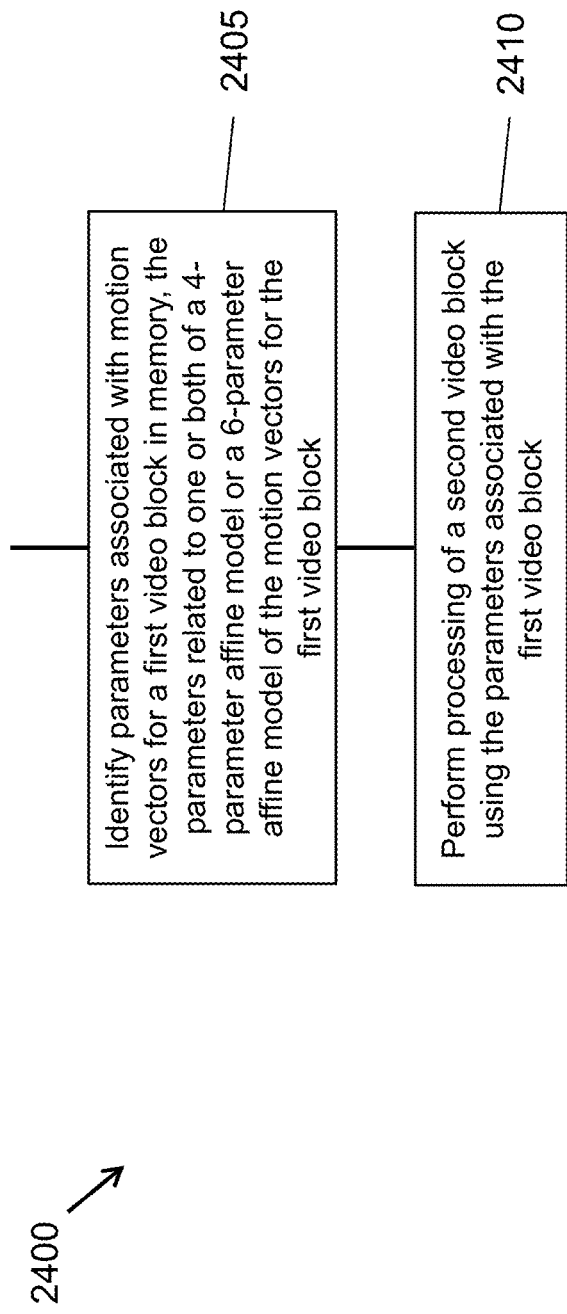
FIG. 23 is a flowchart for an example of a video processing method.

FIG. 23 is a flowchart for a method 2400 of processing video. The method 2400 includes identifying (2405) parameters associated with motion vectors for a first video block in memory, the parameters related to one or both of a 4-parameter affine model or a 6-parameter affine model of the motion vectors for the first video block, and performing (2410) further processing of a second video block using the parameters associated with the first video block.

Figure 24:
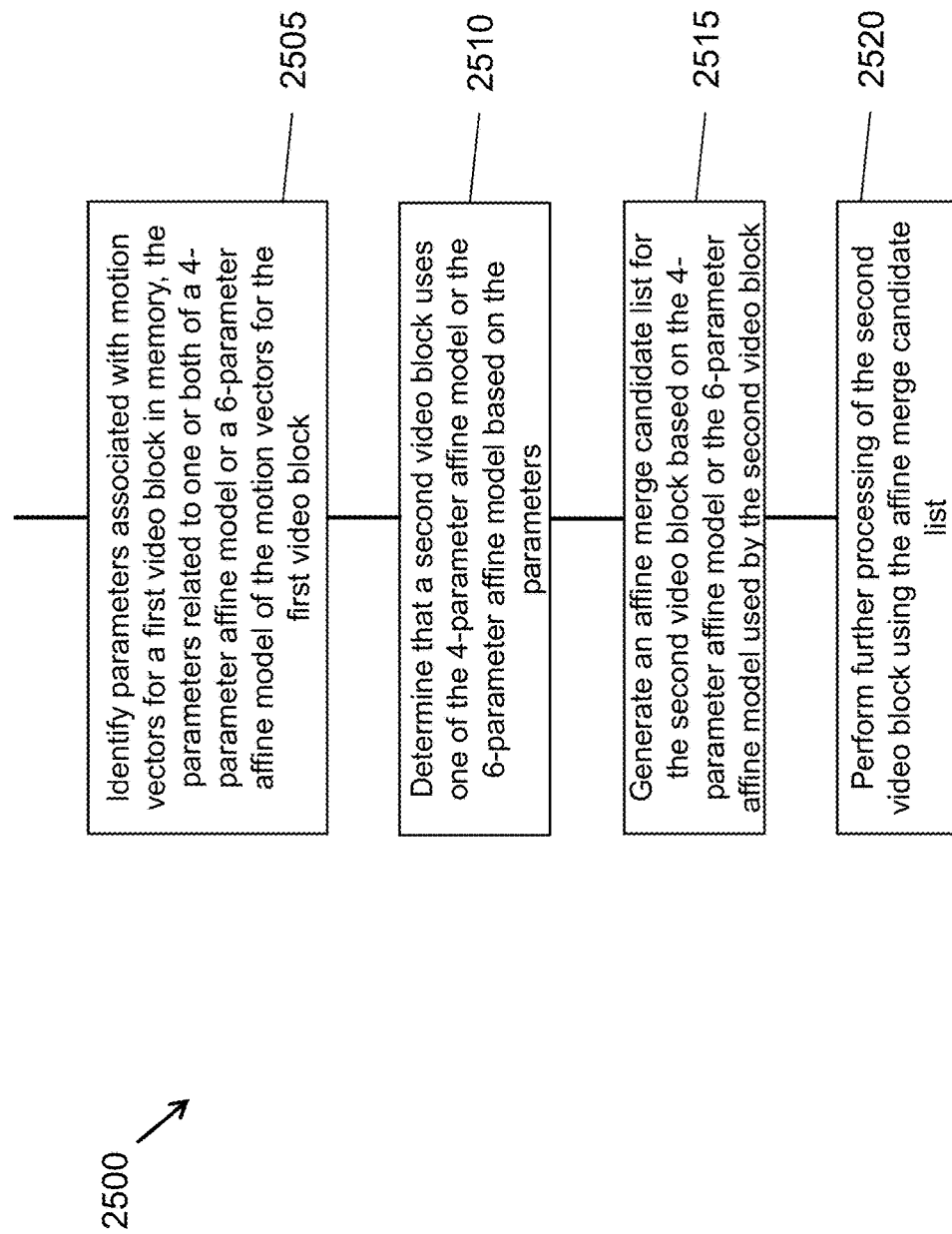
FIG. 24 is a flowchart for an example of a video processing method.

FIG. 24 is a flowchart for a method 2500 of processing video. The method 2500 includes identifying (2505) parameters associated with motion vectors for a first video block in memory, the parameters related to one or both of a 4-parameter affine model or a 6-parameter affine model of the motion vectors for the first video block, determining (2510) that a second video block uses one of the 4-parameter affine model or the 6-parameter affine model based on the parameters, generating (2515) an affine merge candidate list for the second video block based on the 4-parameter affine model or the 6-parameter affine model used by the second video block, and performing (2520) further processing of the second video block using the affine merge candidate list.

Figure 26:
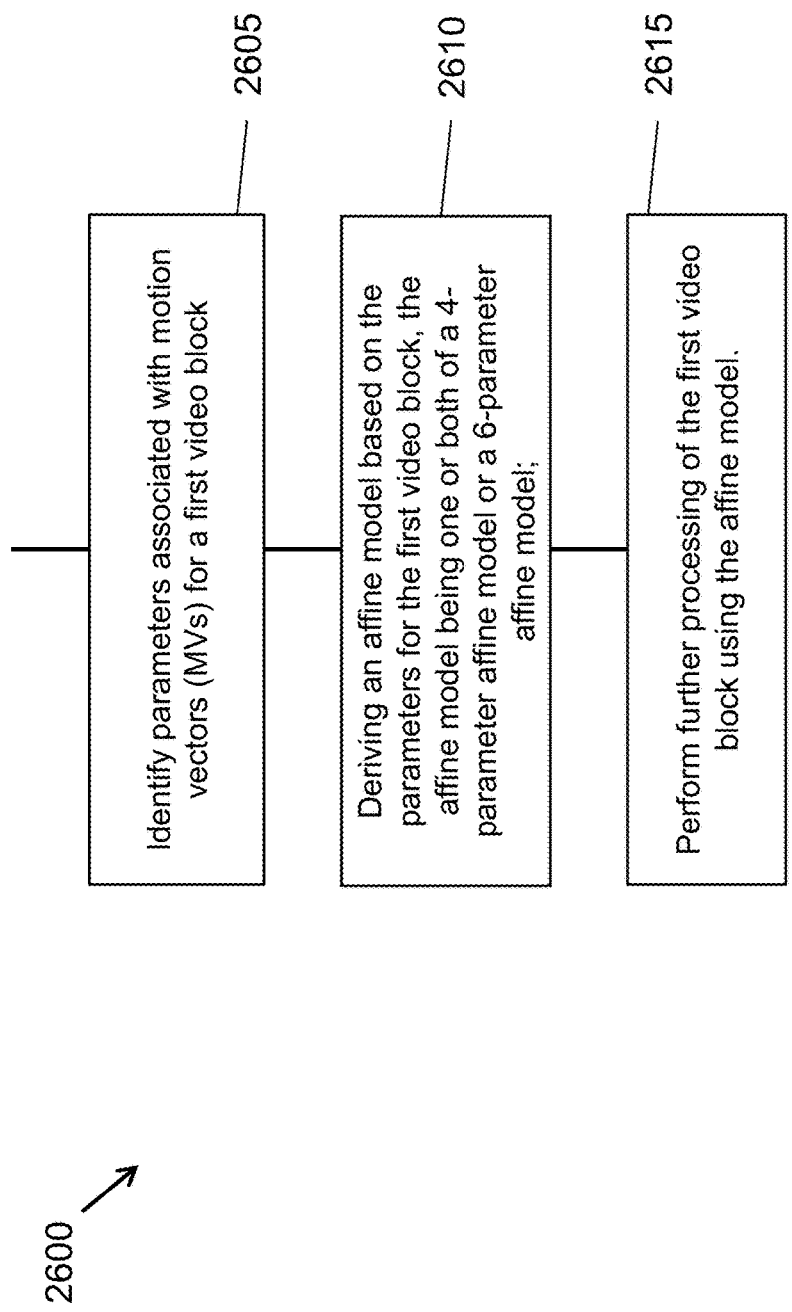
FIG. 26 is a flowchart for an example of a video processing method.

FIG. 26 is a flowchart for a method 2600 of processing video. The method 2600 includes identifying (2605) parameters associated with motion vectors (MVs) for a first video block, deriving (2610) an affine model based on the parameters for the first video block, the affine model being one or both of a 4-parameter affine model or a 6-parameter affine model, and performing (2615) further processing of the first video block using the affine model.

With reference to methods 1900, 2000, 2100, 2200, 2300, 2400, 2500, and 2600, some examples of determining a candidate for encoding and their use are described in Section 4 of the present document. For example, as described in Section 4, video blocks can be processed using in accordance with parameters associated with a 4-parameter affine model or a 6-parameter affine model.

With reference to methods 1900, 2000, 2100, 2200, 2300, 2400, 2500, and 2600, a video block may be encoded in the video bitstream in which bit efficiency may be achieved by using a bitstream generation rule related to motion information prediction.

The methods can include wherein four parameters related to the 6-parameter affine model are stored in the memory, and two other parameters related to the 6-parameter affine model are not stored in the memory.

The methods can include wherein two parameters related to the 4-parameter affine model are stored in the memory, and two other parameters related to the 4-parameter affine model are not stored in the memory.

The methods can include determining that the first video block is coded with the 4-parameter affine model, wherein storing the parameters includes storing four parameters related to the 4-parameter affine model.

The methods can include wherein a first number of parameters related to the 4-parameter affine model are stored, and a second number of parameters related to the 6-parameter affine model are stored, the first number and the second number being the same.

The methods can include wherein a first number of parameters related to the 4-parameter affine model are stored, and a second number of parameters related to the 6-parameter affine model are stored, the first number and the second number being different.

The methods can include determining a characteristic of coding the first video block, the characteristic including one or more of: affine mode, a use of inter or merge mode, a size of the first video block, a picture type, wherein the parameters that are stored are based on the characteristic of the coding of the first video block.

The methods can include storing one or more of: inter prediction direction, or reference index.

The methods can include determining that the first video block is bi-predicted; and storing parameters used for list 0 and list 1 based on the determination that the first video block is bi-predicted.

The methods can include wherein the parameters used for list 0 are stored in a first buffer, and the parameters used for list 1 are stored in a second buffer, the first buffer and the second buffer being different.

The methods can include wherein the parameters used for list 0 and list 1 are stored with prediction from one of list 0 or list 1 to the other.

The methods can include storing, in the memory, a width of the first video block, wherein performing further processing of the first video block is based on the width.

The methods can include storing, in the memory, a height of the first video block, wherein performing further processing of the first video block is based on the height.

The methods can include storing, in the memory, information indicative of a top-left coordinate of the first video block, wherein performing further processing of the first video block is based on the top-left coordinate.

The methods can include determining the parameters without use of division operations.

The methods can include clipping the parameters before storing the parameters in the memory.

The methods can include wherein the parameters are stored after the first video block is decoded or encoded.

The methods can include determining a characteristic of coding the first video block, the characteristic including one or more of: a coded affine mode, a number of affine-coded video blocks, a position of the first video block, or a dimension of the first video block, wherein the parameters that are stored are based on the characteristic of the coding of the first video block.

The methods can include determining that a second video block is affine-coded; and determining that the first video block is a Kth affine-coded block, wherein the parameters associated with the first video block are stored in the memory based on the first video block being a Kth affine-coded block, and the second video block is not stored in the memory.

The methods can include wherein K is 2 or 4.

The methods can include wherein K is signaled from an encoder to a decoder in a video parameter set (VPS), a sequence parameter set (SPS), a picture parameter set (PPS), a slice header, a tile group header, or a tile.

The methods can include wherein the memory stores a maximum M sets of parameters.

The methods can include wherein M is 8 or 16.

The methods can include wherein M is signaled from an encoder to a decoder in a VPS, a SPS, a picture parameter set PPS, a slice header, a tile group header, a tile, a coding tree unit (CTU) line, or a CTU.

The methods can include wherein modifying the buffer such that the buffer is not full includes removing an earliest stored parameter from the buffer.

The methods can include wherein modifying the buffer such that the buffer is not full includes removing a latest stored parameter from the buffer.

The methods can include performing a determination, by a processor, of third parameters associated with motion vectors for a first video block, the third parameters related to one or both of a 4-parameter affine model or a 6-parameter affine model of the motion vectors for the first video block; determining that the second parameters stored in the buffer are different than the third parameters; storing the third parameters in the buffer based on the determination that the second parameters are different than the third parameters; and performing further processing of the first video block using the third parameters.

The methods can include wherein the determining that the second parameters stored in the buffer are different than the third parameters includes determining that the second parameters and the third parameters are associated with different inter prediction directions.

The methods can include wherein the determining that the second parameters stored in the buffer are different than the third parameters includes determining that the second parameters and the third parameters are associated with different reference indices for list 0 when list 0 is used as a prediction direction.

The methods can include wherein the determining that the second parameters stored in the buffer are different than the third parameters includes determining that the second parameters and the third parameters are associated with different reference indices for list 1 when list 1 is used as a prediction direction.

The methods can include wherein the determining that the second parameters stored in the buffer are different than the third parameters includes determining that the second parameters include a first number of parameters and that the third parameters include a second number of parameters, the first number and the second numbers being different.

The methods can include wherein the determining that the second parameters stored in the buffer are different than the third parameters includes determining that the second parameters include a first number of parameters and that the third parameters include a second number of parameters, the first number and the second numbers being different.

The methods can include wherein the determining that the second parameters stored in the buffer are different than the third parameters includes determining that one the second parameters or the third parameters is associated with the 4-parameter affine model, and the other is associated with the 6-parameter affine model.

The methods can include wherein refreshing the buffer includes having no parameters stored in the buffer.

The methods can include wherein refreshing the buffer includes configuring the buffer to be in an empty state associated with no parameters being stored, and storing default parameters in the buffer based on the buffer being in the empty state.

The methods can include wherein the default parameters are based on a sequence.

The methods can include wherein the default parameters are based on a picture.

The methods can include wherein the default parameters are based on a slice.

The methods can include wherein the default parameters are based on a tile.

The methods can include wherein the default parameters are based on a CTU line.

The methods can include wherein the default parameters are based on a CTU.

The methods can include wherein the default parameters are signaled from an encoder to a decoder in a VPS, a SPS, a picture parameter set PPS, a slice header, a tile group header, a tile, a CTU line, or a CTU.

The methods can include determining that the first video block is a first block of a picture, wherein refreshing the buffer is based on the determination that the first video block is the first block of the picture.

The methods can include determining that the first video block is a first block of a slice, wherein refreshing the buffer is based on the determination that the first video block is the first block of the slice.

The methods can include determining that the first video block is a first block of a tile, wherein refreshing the buffer is based on the determination that the first video block is the first block of the tile.

The methods can include determining that the first video block is a first block of a CTU line, wherein refreshing the buffer is based on the determination that the first video block is the first block of the CTU line.

The methods can include determining that the first video block is a first block of a CTU, wherein refreshing the buffer is based on the determination that the first video block is the first block of the CTU.

The methods can include wherein the parameters are used for motion vector prediction or motion vector coding of the second video block.

The methods can include wherein the parameters are used for deriving control point motion vectors (CPMVs) of the second video block.

The methods can include determining that the second video block is coded with the 4-parameter affine model, and performing further processing of the second video block prioritizes parameters associated with the 4-parameter affine model over parameters associated with the 6-parameter affine model.

The methods can include determining that the second video block is coded with the 6-parameter affine model, and performing further processing of the second video block prioritizes parameters associated with the 6-parameter affine model over parameters associated with the 4-parameter affine model.

The methods can include identifying motion information of the first video block, the first video block neighboring the second video block, and wherein performing further processing of the second video block includes using the motion information of the first video block.

The methods can include wherein the motion information is also stored in the buffer, and the motion information and the parameters are used to derive CPMVs of the second video block.

The methods can include wherein motion vectors are also stored in the buffer, and the motion vectors and the parameters are used to derive CPMVs of the second video block.

The methods can include wherein the affine merge candidate list inherits inter-prediction direction and reference indices associated with the parameters.

The methods can include wherein the parameters are used to generate advanced motion vector prediction (AMVP) candidates.

The methods can include wherein the parameters refer to a same reference picture.

The methods can include wherein a reference picture list associated with the parameters is the same as a target reference picture list.

The methods can include wherein a reference index associated with the parameters is the same as a target reference index.

The methods can include wherein a number of sets of parameters stored in the memory used to generate the affine merge candidate list is N.

The methods can include wherein N is signaled from an encoder to a decoder in a VPS, a SPS, a picture parameter set PPS, a slice header, a tile group header, or a tile.

The methods can include wherein N is based on a dimension of the second video block or coding mode information of the second video block.

The methods can include wherein N is based on a standard profile, a level, or a tier.

The methods can include wherein N is pre-defined.

The methods can include wherein the affine merge candidate list is in an ascending order of indices.

The methods can include wherein the affine merge candidate list is in a descending order of indices.

The methods can include wherein the affine merge candidate list is in a descending or ascending order of indices based on a number of available candidates.

The methods can include wherein the 4-parameter affine model is stored as a 6-parameter affine model with the same number of parameters, and some stored parameters of the 6-parameter affine model are derived from the parameters of the 4-parameter affine model.

The methods can include storing a base motion vector (MV) ($mv_0^h$, $mv_0^v$) in the memory, and wherein the further processing is also based on the base MV.

The methods can include storing a coordinate of a position of a base motion vector (MV) in the memory, and wherein the further processing is also based on the base MV, and wherein the further processing is also based on the base MV.

The methods can include wherein parameters indicative of a and b are also stored in the memory.

The methods can include storing a base motion vector (MV) ($mv_0^h$, $mv_0^v$) in the memory and parameters indicative of a, b, c, and d in the memory, and wherein the further processing is also based on the base MV.

The methods can include storing a coordinate of a position of a base motion vector (MV) and parameters a, b, c, and d in the memory, and wherein the further processing is also based on the base MV.

The methods can include identifying characteristics of the parameters, wherein the affine model is derived based on the characteristics, the characteristics including one or more of base motion vectors (MVs) of the parameters or positions of the MVs.

The methods can include wherein deriving the affine model includes deriving one or both of control point motion vectors (CPMVs) or the MVs.

The methods can include wherein deriving the affine model includes deriving the CPMVs, and the CPMVs of the first video block are derived from the MVs and parameters.

The methods can include wherein deriving the affine model includes using motion information of a neighboring video block of the first video block.

The methods can include wherein CPMVs associated with the first video block are derived from MVs of a neighboring video block of the first video block.

The methods can include wherein the CPMVs are used to derive MVs for each sub-block of the first video block.

The methods can include wherein a temporal motion vector prediction (TMVP) is also used with the parameters to derive the affine model.

The methods can include wherein the TMVP is used to derive CPMVs or MVs of sub-blocks of the first video block.

The methods can include wherein deriving the affine model is further based on motion information of a collocated video block in a collocated picture related to the first video block.

The methods can include deriving affine merge candidates from the parameters; and adding a spatial neighboring video block that is non-adjacent to the first video block in an affine merge candidate list including the affine merge candidates.

The methods can include wherein the affine merge candidates and the spatial neighboring video block are included in the affine merge candidate list after inherited affine merge candidates.

The methods can include wherein the affine merge candidates and the spatial neighboring video block are included in the affine merge candidate list after a first constructed affine merge candidate.

The methods can include wherein the affine merge candidates and the spatial neighboring video block are included in the affine merge candidate list after a first merge candidate constructed from spatial neighboring blocks.

The methods can include wherein the affine merge candidates and the spatial neighboring video block are included in the affine merge candidate list after constructed affine merge candidates.

The methods can include wherein the affine merge candidates and the spatial neighboring video block are included in the affine merge candidate list after zero affine merge candidates.

The methods can include wherein the affine merge candidates and the spatial neighboring video block are included in the affine merge candidate list in order.

The methods can include adding a temporal unit block in the affine merge candidate list.

The methods can include wherein the temporal unit block is added in the merge candidate list after inherited affine merge candidates.

The methods can include wherein the temporal unit block is added in the merge candidate list after a first constructed affine merge candidate.

The methods can include wherein the temporal unit block is added in the merge candidate list after a first affine merge candidate constructed from spatial neighboring blocks of the first video block.

The methods can include a spatial neighboring or non-adjacent video block of the first video block is added in the affine merge candidate list.

The methods can include wherein the spatial neighboring or non-adjacent video block is added to the affine merge candidate list after inherited affine AMVP candidates.

The methods can include wherein a size of the affine merge candidate list is increased based on a determination that affine merge candidates derived from the parameters are able to be put in the affine merge candidate list.

The methods can include wherein a size of the affine merge candidate list is increased based on a determination that affine AMVP candidates derived from the parameters are able to be put in the affine merge candidate list.

The methods can include deriving a virtual affine model based on multiple affine models stored in the memory, wherein performing further processing of the first video block includes using the virtual affine model.

The methods can include wherein generating the affine merge candidate list includes excluding affine merge candidates that are inherited from spatial neighboring video blocks from being inserted in a sub-block based merge candidate list, and history-based merge candidates are inserted to the sub-block merge candidate list.

The methods can include wherein the history-based merge candidates are inserted after ATMVP candidates.

The methods can include wherein the history-based merge candidates are inserted before constructed affine merge candidates.

The methods can include wherein generating the affine merge candidate list includes inserting affine merge candidates that are inherited from spatial neighboring video blocks in a sub-block based merge candidate based on a position of the spatial neighboring video blocks.

The methods can include wherein the position is within a same coding tree unit (CTU) or a CTU row as the current video block.

The methods can include wherein the position is outside a same coding tree unit (CTU) or a CTU row as the current video block.

The methods can include wherein generating the affine merge candidate list includes excluding affine AMVP candidates that are inherited from spatial neighboring video blocks from being inserted in an affine motion vector prediction (MVP) candidate list, and history-based merge candidates are inserted in the affine MVP candidate list.

The methods can include wherein the history-based merge candidates are inserted first into the affine MVP candidate list.

The methods can include wherein generating the affine merge candidate list includes inserting an affine AMVP candidate inherited from a spatial neighboring video block in an affine MVP candidate list based on a position of the spatial neighboring video block.

The methods can include wherein the position is within a same coding tree unit (CTU) or CTU row as the current video block.

The methods can include wherein the position is not within a same CTU or CTU row as the current video block.

The methods can include wherein the affine model parameters are also clipped before being used for coding or decoding affine-coded blocks.

The methods can include wherein clipping boundaries are based on a precision of the affine model parameters.

The methods can include wherein clipping boundaries are based on a width and a height of the first video block.

The methods can include wherein clipping boundaries are signaled in a video parameter set (VPS), a sequence parameter set (SPS), a picture parameter set (PPS), a picture header, a slice header, or a tile group header.

The methods can include wherein clipping boundaries are based on a profile or a level of a standard.

The methods can include wherein the inherited affine merge candidate is from a video block in a current coding tree unit (CTU).

The methods can include wherein the affine merge candidate is inserted before inherited affine merge candidates.

The methods can include determining that the HMVP buffer is empty; and adding an inherited affine merge candidate into the list based on the determination that the HMVP buffer is empty.

The methods can include wherein the inherited affine AMVP candidate is from a video block in a current coding tree unit (CTU) row.

The methods can include wherein the affine HMVP buffer includes multiple buffers, each of the multiple buffers corresponding to storage of affine parameters or control point motion vectors (CPMVs) in different categories.

The methods can include wherein the multiple buffers include a first buffer to store affine parameters in reference list 0 and a second buffer to store affine parameters in reference list 1.

The methods can include wherein the multiple buffers are used to store affine parameters referring to different indices in different reference lists.

The methods can include wherein the CPMVs or the affine parameters referring to a reference K in a list X are used to update the HMVP buffer for reference K in list X, wherein X is 0 or 1, and K is 0, 1, or 2.

The methods can include wherein the CPMVs or the affine parameters referring to a reference K are used to update the HMVP buffer for reference L in list X, wherein K>=L, X is 0 or 1, and K is an integer.

The methods can include wherein a size of each of the multiple buffers is different.

The methods can include wherein the size is based on a reference picture index.

The methods can include wherein the affine HMVP buffers are updated based on a coding mode or coding information of a current coding unit (CU).

The methods can include wherein the current CU is coded with affine merge mode, and the affine HMVP buffer is not updated based on the current CU being coded with affine merge mode.

The methods can include wherein the affine HMVP buffer is updated based on the current CU being coded with affine mode.

The methods can include wherein updating the HMPV buffer is skipped based on the current CU coded with affine merge mode and uses a shared merge list.

Figure 28:
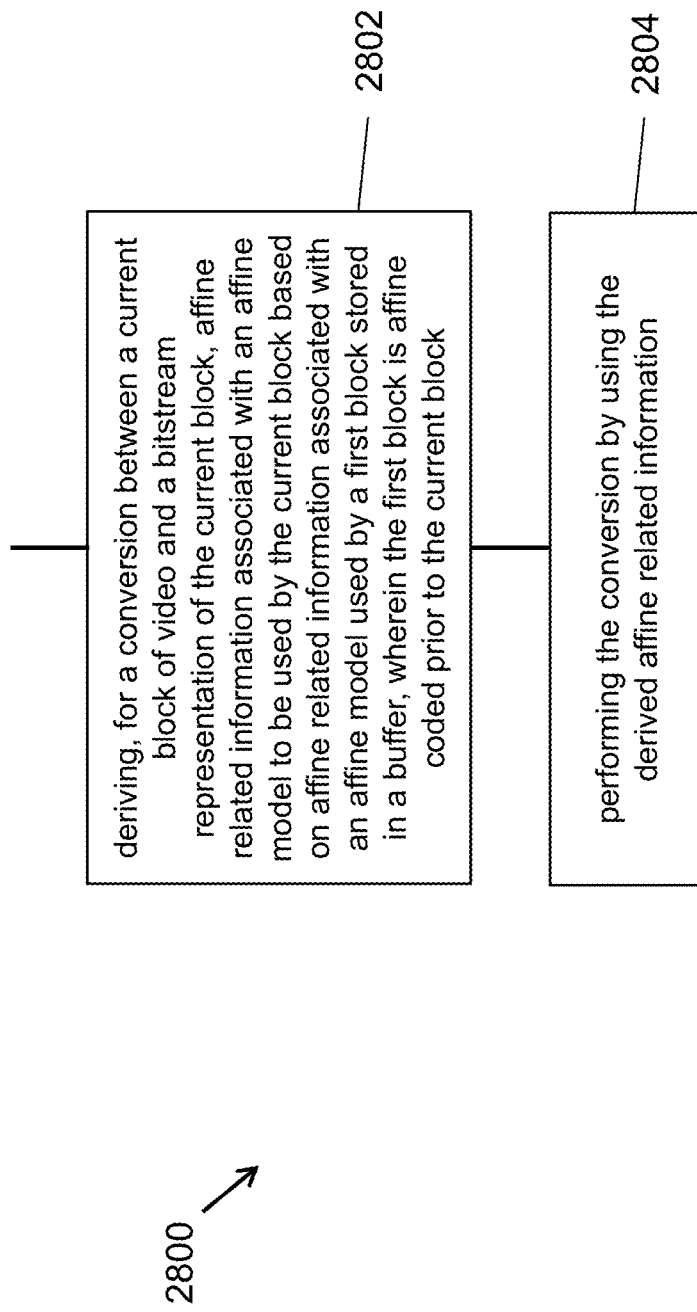
FIG. 28 is a flowchart for an example of a video processing method.

FIG. 28 is a flowchart for a method 2800 of processing video. The method 2800 includes deriving (2802), for a conversion between a current block of video and a bitstream representation of the current block, affine related information associated with an affine model to be used by the current block based on affine related information associated with an affine model used by a first block stored in a buffer, wherein the first block is affine coded prior to the current block; and performing (2804) the conversion by using the derived affine related information.

In some examples, the affine model includes at least one of a 4-parameter affine model and a 6-parameter affine model.

In some examples, the affine related information stored in the buffer includes a first set of affine parameters associated with the affine model for the first block.

In some examples, when the 6-parameter affine model is applied to the conversion of the first block, six parameters related to the 6-parameter affine model are stored in the buffer, or when the 4-parameter affine model is applied to the conversion of the first block, four parameters related to the 4-parameter affine model are stored in the buffer.

In some examples, when the 6-parameter affine model is applied to the conversion of the first block, four parameters related to the 6-parameter affine model are stored in the buffer, and two other parameters related to the 6-parameter affine model are not stored in the buffer.

In some examples, when the 4-parameter affine model is applied to the conversion of the first block, two parameters related to the 4-parameter affine model are stored in the buffer, and two other parameters related to the 4-parameter affine model are not stored in the buffer.

In some examples, six parameters related to the 6-parameter affine model are always stored in the buffer, and when the 4-parameter affine model is applied to the conversion of the first block, a first parameter of the six parameters is set to be same as a second parameter of the six parameters, and a third parameter of the six parameters is set to be a negative value of a fourth parameter of the six parameters.

In some examples, four parameters related to the 6-parameter affine model are always stored in the buffer, and when the 4-parameter affine model is applied to the conversion of the first block, a first parameter of the four parameters is set to be same as a second parameter of the four parameters, and a third parameter of the four parameters is set to be a negative value of a fourth parameter of the four parameters.

In some examples, a first number of parameters related to the 4-parameter affine model are stored, and a second number of parameters related to the 6-parameter affine model are stored, the first number and the second number being the same.

In some examples, the first number and the second number are 4 or 6.

In some examples, a first number of parameters related to the 4-parameter affine model are stored, and a second number of parameters related to the 6-parameter affine model are stored, the first number and the second number being different.

In some examples, the first number is 4 and the second number is 6.

In some examples, the method further comprising: determining a characteristic of the first block of video, wherein the characteristic including one or more of: affine mode, a use of inter or merge mode, a size of the first block, a picture type, wherein the affine parameters to be stored in the buffer are determined based on the characteristic of the first block of video.

In some examples, side information and/or affine model type including 4-parameter affine model or 6-parameter affine model associated with the affine parameters for affine model is stored in the buffer, the side information includes at least one of: inter prediction direction including list 0 or list 1 or Bi-direction and reference index for list 0 and/or list 1.

In some examples, when the first block is bi-predicted, the first set of affine parameters further include affine parameters used for list 0 and affine parameters used for list 1.

In some examples, the affine parameters used for list 0 are stored in a first buffer and the affine parameters used for list 1 are stored in a second buffer different from the first buffer.

In some examples, either of the parameters used for list 0 and the parameters used for list 1 are stored, and the stored affine parameters are used to predict the other parameters.

In some examples, the affine related information includes a first set of control point motion vectors (CPMVs) associated with the affine model for the first block.

In some examples, the method further comprising: storing a width of the first block together with the first set of CPMVs in the buffer; and/or storing a height of the first block together with the first set of CPMVs in the buffer; and/or storing information indicative of a top-left coordinate of the first block together with the first set of CPMVs in the buffer.

In some examples, the affine related information includes a base motion vector (MV) ($mv_0^h$, $mv_0^v$) associated with the affine model for the first block.

In some examples, the method further comprising: when the 4-parameter affine model is applied to the conversion of the first block, storing the based MV together with two parameters related to the 4-parameter affine model in the buffer.

In some examples, the method further comprising: storing a coordinate of the based MV together with the two parameters related to the 4-parameter affine model in the buffer.

In some examples, the method further comprising: when the 6-parameter affine model is applied to the conversion of the first block, storing the based MV together with four parameters related to the 6-parameter affine model in the buffer.

In some examples, storing a coordinate of the based MV together with the four parameters related to the 6-parameter affine model in the buffer.

In some examples, a set of stored affine parameters and their associated base MV refer to the same reference picture if they refer to the same reference picture list.

In some examples, the buffer is an affine history-based motion vector prediction (HMVP) buffer.

In some examples, the method further comprising: determining, whether to store the affine related information associated with affine model for the first block based on a characteristic of the first block, the characteristic including one or more of: a coded affine mode including affine advanced motion vector prediction (AMVP) and/or affine merge, a number of affine-coded video blocks, a position of the first block, or a dimension of the first block.

In some examples, the method further comprising: storing, for every Kth block of the video, affine related information associated with affine model for the block after decoding or encoding the block, K is an integer.

In some examples, K is 2 or 4.

In some examples, K is signaled in at least one of Sequence Parameter Set (SPS), Video Parameter Set (VPS), Picture Parameter Set (PPS), slice header, tile group header, tile.

In some examples, a number of sets of affine related information stored in the buffer is less than or equal to a preset maximum M, M is an integer.

In some examples, M is 8 or 16.

In some examples, M is signaled in at least one of Sequence Parameter Set (SPS), Video Parameter Set (VPS), Picture Parameter Set (PPS), slice header, tile group header, tile, coding tree unit (CTU), CTU line.

In some examples, M is different for different standard profiles/levels/tiers.

In some examples, the method further comprising: when the number of sets of affine related information stored in the buffer is less than the preset maximum M, storing a new set of affine related information to be stored after the last set of affine related information stored in the buffer.

In some examples, the method further comprising: when the number of sets of affine related information stored in the buffer is equal to the preset maximum M, discarding a new set of affine related information to be stored.

In some examples, the method further comprising: when the number of sets of affine related information stored in the buffer is equal to the preset maximum M, removing an entry for storing the set of affine related information stored in the buffer; and storing a new set of affine related information to be stored in the buffer.

In some examples, removing the earliest entry stored in the buffer.

In some examples, removing the last entry stored in the buffer.

In some examples, removing any entry stored in the buffer.

In some examples, in response to the entry being removed, storing the new set of affine related information in the buffer at a position corresponding to the removed entry.

In some examples, in response to the entry being removed, moving forward all entries after the removed entry in the buffer in an ascending order, and storing the new set of affine related information in the last entry of the buffer.

In some examples, in response to the entry being removed, moving backward all entries before the removed entry in the buffer in an descending order, and storing the new set of affine related information in the first entry of the buffer.

In some examples, the method further comprising refreshing the buffer.

In some examples, the buffer is emptied when being refreshed.

In some examples, the buffer is emptied when being refreshed, then one or more pieces of default affine related information are put into the buffer when being refreshed.

In some examples, the default affine related information is different for at least one of: different sequences, different pictures, different slices, different tiles, different CTU lines, different CTUs.

In some examples, the default affine related information is signaled in at least one of Sequence Parameter Set (SPS), Video Parameter Set (VPS), Picture Parameter Set (PPS), slice header, tile group header, tile, CTU, CTU line.

In some examples, buffer is refreshed when starting coding or decoding the first block of a picture, or when starting coding or decoding the first block of a slice, or when starting coding or decoding the first block of a tile, or when starting coding or decoding the first block of a CTU line, or when starting coding or decoding the first block of a CTU.

In some examples, the affine related information comprises at least one of affine parameters, CPMVs, a width, a height, or a top-left position, of the first block.

In some examples, the method further comprising: making a decision regarding coding mode and/or other coding information of a coding unit (CU) of the first block; and determining whether updating the buffer based on the decision.

In some examples, the method further comprising: in response to the decision indicating the CU is coded with affine merge mode and a merge candidate is derived from the buffer, the buffer is not updated after decoding the CU.

In some examples, the method further comprising: in response to the decision indicating the CU is coded with affine merge mode and a merge candidate is derived from the buffer, the buffer is updated by moving associated affine parameters to the last entry of the buffer.

In some examples, the method further comprising: whenever one block is coded with affine mode, the buffer is updated.

In some examples, the method further comprising: when one block is coded with affine merge mode and the block uses shared merge list, updating of the affine HMVP buffer is skipped.

In some examples, a maximum allowed size for the buffer is equal to 1.

In some examples, no counter is used to record the number of sets of affine parameters stored in the buffer.

In some examples, the buffer is at least one of the following: a table, or lookup table, or a First-In-First-Out (FIFO) table, or a stack, or a queue, or a list, or a link, or an array, or any other storage with any data structure.

In some examples, for a 4-parameter affine model, the first set of affine parameters includes at least one variable of a, b, c, d, $$a = \frac{(mv_1^h - mv_0^h)}{w}, b = \frac{(mv_1^v - mv_0^v)}{w}, c = \frac{(mv_2^h - mv_0^h)}{h}, d = \frac{(mv_2^v - mv_0^v)}{h},$$

where $(mv^h_0, mv^v_0)$ is motion vector of a top-left corner control point, $(mv^h_1, mv^v_1)$ is motion vector of a top-right corner control point and $(mv^h_2, mv^v_2)$ is motion vector of a bottom-left corner control point, w and h are width and height of the first block.

In some examples, for a 6-parameter affine model, the first set of affine parameters includes at least one variable of a, b, c, d, e, f, $$a = \frac{(mv_1^h - mv_0^h)}{w}, b = \frac{(mv_1^v - mv_0^v)}{w}, c = \frac{(mv_2^h - mv_0^h)}{h},$$
$$d = \frac{(mv_2^v - mv_0^v)}{h}, e = mv_0^h, f = mv_0^v, \text{ or } (e, f) = (mv_x, mv_y),$$

where $(mv_x, mv_y)$ is any MV used for coding the first block block, where $(mv^h_0, mv^v_0)$ is motion vector of a top-left corner control point, $(mv^h_1, mv^v_1)$ is motion vector of a top-right corner control point and $(mv^h_2, mv^v_2)$ is motion vector of a bottom-left corner control point, w and h are width and height of the first block.

Figure 29:
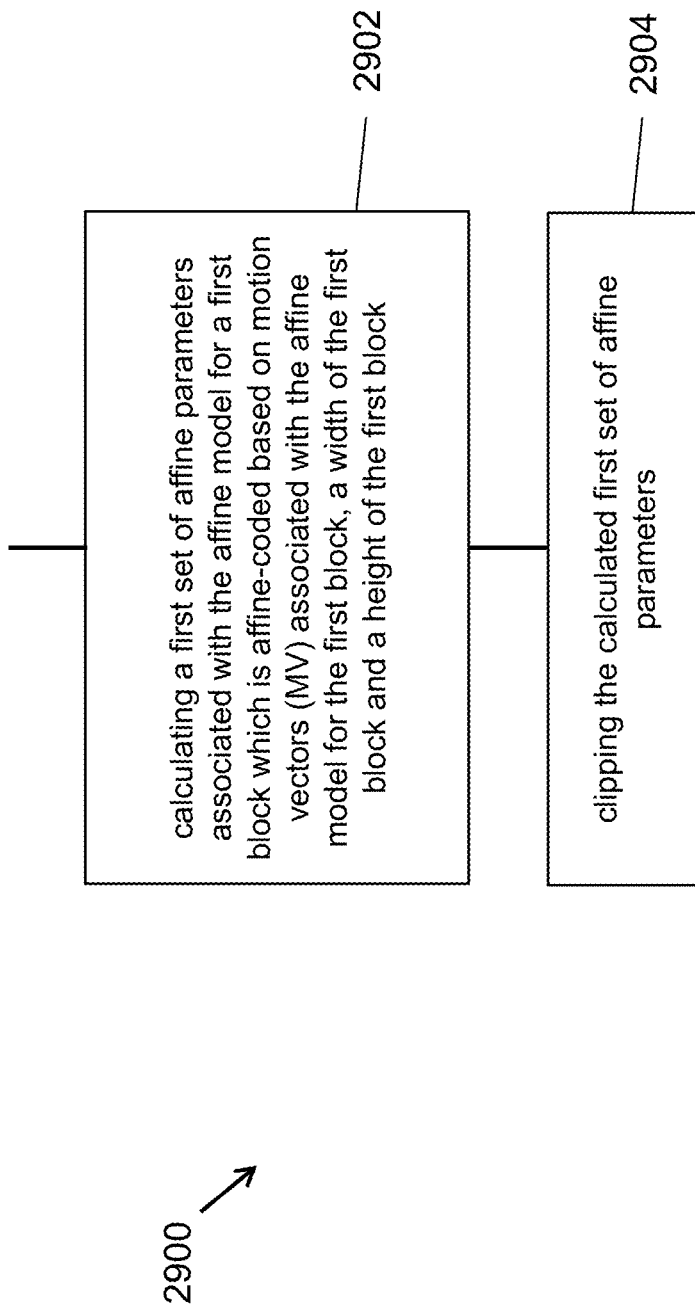
FIG. 29 is a flowchart for an example of a video processing method.

FIG. 29 is a flowchart for a method 2900 of processing video. The method 2900 includes, calculating (2902) a first set of affine parameters associated with the affine model for a first block which is affine-coded based on motion vectors (MV) associated with the affine model for the first block, a width of the first block and a height of the first block, and clipping (2904) the calculated first set of affine parameters.

In some examples, the calculating the first set of affine parameters comprises: calculating, without use of division operation, the first set of affine parameters associated with the affine model for the first block based on motion vectors (MV) associated with the affine model for the first block, a width of the first block and a height of the first block, an integer number defining the calculation precision.

In some examples, the method further comprising: clipping the first set of affine parameters before storing the affine parameters in the buffer.

In some examples, the first set of affine parameters are clipped based on bit depth of the affine parameters.

In some examples, an affine parameter of the first set of affine parameters is clipped to $[-2^{K-1}, 2^{K-1}-1]$, wherein K is an integer.

In some examples, K is equal to 7.

In some examples, the method further comprising: clipping the first set of affine parameters before deriving motion vectors (MV) for sub-blocks of the first block.

In some examples, the first set of affine parameters are clipped based on a set of clipping boundaries associated with the affine parameters.

In some examples, the clipping boundaries depend on at least one of: precision of the affine parameters which is determined by bit depth of the affine parameters, width and height of the first block, the profile of a standard or a level of a standard.

In some examples, the clipping boundaries are signaled in at least one of Sequence Parameter Set (SPS), Video Parameter Set (VPS), Picture Parameter Set (PPS), picture header, slice header, tile group header.

Figure 30:
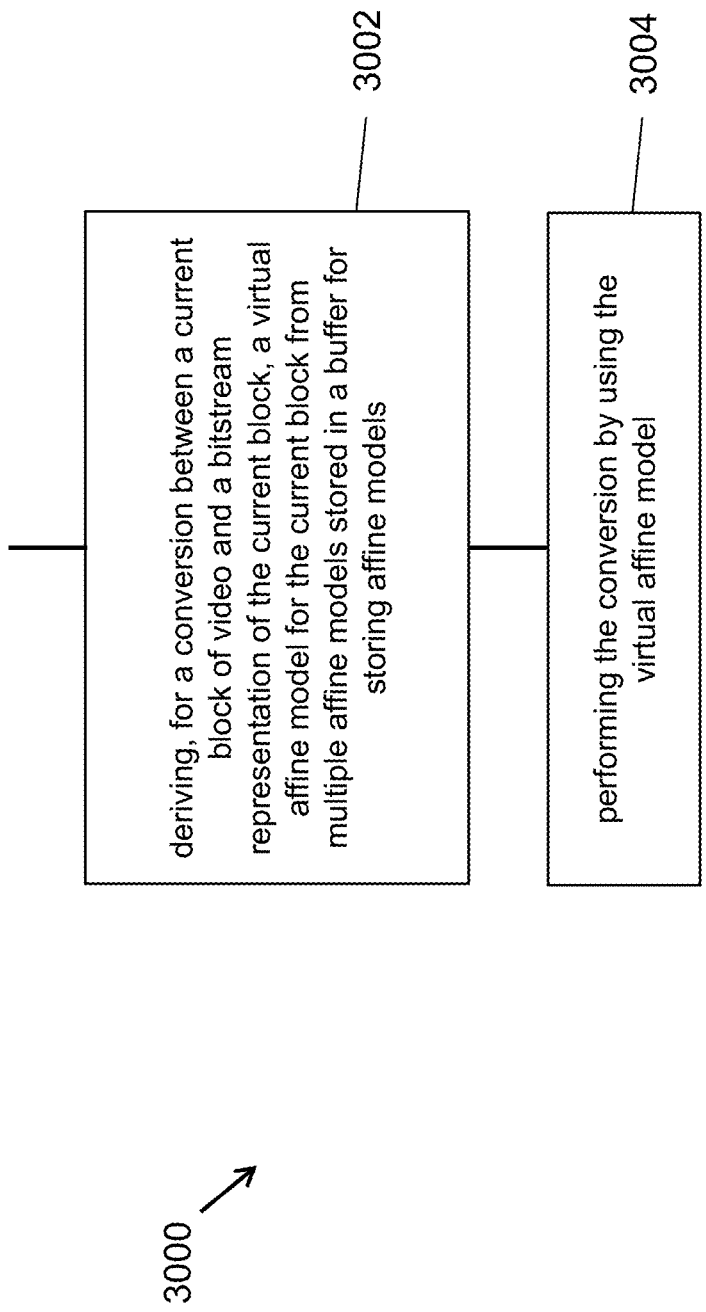
FIG. 30 is a flowchart for an example of a video processing method.

FIG. 30 is a flowchart for a method 3000 of processing video. The method 3000 includes, deriving (3002), for a conversion between a current block of video and a bitstream representation of the current block, a virtual affine model for the current block from multiple affine models stored in a buffer for storing affine models; performing (3004) the conversion by using the virtual affine model.

In some examples, parameters of a first affine model and a second affine model among the multiple affine models are combined to form the virtual affine model by taking one or more parameters from the first affine model and remaining parameters from the second affine model.

In some examples, parameters of a first affine model and a second affine model among the multiple affine models are jointly used to generate the virtual affine model by using a function, wherein the function is averaging.

In some examples, the virtual affine model for the current block includes at least one of a 4-parameter affine model and a 6-parameter affine model.

In some examples, the conversion generates the current block of video from the bitstream representation.

In some examples, the conversion generates the bitstream representation from the current block of video.

Figure 31:
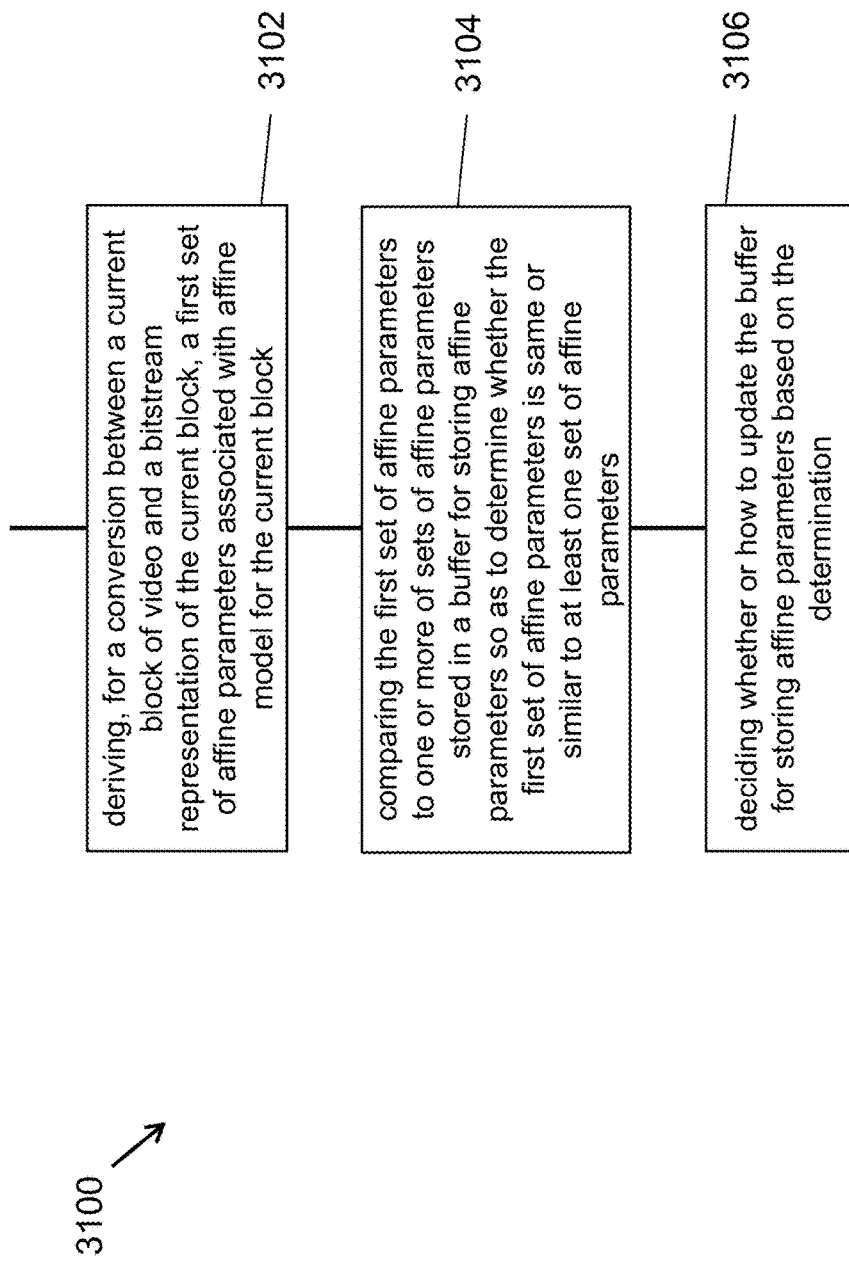
FIG. 31 is a flowchart for an example of a video processing method.

FIG. 31 is a flowchart for a method 3100 of processing video. The method 3100 includes, deriving (3102), for a conversion between a current block of video and a bitstream representation of the current block, a first set of affine parameters associated with affine model for the current block; comparing (3104) the first set of affine parameters to one or more sets of affine parameters stored in a buffer for storing affine parameters so as to determine whether the first set of affine parameters is same or similar to at least one set of affine parameters; and deciding (3106) whether or how to update the buffer for storing affine parameters using the first set of affine parameters based on the determination.

In some examples, the affine model for the current block includes at least one of a 4-parameter affine model and a 6-parameter affine model.

In some examples, for one prediction direction, in response to one or more parameters of the first set of affine parameters is same as the corresponding one or more parameters of the at least one set of affine parameters stored in the buffer, determining the first set of affine parameters is same or similar to at least one set of affine parameters.

In some examples, for one prediction direction, in response to an absolute difference between each of at least one parameter of the first set of affine parameters and a corresponding parameter of the at least one set of affine parameters stored in the buffer being less than a threshold corresponding to the each parameter, it is determined that the first set of affine parameters is same or similar to at least one set of affine parameters.

In some examples, the first set of affine parameters comprises variable a, b, c or d, or variable a, b, c, d, e, f, $$a = \frac{(mv_1^h - mv_0^h)}{w}, b = \frac{(mv_1^v - mv_0^v)}{w}, c = \frac{(mv_2^h - mv_0^h)}{h},$$
$$d = \frac{(mv_2^v - mv_0^v)}{h}, e = mv_0^h, f = mv_0^v, \text{or } (e, f) = (mv_x, mv_y),$$

where $(mv_x, mv_y)$ is any MV used for coding the first block block, where $(mv^h_0, mv^v_0)$ is motion vector of a top-left corner control point, $(mv^h_1, mv^v_1)$ is motion vector of a top-right corner control point and $(mv^h_2, mv^v_2)$ is motion vector of a bottom-left corner control point, w and h are width and height of the current block.

In some examples, the number of at least one parameter is one, and the at least one parameter comprises the variable a, b, c or d.

In some examples, the number of at least one parameter is two and the at least one parameter comprises variables a and b or comprises variables c and d.

In some examples, the number of at least one parameter is three and the at least one parameter comprises variables a, b and c.

In some examples, the number of at least one parameter is four and the at least one parameter comprises variables a, b c and d.

In some examples, the threshold is predefined number.

In some examples, the threshold depends on coding information of the current block, wherein the coding information includes width and/or height of the current block.

In some examples, the thresholds corresponding to different parameters are different for different standard profiles or levels or tiers.

In some examples, the threshold is signaled in in at least one of Sequence Parameter Set (SPS), Video Parameter Set (VPS), Picture Parameter Set (PPS), slice header, tile group header, tile, coding tree unit (CTU), CTU line.

In some examples, in response to the first set of affine parameters and another set of affine parameters to be compared being associated with different inter prediction direction, it is determined that the two sets of affine parameters are not same or similar, wherein the inter prediction direction includes list 0, list 1 or Bi-direction.

In some examples, when inter prediction direction list 0 is one prediction direction in use, in response to the first set of affine parameters and another set of affine parameters to be compared being associated with different reference indices for list 0, it is determined that the two sets of affine parameters are not same or similar.

In some examples, when inter prediction direction list 1 is one prediction direction in use, in response to the first set of affine parameters and another set of affine parameters to be compared being associated with different reference indices for list 1, it is determined that the two sets of affine parameters are not same or similar.

In some examples, in response to the first set of affine parameters and another set of affine parameters to be compared having different number of affine parameters or using different affine models, it is determined the two sets of affine parameters are not same.

In some examples, when the first set of affine parameters and another set of affine parameters to be compared being both associated with inter prediction direction bi-prediction, in response to parameters for list 0 and parameters for list 1 of the two sets of affine parameters being both same or similar, it is determined that the two sets of affine parameters are same or similar.

In some examples, the first set of affine parameters is compared to each set of affine parameters stored in the buffer for storing affine parameters.

In some examples, the first set of affine parameters is compared to a subset of sets of affine parameters stored in the buffer for storing affine parameters.

In some examples, the first set of affine parameters is compared to the first W or last W sets of affine parameters stored in the buffer for storing affine parameters, W is an integer.

In some examples, the first set of affine parameters is compared to one set in each W sets of affine parameters stored in the buffer for storing affine parameters, W is an integer.

In some examples, the method further comprising: in response to the determination indicating that the first set of affine parameters is same or similar to at least one set of affine parameters stored in the buffer, the first set of affine parameters is not stored in the buffer.

In some examples, the method further comprising: in response to the determination indicating that the first set of affine parameter is same or similar to one set of affine parameters stored in the buffer, removing the one set of affine parameters from the buffer; storing the first set of affine parameters in the buffer at a position corresponding to the removed one set of affine parameters.

In some examples, the method further comprising: in response to the determination indicating that the first set of affine parameter is same or similar to one set of affine parameters stored in the buffer, removing the one set of affine parameters from the buffer, moving forward all sets of affine parameters after the removed one set of affine parameters in the buffer in an ascending order, and storing the first set of affine parameters in the buffer at a position corresponding the last one set of affine parameters.

In some examples, the method further comprising: in response to the determination indicating that the first set of affine parameter is same or similar to one set of affine parameters stored in the buffer, removing the one set of affine parameters from the buffer, moving backward all sets of affine parameters before the removed one set of affine parameters in the buffer in a descending order, and storing the first set of affine parameters in the buffer at a position corresponding the first one set of affine parameters.

In some examples, the method further comprising: in response to the determination indicating that the first set of affine parameters is not same or similar to at least one set of affine parameters stored in the buffer, storing the first set of affine parameters in the buffer.

In some examples, the method further comprising: performing the conversion using the first set of affine parameters.

In some examples, the conversion generates the current block of video from the bitstream representation.

In some examples, the conversion generates the bitstream representation from the current block of video.

Figure 32:
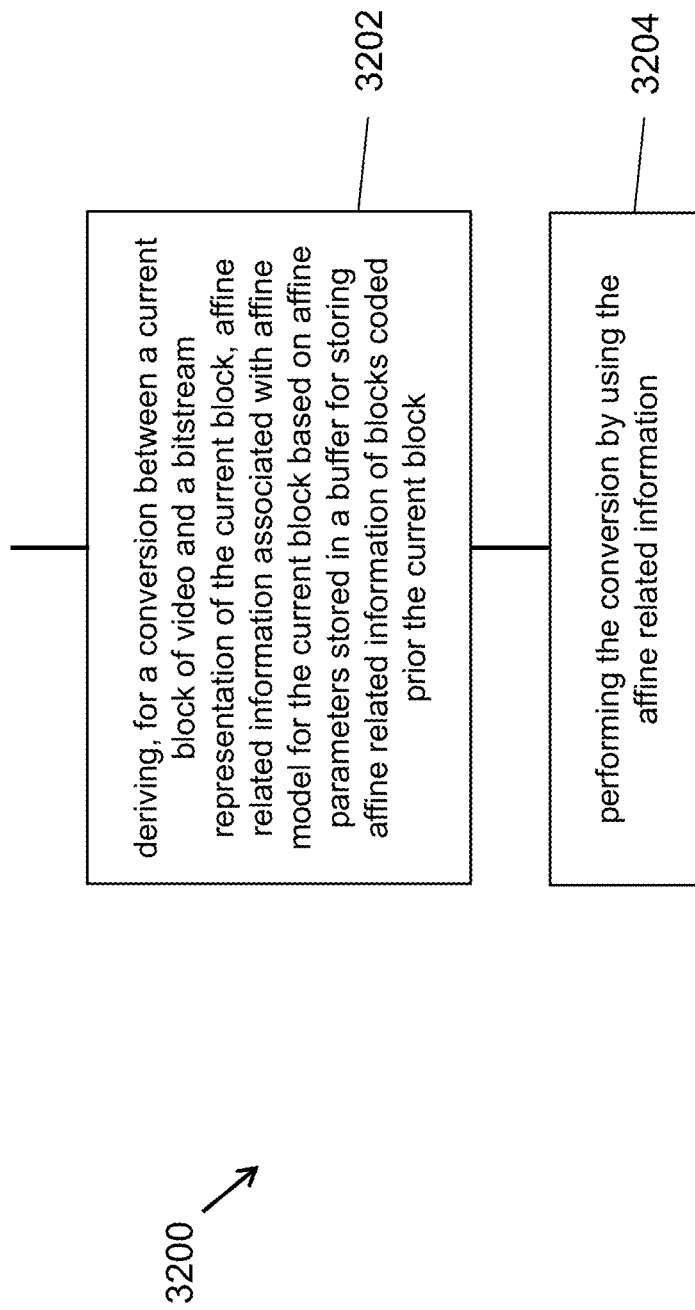
FIG. 32 is a flowchart for an example of a video processing method.

FIG. 32 is a flowchart for a method 3200 of processing video. The method 3200 includes, deriving (3202) for a conversion between a current block of video and a bitstream representation of the current block, affine related information associated with affine model for the current block based on affine parameters stored in a buffer for storing affine related information of blocks coded prior the current block; and performing (3204) the conversion by using the affine related information.

In some examples, the affine model for the current block includes at least one of a 4-parameter affine model and a 6-parameter affine model.

In some examples, the affine parameters stored in the buffer are used for motion vector prediction or motion vector coding of the current block.

In some examples, the affine related information includes control point motion vectors (CPMVs) for the current block.

In some examples, the affine related information includes motion vectors (MVs) used in motion compensation for sub-blocks of the current block.

In some examples, the affine related information includes prediction for control point motion vectors (CPMVs) of the current block, wherein the prediction for CPMVs are used to predict the CPMVs of the current block when CPMVs need to be coded.

In some examples, when the current block is coded with 4-parameter affine model, higher priority is assigned to 4-parameter affine model stored in the buffer and lower priority is assigned to 6-parameter affine model stored in the buffer.

In some examples, when the current block is coded with 6-parameter affine model, higher priority is assigned to 6-parameter affine model stored in the buffer and lower priority is assigned to 4-parameter affine model stored in the buffer.

In some examples, the deriving affine related information associated with affine model for the current block comprises: deriving the affine related information associated with affine model for the current block based on a set of the affine parameters stored in the buffer and additional motion information.

In some examples, the addition motion information includes at least one of motion information of a neighboring block, or motion information associated with the set of the affine parameters, or motion information of a spatial neighboring or non-adjacent unit block, or motion information of a temporal neighboring unit block/a collocated unit block in a collocated picture, the motion information at least includes a motion vector, a reference list indication and a reference picture index.

In some examples, deriving a CPMV for the current block is based on the set of the affine parameters, coordinate of a position for which the CPMV is to be derived, coordinate of a base position, and one of a base MV $(mv^h_0, mv^v_0)$ of the spatial or temporal neighboring block, or a base MV $(mv^h_0, mv^v_0)$ associated with the set of the affine parameters, or a base MV $(mv^h_0, mv^v_0)$ of the spatial neighboring or non-adjacent unit block, or a base MV $(mv^h_0, mv^v_0)$ of the temporal neighboring unit block, wherein the base position is associated with the based MV.

In some examples, deriving a CPMV for the current block is based on a disparity between the position for which the CPMV is to be derived, and the base position.

In some examples, the position is determined based on coordinate of a top-left corner of the current block, width and height of the current block, and the base position is determined based on coordinate of a top-left corner of the current block, dimensions of the neighbouring block or neighbouring unit block.

In some examples, deriving a MV used in motion compensation for a sub-block of the current block is based on the set of the affine parameters, coordinate of a position for which the MV $(mv^h(x,y), mv^v(x,y))$ is to be derived, coordinate of a base position, and one of a base MV $(mv^h_0, mv^v_0)$ of the spatial or temporal neighboring block or a base MV $(mv^h_0, mv^v_0)$ associated with the set of the affine parameters, or a base MV $(mv^h_0, mv^v_0)$ of the spatial neighboring or non-adjacent unit block, or a base MV $(mv^h_0, mv^v_0)$ of the temporal neighboring unit block.

In some examples, deriving a MV used in motion compensation for a sub-block of the current block is based on a disparity between the position for which the MV $(mv^h(x,y), mv^v(x,y))$ is to be derived, and the base position.

In some examples, the position is determined based on coordinate of a top-left corner of the sub-block, a center of the sub-block and block size of the sub-block.

In some examples, when the set of the affine parameters stored in the buffer is from a block coded with 4-parameter affine model, deriving the CPMV or MV$(mv^h(x,y), mv^v(x,y))$ is based on the 4-parameter affine model.

In some examples, when the set of the affine parameters stored in the buffer is from a block coded with 6-parameter affine model, deriving the CPMV or MV $(mv^h(x,y), mv^v(x,y))$ is based on the 6-parameter affine model.

In some examples, deriving the CPMV or MV $(mv^h(x,y), mv^v(x,y))$ is based on the 6-parameter affine model regardless the set of the affine parameters stored in the buffer is from a bock coded with 4-parameter affine model or 6-parameter affine model.

In some examples, deriving CPMVs of the current block is based on the set of the affine parameters stored in the buffer and the motion vector, and the CPMVs of the current block serve as motion vector predictions (MVPs) for signaled CPMVs of the current block.

In some examples, deriving CPMVs of the current block is based on the set of the affine parameters stored in the buffer and the motion vector, and the CPMVs of the current block serve are used to derive the MVs of each sub-block of the current block used for motion compensation.

In some examples, when the current block is affine merge coded, deriving the MVs of each sub-block of the current block used for motion compensation is based on the set of the affine parameters stored in the buffer and the motion vector.

In some examples, the motion vector of the neighboring unit block or the neighboring block and the set of the affine parameters are associated with same inter prediction direction, wherein the inter prediction direction includes list 0, list 1 or Bi-direction.

In some examples, when inter prediction direction list 0 is one prediction direction in use, the motion vector and the set of the affine parameters are associated with same reference indices for list 0.

In some examples, when inter prediction direction list 1 is one prediction direction in use, the motion vector and the set of the affine parameters are associated with same reference indices for list 1.

In some examples, when the MV of the spatial neighboring unit block or neighboring block and the set of the affine parameters stored in the buffer refer to different reference pictures, the MV of the spatial neighboring unit block or neighboring block is scaled to refer to the same reference picture as the set of the affine parameters stored in the buffer to derive the affine model of the current block.

In some examples, when the MV of the temporal neighboring unit block or neighboring block and the set of the affine parameters stored in the buffer refer to different reference pictures, the MV of the temporal unit block or neighboring block is scaled to refer to the same reference picture as the set of the affine parameters stored in the buffer to derive the affine model of the current block.

Figure 33:
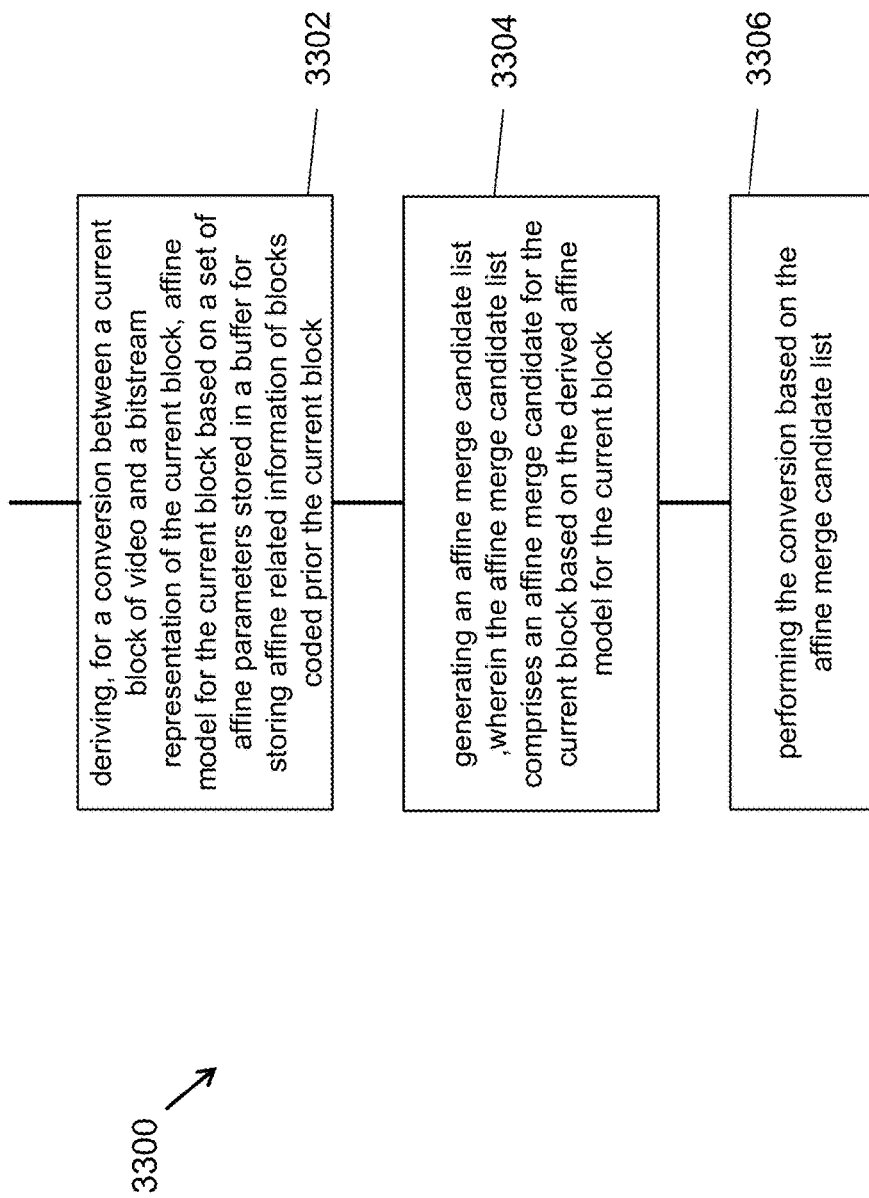
FIG. 33 is a flowchart for an example of a video processing method.

FIG. 33 is a flowchart for a method 3300 of processing video. The method 3300 includes, deriving (3302), for a conversion between a current block of video and a bitstream representation of the current block, affine model for the current block based on a set of affine parameters stored in a buffer for storing affine related information of blocks coded prior the current block; generating (3304) an affine merge candidate list, wherein the affine merge candidate list comprises an affine merge candidate for the current block based on the derived affine model for the current block; and performing (3306) the conversion based on the affine merge candidate list.

In some examples, side information associated with the stored set of affine parameters is inherited by the affine merge candidate based on the derived affine model, wherein the side information includes inter-prediction direction which includes list 0, list 1 and Bi-direction, and reference indices for list 0/list 1.

In some examples, the affine merge candidate based on the derived affine model is inserted into the affine merge candidate list after affine merge candidates inherited from neighboring blocks in the list, before constructed affine merge candidates in the list.

In some examples, the affine merge candidate based on the derived affine model is inserted into the affine merge candidate list before all other affine merge candidates.

In some examples, the affine merge candidate based on the derived affine model is inserted into the affine merge candidate list after constructed affine merge candidates in the list, before padding candidates in the list.

In some examples, the affine merge candidate based on the derived affine model is inserted into the affine merge candidate list after constructed affine merge candidates not using temporal motion prediction in the list, before constructed affine merge candidates using temporal motion prediction in the list.

In some examples, the affine merge candidate based on the derived affine model is inserted into the affine merge candidate list, and interleaved with constructed affine merge candidates in the list and padding candidates in the list.

In some examples, the method further comprising: adding N candidates derived based on affine parameters stored in the buffer to an affine merge candidate list, N is a pre-defined integer.

Figure 34:
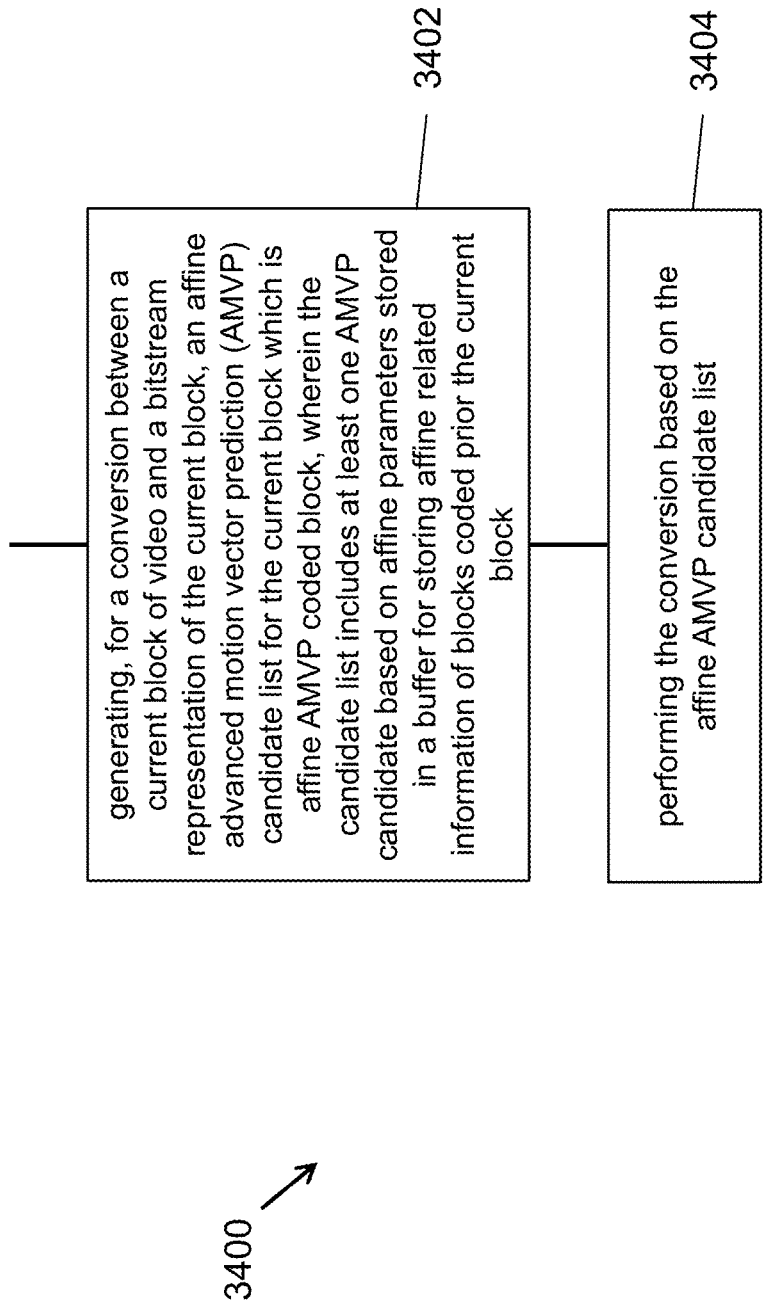
FIG. 34 is a flowchart for an example of a video processing method.

FIG. 34 is a flowchart for a method 3400 of processing video. The method 3400 includes, generating (3402), for a conversion between a current block of video and a bitstream representation of the current block, an affine advanced motion vector prediction (AMVP) candidate list for the current block which is affine AMVP coded block, wherein the candidate list includes at least one AMVP candidate based on affine parameters stored in a buffer for storing affine related information of blocks coded prior the current block; and performing (3404) the conversion based on the affine AMVP candidate list.

In some examples, the stored affine parameters used to generate the affine AMVP candidate refer to same reference picture as target reference picture of the current block.

In some examples, a reference picture list associated with the stored affine parameters is same as a target reference picture list of the current block.

In some examples, a reference index associated with the stored affine parameters is same as a target reference index of the current block.

In some examples, the affine AMVP candidate based on the affine parameters is inserted into the affine AMVP candidate list after affine AMVP candidates inherited from neighboring blocks in the list, before constructed affine AMVP candidates in the list.

In some examples, the affine AMVP candidate based on the affine parameters is inserted into the affine AMVP candidate list before all other affine AMVP candidates.

In some examples, the affine AMVP candidate based on the affine parameters is inserted into the affine AMVP candidate list after constructed affine AMVP candidates in the list, before High Efficiency Video Coding (HEVC) based AMVP candidates in the list.

In some examples, the affine AMVP candidate based on the affine parameters is inserted into the affine AMVP candidate list after High Efficiency Video Coding (HEVC) based AMVP candidates in the list, before padding affine AMVP candidates in the list.

In some examples, the affine AMVP candidate based on the affine parameters is inserted into the affine AMVP candidate list after constructed affine AMVP candidates not using temporal motion prediction in the list, before constructed affine AMVP candidates using temporal motion prediction in the list.

In some examples, when the current block is coded with 4-parameter affine model, higher priority is assigned to a 4-parameter affine model stored in the buffer and lower priority is assigned to a 6-parameter affine model stored in the buffer.

In some examples, when the current block is coded with 6-parameter affine model, higher priority is assigned to a 6-parameter affine model stored in the buffer and lower priority is assigned to a 4-parameter affine model stored in the buffer.

In some examples, the method further comprising: adding N candidates derived based on affine parameters stored in the buffer to an affine AMVP candidate list, N is a pre-defined integer.

In some examples, N is signaled in at least one of Sequence Parameter Set (SPS), Video Parameter Set (VPS), Picture Parameter Set (PPS), slice header, tile group header, tile.

In some examples, N depends on at least one of block dimension of the current block, coded mode information including AMVP mode and/or merge mode.

In some examples, N depends on available candidates in the candidate list.

In some examples, N depends on the available candidates of a certain type in the candidate list.

In some examples, when N is greater than 1, the N candidates derived based on affine parameters stored in the buffer are added to the candidate list in an ascending order of indices, or in a descending order of indices, or in an order which is determined based on the number of available candidates in the candidate list.

In some examples, the method further comprising: selecting the N sets of affine parameters from all sets of affine parameters stored in the buffer to derive the N candidates, N is an integer.

In some examples, the selected N sets of affine parameters are the latest N sets of affine parameters in the buffer.

In some examples, the selected N sets of affine parameters depend on indices of sets of affine model parameters in the buffer.

Figure 35:
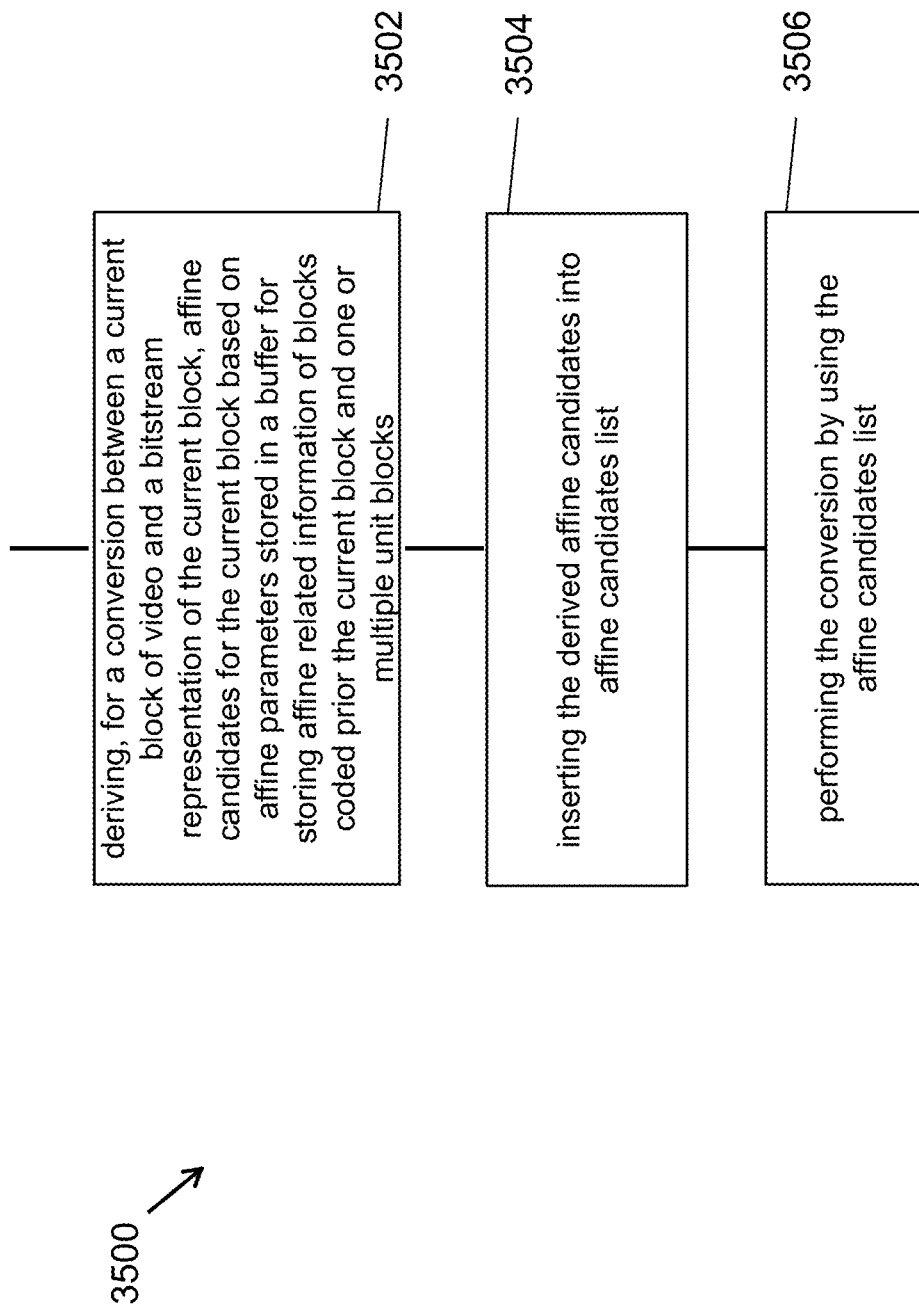
FIG. 35 is a flowchart for an example of a video processing method.

FIG. 35 is a flowchart for a method 3500 of processing video. The method 3500 includes, deriving (3502), for a conversion between a current block of video and a bitstream representation of the current block, affine candidates for the current block based on affine parameters stored in a buffer for storing affine related information of blocks coded prior the current block and one or multiple unit blocks; inserting (3504) the derived affine candidates into affine candidates list; and performing (3506) the conversion by using the affine candidates list.

In some examples, the unit blocks include at least one of the group consisting of spatial neighboring/non-adjacent unit blocks and temporal neighboring unit/non-adjacent unit blocks.

In some examples, the derived affine candidates are put before all other affine candidates, or right after inherited affine candidates in the list, or right after the first constructed affine candidate in the list, or right after the first affine candidate constructed from spatial neighboring blocks/non-adjacent blocks in the list, or right after all affine candidate derived from spatial neighboring blocks/non-adjacent blocks in the list, or right after all the constructed affine candidates in the list, or right before all the zero affine candidates.

In some examples, when another affine candidate is inherited from a spatial or temporal neighboring/non-adjacent unit block, the spatial or temporal neighboring/non-adjacent unit block is not used to derive the affine candidate with the affine parameters stored in the buffer.

In some examples, a spatial or temporal neighboring/non-adjacent unit block is used to derive an affine candidate with only one set of the affine parameters stored in the buffer.

In some examples, at most N affine candidates derived from the affine parameters stored in the buffer and a unit block can be put into the affine candidate list, N is an integer.

In some examples, a Generalized Bi-prediction improvement (GB I) index of the current block is inherited from the GBI index of a spatial or temporal neighboring/non-adjacent unit block if it chooses the affine candidates derived from the affine parameters stored in the buffer and the unit block.

In some examples, the affine candidates derived from the affine parameters stored in the buffer and the unit blocks are put into the affine candidate list in order.

In some examples, the method further comprising: searching available affine candidates derived from the affine parameters stored in the buffer and the unit blocks by using a two-level nested looping method; inserting the available affine candidates into the affine candidate list.

In some examples, in a first level loop, visiting each set of the affine parameters stored in the buffer in order of from the beginning of a table to the end, or from the end of the table to the beginning, or any other predefined or adaptive order.

In some examples, some sets of the affine parameters stored in the buffer are skipped in the first loop.

In some examples, for each set of the affine parameters stored in the buffer, a second level loop is applied, wherein each unit block is visited in order.

In some examples, only one spatial neighboring/non-adjacent unit block is included in the second level loop, or only one temporal neighboring/non-adjacent unit block is included in the second level loop.

In some examples, with a set of affine parameters given in the first level loop and a spatial or temporal neighbouring unit block given in the second level loop, an affine candidate is generated and put into the affine candidate list if all or partial of the following conditions are satisfied, i. the spatial or temporal neighbouring/non-adjacent unit block is available;

ii. the spatial or temporal neighbouring/non-adjacent unit block is inter-coded;

iii. the spatial or temporal neighbouring/non-adjacent unit block is not out of the current CTU-row.

iv. inter-prediction including list 0, list 1, or bi-direction of the set of affine parameters and that of the spatial or temporal neighbouring/non-adjacent unit block are the same;

v. reference index for list 0 of the set of affine parameters and that of the spatial or temporal neighbouring/non-adjacent unit block are the same;

vi. reference index for list 1 of the set of affine parameters and that of the spatial or temporal neighbouring/non-adjacent unit block are the same;

vii. POC of the reference picture for list 0 of the set of affine parameters is the same to the POC of one of the reference pictures of the spatial or temporal neighbouring/non-adjacent unit block.

viii. POC of the reference picture for list 1 of the set of affine parameters is the same to the POC of one of the reference pictures of the spatial or temporal neighbouring/non-adjacent unit block.

In some examples, when a spatial or temporal neighbouring unit block has been used to derive an inherited affine candidate, it is skipped in the second loop, and not to be used to derive an affine candidate with stored affine parameters.

In some examples, when a spatial or temporal neighbouring block has been used to derive an affine candidate with a set of affine parameters stored in the buffer, it is skipped in the second loop, and not to be used to derive an affine candidate with another set of affine parameters stored in the buffer.

In some examples, when a spatial or temporal neighbouring block is used to derive an affine candidate, all other neighbouring blocks after that neighbouring block are skipped and the second loop is broken so as to go back to the first loop, and a next set of affine parameters is visited in the first loop.

In some examples, a size of the affine candidate list is increased by N when the affine candidates derived from the affine parameters stored in the buffer can be put into the list, wherein N is an integer.

In some examples, the affine candidate is an affine merge candidate, and the affine candidate list is an affine merge candidate list.

In some examples, the affine candidate is an affine AMVP candidate, and the affine candidate list is an affine AMVP candidate list.

In some examples, the derived affine candidates are put right after the first translational affine AMVP candidate in the list or after all translational affine AMVP candidate in the list.

Figure 36:
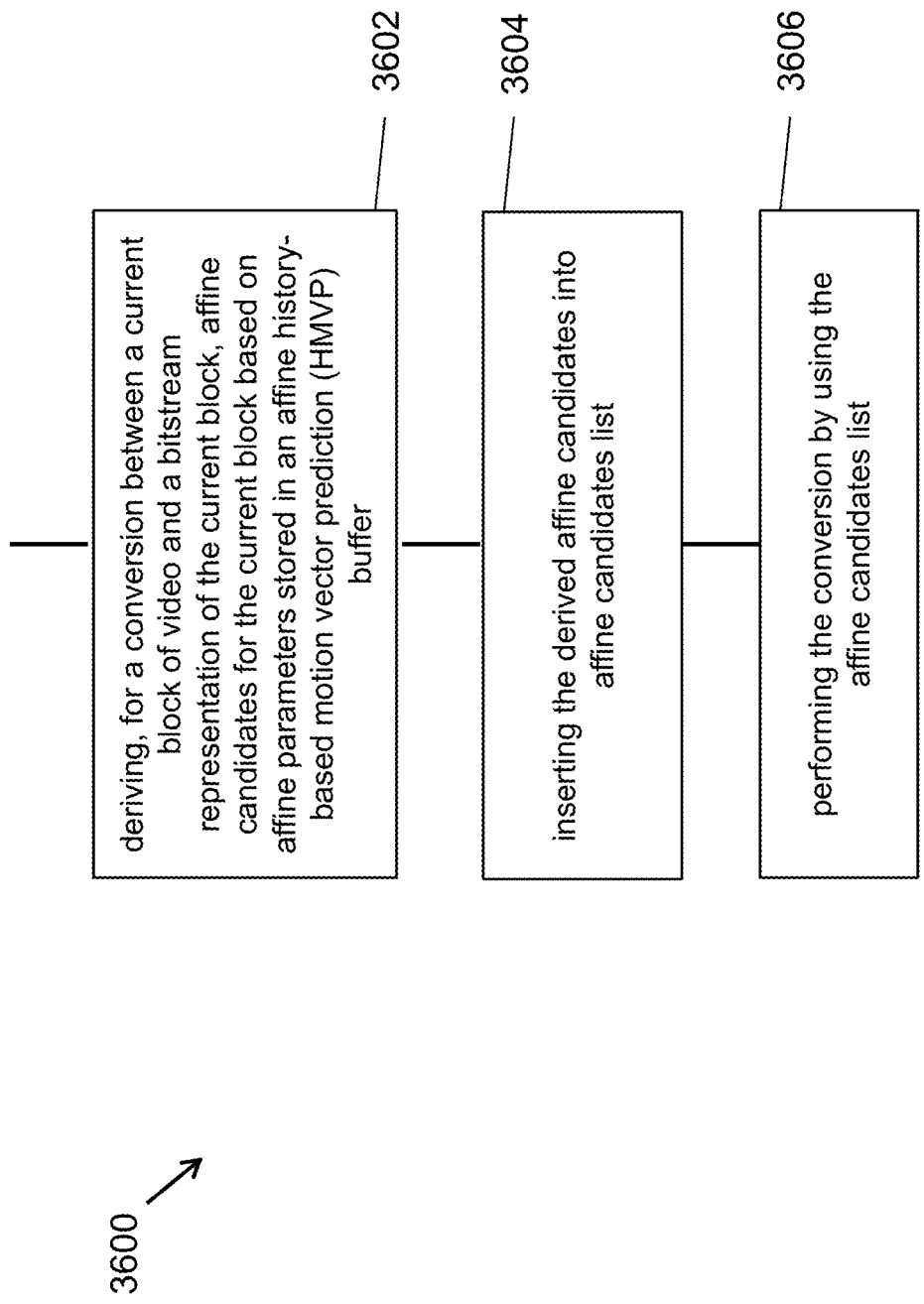
FIG. 36 is a flowchart for an example of a video processing method.

FIG. 36 is a flowchart for a method 3600 of processing video. The method 3600 includes, deriving (3602), for a conversion between a current block of video and a bitstream representation of the current block, affine candidates for the current block based on affine parameters stored in an affine history-based motion vector prediction (HMVP) buffer; inserting (3604) the derived affine candidates into affine candidates list; and performing (3606) the conversion by using the affine candidates list.

In some examples, an affine candidate inherited from a spatial neighbouring block of the current block are not put into the list.

In some examples, an affine candidates inherited from a spatial neighbouring block of the current block are excluded from the list.

In some examples, the derived affine candidates are inserted into the list after affine candidates inherited from a block in a CTU row different from the current CTU row.

In some examples, an affine candidate inherited from a block in the current CTU row is removed from the list.

In some examples, whether an affine candidate inherited from a spatial neighbouring block of the current block is inserted into the list or not depends on the position of the spatial neighbouring block.

In some examples, the affine candidate inherited from the spatial neighbouring block is inserted into the list when the spatial neighbouring block is in the same CTU or CTU row as the current block.

In some examples, the affine candidate inherited from the spatial neighbouring block is put into the list when the spatial neighbouring block is not in the same CTU or CTU row as the current block.

In some examples, whether to insert affine merge candidates inherited from a spatial neighbouring block of the current block depends on the affine HMVP buffer.

In some examples, when the affine HMVP buffer is empty, the inherited affine merge candidates are added to the list; and when the affine HMVP buffer is not empty, the inherited affine merge candidates are excluded from the list.

In some examples, whether to insert affine merge candidates inherited from a spatial neighbouring block of the current block depends on the block dimensions.

In some examples, the affine candidate is an affine merge candidate, and the affine candidate list is an affine merge candidate list/sub-block based merge candidate list.

In some examples, the affine candidate is an affine AMVP candidate, and the affine candidate list is an affine AMVP candidate list.

In some examples, the derived affine merge candidates are inserted into the list just after alternative temporal motion vector prediction (ATMVP) candidate.

In some examples, the derived affine merge candidates are inserted into the list before constructed affine merge candidates.

In some examples, the derived affine AMVP candidates are inserted first into the list.

In some examples, the base position is any position inside the neighbouring unit block.

In some examples, the base position is determined based on coordinate of a top-left corner of the current block, dimensions of the neighbouring unit block.

It will be appreciated that the disclosed techniques may be embodied in video encoders or decoders to improve compression efficiency when the coding units being compressed have shaped that are significantly different than the traditional square shaped blocks or rectangular blocks that are half-square shaped. For example, new coding tools that use long or tall coding units such as 4×32 or 32×4 sized units may benefit from the disclosed techniques.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
deriving, for a conversion between a current block of a video and a bitstream of the video, affine related information associated with affine model for the current block based on affine parameters stored in a buffer for storing affine related information of blocks coded prior the current block; and
performing the conversion based on the affine related information,
wherein the deriving the affine related information associated with the affine model for the current block comprises:
deriving the affine related information based on both a set of the affine parameters stored in the buffer and additional motion information together,
wherein the additional motion information includes at least one of motion information of a neighboring block, or motion information associated with the set of the affine parameters, or motion information of a spatial neighboring or non-adjacent unit block, or motion information of a temporal neighboring unit block/a collocated unit block in a collocated picture, and
wherein the motion information at least includes a motion vector (MV), a reference list indication, and a reference picture index.

2. The method of claim 1, wherein the affine model for the current block includes at least one of a 4-parameter affine model and a 6-parameter affine model.

3. The method of claim 1, wherein the affine parameters stored in the buffer are used for motion vector prediction or motion vector coding of the current block.

4. The method of claim 1, wherein deriving a control point motion vector (CPMV) for the current block is based on the set of the affine parameters, a coordinate of a position for which the CPMV is to be derived, a coordinate of a base position, and one of a base MV $(mv^h_0, mv^v_0)$ of the spatial or temporal neighboring block, or a base MV $(mv^h_0, mv^v_0)$ associated with the set of the affine parameters, or a base MV $(mv^h_0, mv^v_0)$ of the spatial neighboring or non-adjacent unit block, or a base MV $(mv^h_0, mv^v_0)$ of the temporal neighboring unit block, and wherein the base position is associated with the based MV.

5. The method of claim 4, wherein deriving the CPMV for the current block is based on a disparity between the position for which the CPMV is to be derived, and the base position.

6. The method of claim 1, wherein deriving a MV used in motion compensation for a sub-block of the current block is based on the set of the affine parameters, a coordinate of a position for which the MV $(mv^h(x,y), mv^v(x,y))$ is to be derived, a coordinate of a base position, and one of a base MV $(mv^h_0, mv^h_0)$ of the spatial or temporal neighboring block or a base MV $(mv^h_0, mv^v_0)$ associated with the set of the affine parameters, or a base MV $(mv^h_0, mv^v_0)$ of the spatial neighboring or non-adjacent unit block, or a base MV $(mv^h_0, mv^v_0)$ of the temporal neighboring unit block.

7. The method of claim 6, wherein deriving the MV used in motion compensation for the sub-block of the current block is based on a disparity between the position for which the MV $(mv^h(x,y), mv^v(x,y))$ is to be derived, and the base position.

8. The method of claim 4, wherein, when the set of the affine parameters stored in the buffer is from a block coded with 4-parameter affine model, the deriving the CPMV or MV$(mv^h(x,y), mv^x(x,y))$ is based on the 4-parameter affine model.

9. The method of claim 4, wherein, when the set of the affine parameters stored in the buffer is from a block coded with 6-parameter affine model, the deriving the CPMV or MV $(mv^h(x,y), mv^v(x,y))$ is based on the 6-parameter affine model.

10. The method of claim 1, wherein deriving control point motion vectors (CPMVs) of the current block is based on the set of the affine parameters stored in the buffer and the motion vector, and wherein the CPMVs of the current block serve as motion vector predictions (MVPs) for signaled CPMVs of the current block.

11. The method of claim 1, wherein deriving control point motion vectors (CPMVs) of the current block is based on the set of the affine parameters stored in the buffer and the motion vector, and wherein the CPMVs of the current block are used to derive MVs of each sub-block of the current block used for motion compensation.

12. The method of claim 1, wherein, when the current block is affine merge coded, deriving MVs of each sub-block of the current block used for motion compensation is based on the set of the affine parameters stored in the buffer and the motion vector.

13. The method of claim 1, wherein the motion vector of the temporal neighboring unit block or the neighboring block and the set of the affine parameters are associated with a same inter prediction direction, and wherein the same inter prediction direction includes list 0, list 1, or bi-direction.

14. The method of claim 1, wherein
when the MV of the spatial neighboring unit block or neighboring block and the set of the affine parameters stored in the buffer refer to different reference pictures, the MV of the spatial neighboring unit block or neighboring block is scaled to refer to a same reference picture as the set of the affine parameters stored in the buffer to derive the affine model of the current block, or
when the MV of the temporal neighboring unit block or neighboring block and the set of the affine parameters stored in the buffer refer to different reference pictures, the MV of the temporal unit block or neighboring block is scaled to refer to the same reference picture as the set of the affine parameters stored in the buffer to derive the affine model of the current block.

15. The method of claim 1, wherein the conversion includes encoding the current block into the bitstream.

16. The method of claim 1, wherein the conversion includes decoding the current block from the bitstream.

17. An apparatus for processing video data comprising a processor and a non-transitory memory with instructions thereon, wherein the instructions upon execution by the processor, cause the processor to:
derive, for a conversion between a current block of a video and a bitstream of the video, affine related information associated with affine model for the current block based on affine parameters stored in a buffer for storing affine related information of blocks coded prior the current block; and
perform the conversion based on the affine related information,
wherein the deriving the affine related information associated with the affine model for the current block comprises:
deriving the affine related information based on both a set of the affine parameters stored in the buffer and additional motion information together,
wherein the additional motion information includes at least one of motion information of a neighboring block, or motion information associated with the set of the affine parameters, or motion information of a spatial neighboring or non-adjacent unit block, or motion information of a temporal neighboring unit block/a collocated unit block in a collocated picture, and
wherein the motion information at least includes a motion vector (MV), a reference list indication, and a reference picture index.

18. A non-transitory computer-readable recording medium storing a bitstream of a video which is generated by a method performed by a video processing apparatus, wherein the method comprises:
deriving, for a current block of the video, affine related information associated with affine model for the current block based on affine parameters stored in a buffer for storing affine related information of blocks coded prior the current block; and
generating the bitstream based on the affine related information,
wherein the deriving the affine related information associated with the affine model for the current block comprises:
deriving the affine related information based on both a set of the affine parameters stored in the buffer and additional motion information together,
wherein the additional motion information includes at least one of motion information of a neighboring block, or motion information associated with the set of the affine parameters, or motion information of a spatial neighboring or non-adjacent unit block, or motion information of a temporal neighboring unit block/a collocated unit block in a collocated picture, and
wherein the motion information at least includes a motion vector (MV), a reference list indication, and a reference picture index.

\* \* \* \* \*